US012543671B2

(12) United States Patent
Huffman et al.

(10) Patent No.: US 12,543,671 B2
(45) Date of Patent: Feb. 10, 2026

(54) SMART NOTES FOR AN IRRIGATION CONTROL SYSTEM

(71) Applicant: The Toro Company, Bloomington, MN (US)

(72) Inventors: Russ Huffman, Bloomington, MN (US); Norma Frotton, Bloomington, MN (US); Burnett Jones, Bloomington, CA (US); John Dalman, Bloomington, MN (US); Adam Munir, Bloomington, MN (US)

(73) Assignee: The Toro Company, Bloomington, MN (US)

( * ) Notice: Subject to any disclaimer, the term of this patent is extended or adjusted under 35 U.S.C. 154(b) by 190 days.

(21) Appl. No.: 18/435,868

(22) Filed: Feb. 7, 2024

(65) Prior Publication Data

US 2024/0260521 A1 Aug. 8, 2024

Related U.S. Application Data

(60) Provisional application No. 63/483,685, filed on Feb. 7, 2023.

(51) Int. Cl.
| | |
|---|---|
| *A01G 25/16* | (2006.01) |
| *B05B 12/02* | (2006.01) |
| *G06F 3/0482* | (2013.01) |
| *G06F 40/169* | (2020.01) |
| *G06T 7/00* | (2017.01) |

(52) U.S. Cl.
CPC ............ *A01G 25/167* (2013.01); *B05B 12/02* (2013.01); *G06F 3/0482* (2013.01); *G06F 40/169* (2020.01); *G06T 7/0012* (2013.01); *G06T 2207/30188* (2013.01)

(58) Field of Classification Search
CPC ..... A01G 25/167; B05B 12/02; G06F 3/0482; G06F 40/169; G06T 7/0012; G06T 2207/30188; G06T 2207/10024; G06T 2207/20081; G06T 2207/30164; G06T 7/0004

See application file for complete search history.

(56) References Cited

U.S. PATENT DOCUMENTS

| | | | | |
|---|---|---|---|---|
| 9,468,162 | B2* | 10/2016 | Weiler | G05B 19/0426 |
| 11,240,976 | B2* | 2/2022 | Larsen | A01G 25/165 |
| 2011/0049260 | A1* | 3/2011 | Palmer | A01G 25/16 |
| | | | | 239/63 |
| 2023/0292684 | A1* | 9/2023 | Ramsey | G05B 19/042 |
| | | | | 137/561 R |

* cited by examiner

*Primary Examiner* — Cao H Nguyen
(74) *Attorney, Agent, or Firm* — Inskeep IP Group, Inc.

(57) ABSTRACT

In one or more examples of the present disclosure, irrigation control software is provided for a computerized irrigation system. The irrigation control software may provide various user interfaces capable of allowing users to create, assign, organize, and save facility maintenance-related electronic notes to a remote database or central irrigation server that is accessible by mobile devices of authorized users. The electronic irrigation notes may be linked to one or more sprinklers or geospatial areas within the irrigation system, may be assigned to one or more authorized users, may include text or images descriptive or indicative of an issue or a maintenance task associated therewith, and may be archived to create maintenance log histories to help monitor issues associated with specific sprinklers or geospatial areas.

20 Claims, 45 Drawing Sheets

| Golf Course ⊕ | ◇ | ☀ 53° F | 10% RH |
|---|---|---|---|
| Watering Plan ⓘ | | ⓐ 7 Notifications | ⓑ 3 Flags | ⓒ 1 Suspended |

| 1,715 All Stations | | | |
|---|---|---|---|
| Active / Fairways | | On | Auto Cycle Adjusted RT |
| ⊘ 1-Fairways | › | ☑ | ☐ 4-5 |
| ⊘ 2-Fairways | › | ☑ | ☐ 7:28 |
| ⊘ 3-Fairways | › | ☑ | ☐ 6-7 |
| ⊘ 4-Fairways | › | ☑ | ☐ 12-14 |
| ⊘ 5-Fairways | › | ☑ | ☐ 8:04 |
| ⊘ 6-Fairways | › | ☑ | ☐ 6:54 |
| ⊘ 7-Fairways | › | ☑ | ☐ 5-7 |
| ⊛ 8-Fairways | 4 adjustments   7:30 AM | ☑ | ☐ 7:45 |
| ⊘ 9-Fairways | 1 new note       7:30 AM | ☑ | ☐ 4:11 |
| ⊘ 10-Fairways | 1 detail change 7:30 AM | ☑ | ☐ 4-5 |
| ⊘ 11-Fairways | › | ☑ | ☐ 0-7 |
| ⊘ 12-Fairways | › | ☑ | ☐ 6-7 |
| ⊘ 13-Fairways | › | ☑ | ☐ 12-14 |
| ⊘ 14-Fairways | › | ☑ | ☐ 8:04 |
| ⊘ 15-Fairways | › | ☑ | ☐ 6:54 |
| ⊘ 16-Fairways | › | ☑ | ☐ 5-7 |
| ⊘ 17-Fairways | › | ☑ | ☐ 7:45 |
| ⊘ 18-Fairways | › | ☑ | ☐ 4:11 |

| Active / Approaches | | On | Auto Cycle Adjusted RT |

⌂ Daily Operation ‹
　Course Report
　Watering Plan
　Projected Flow
　Synchronize
　Manual Irrigation
　Work Order
　Instant Program
　Scheduled Activity
　Switch Program
▤ Report Generator
▥ Utilities
☆ Favorites
📶 Turf Guard
② NSN Support
⚙ Advanced Setup

← HIDE MENU

| | Active / Fairways / 11-Fairways | On | Auto Cycle Adjusted RT |
|---|---|---|---|
| ⊘ | 11FW12 1-112-23 | ☑ | 13:11 |
| ⊘ | 11FW13 1-112-35 | ☑ | 13:11 |
| ⊘ | 11FW14 1-112-16 | ☑ | 13:11 |
| ⊘ | 11FW15 1-112-33 | ☑ | 13:11 |
| ⊘ | 11FW16 1-112-24 | ☑ | 13:11 |
| ⊘ | 11FW17 1-112-15 | ☑ | 6:36 |
| ⊘ | 11FW18 1-112-25 | ☑ | 0:00 |
| ⊗ | 11FW19 1-112-14 | ☑ | 6:36 |
| ⊘ | 11FW20 1-112-26 | ☑ | 6:36 |
| ⊘ | 11FW21 1-112-11 | ☑ | 13:11 |
| ⊘ | 11FW22 1-112-13 | ☑ | 11:52 |
| ⊘ | 11FW23 1-112-27 | ☑ | 13:11 |
| ⊘ | 11FW24 1-112-10 | ☑ | 13:11 |
| ⊘ | 11FW25 1-112-12 | ☑ | 11:52 |
| ⊘ | 11FW26 1-112-28 | ☑ | 13:11 |
| ⊘ | 11FW27 1-112-27 | ☑ | 13:11 |
| ⊘ | 11FW28 1-113-38 | ☑ | 13:11 |
| ⊘ | 11FW29 1-113-46 | ☑ | 13:11 |
| ⊘ | 11FW30 1-113-48 | ☑ | 13:11 |

Golf Course ⓘ  ◇  ☁ 53°F | 10% RH |

Watering Plan ⓘ
1,715 All Stations  ⓐ 7 Notifications  ⓑ 3 Flags  ⓒ 1 Suspended

Callout (131): I changed the Body Valve. This has been running all night, the whole area is solved! I'm suspending for 3 days.  C.M.
11:52 AM

- Daily Operation
- Course Report
- Watering Plan
- Projected Flow
- Synchronize
- Manual Irrigation
- Work Order
- Instant Program
- Scheduled Activity
- Switch Program
- Report Generator
- Utilities
- Favorites
- Turf Guard
- NSN Support
- Advanced Setup

SMART NOTES FOR AN IRRIGATION CONTROL SYSTEM

RELATED APPLICATIONS

This application claims benefit and priority to U.S. Provisional Application Ser. No. 63/483,685 filed Feb. 7, 2023 entitled Smart Notes For An Irrigation Control System, which is hereby incorporated herein by reference in its entirety.

BACKGROUND OF THE INVENTION

Computerized irrigation systems for implementing automatic turf or landscape watering are presently in widespread use. Typical systems include a plurality of valves and a plurality of sprinklers in fluid and electrical communication with a water source and a computerized central controller, which controls both the opening the closing of the water valves in accordance with a predetermined schedule to, in turn, allow water to flow from the water source to the sprinklers, and issue therefrom, at appropriate times.

In some computerized irrigation systems, the central controller may implement complex irrigation schedules, provide different settings for each of a plurality of different sprinkler groups, monitor water consumption, monitor water flow rate, monitor water pressure, monitor weather and soil moisture data via sensors, and identify electrical or mechanical issues, among other capabilities. In order to provide this functionality, some central irrigation controllers may include irrigation specific software executed on, for example, a local server, a desktop computer, and/or an electronic tablet/phone.

SUMMARY OF THE INVENTION

In one or more examples of the present disclosure, irrigation control software is provided for a computerized irrigation system. The irrigation control software may provide various user interfaces capable of allowing users to create, assign, organize, and save facility maintenance-related electronic notes to a remote storage device or central irrigation server that is accessible by mobile devices of authorized users. The electronic irrigation notes may be linked to one or more sprinklers or geospatial areas within the irrigation system, may be assigned to one or more authorized users, may include text or images descriptive or indicative of an issue or a maintenance task associated therewith, and may be archived to create maintenance log histories to help monitor issues associated with specific sprinklers or geospatial areas.

In some aspects, the techniques described herein relate to an irrigation control system for an irrigation site including: a central irrigation controller including a memory, a processor configured to execute software stored in the memory, and a display configured to display a graphical user interface determined by the executed software of the central irrigation controller; wherein the executed software of the central irrigation controller is further configured to cause the central irrigation controller to: execute an irrigation schedule that causes irrigation, via one or more sprinklers of a plurality of sprinklers, of an area of physical terrain located near the one or more sprinklers of the plurality of sprinklers; display, in response to a user input to the graphical user interface, one or more electronic irrigation notes on the graphical user interface of the central irrigation controller, wherein each of the one or more electronic irrigation notes is associated with at least one sprinkler of the plurality of sprinklers; and store the one or more electronic irrigation notes on a remote database.

In some aspects, the techniques described herein relate to a system, wherein the executed software of the central irrigation controller is further configured to cause the central irrigation control to assign each of the one or more electronic irrigation notes to a geospatial location within one or more holes of the irrigation site or a geospatial location of the at least one sprinkler of the plurality of sprinklers.

In some aspects, the techniques described herein relate to a system, wherein the executed software of the central irrigation controller is further configured to cause the central irrigation controller to delete each of the one or more electronic irrigation notes after a predetermined period of time.

In some aspects, the techniques described herein relate to a system, wherein the executed software of the central irrigation controller is further configured to cause the central irrigation controller to add, to each electronic irrigation note of the one or more electronic irrigation notes: text descriptive of an issue associated with the at least one sprinkler of the plurality of sprinklers or an area of physical terrain located near the at least one sprinkler of the plurality of sprinklers; and one or more photographs of physical terrain of the irrigation site, wherein the text is based on the one or more photographs.

In some aspects, the techniques described herein relate to a system, further including a mobile device including a memory, a processor configured to execute software stored in the memory, and a display configured to display a graphical user interface determined by the executed software of the mobile device, wherein the executed software of the mobile device is further configured to cause the mobile device to: retrieve the one or more electronic irrigation notes from the remote database; and display the one or more electronic irrigation notes on the graphical user interface of the mobile device.

In some aspects, the techniques described herein relate to a system, wherein the executed software of the mobile device is configured to cause, upon retrieval of the one or more electronic irrigation notes, the mobile device to generate an audible, visual, or haptic alert associated with at least one electronic irrigation note.

In some aspects, the techniques described herein relate to an irrigation control system for an irrigation site including: a central irrigation controller including a memory, a processor configured to execute software stored in the memory, and a display configured to display a graphical user interface determined by the executed software of the central irrigation controller; wherein the executed software of the central irrigation controller is configured to cause the central irrigation controller to: execute an irrigation schedule that causes irrigation, via one or more sprinklers of a plurality of sprinklers, of an area of physical terrain located near the one or more sprinklers of the plurality of sprinklers; create one or more electronic irrigation notes on the graphical user interface of the central irrigation controller, wherein each of the one or more electronic irrigation notes is associated with at least one sprinkler of the plurality of sprinklers, wherein each of the one or more electronic irrigation notes includes information identifying an individual user of the central irrigation software; and store the one or more electronic irrigation notes on a remote database accessible by the central irrigation controller.

In some aspects, the techniques described herein relate to a system, further including a mobile device including a memory, a processor configured to execute software stored in the memory, and a display configured to display a graphical user interface determined by the executed software of the mobile device; wherein the executed software of the mobile device is further configured to cause the mobile device to: retrieve the one or more electronic irrigation notes from the remote database; display the one or more electronic irrigation notes on the graphical user interface of the mobile device; edit the one or more electronic irrigation notes, or create one or more additional electronic irrigation notes; and store the edited one or more electronic irrigation notes, or the one or more additional electronic irrigation notes, on the remote database for access by the central irrigation controller.

In some aspects, the techniques described herein relate to a system, wherein the executed software of the central irrigation controller is further configured to cause the central irrigation control to assign each of the one or more electronic irrigation notes to one or more additional users of the central irrigation software, wherein each of the one or more electronic irrigation notes includes a maintenance task to be performed by the one or more additional users.

In some aspects, the techniques described herein relate to a system, wherein the executed software of the mobile device is further configured to cause the mobile device to display only the one or more electronic irrigation notes associated with a geospatial position located within a user selectable distance of a geospatial position of the mobile device.

In some aspects, the techniques described herein relate to a system, wherein the one or more electronic irrigation notes are based on at least one of soil moisture data, water usage data, or weather data stored on the central irrigation controller, remote database, or a remote server.

In some aspects, the techniques described herein relate to a system, wherein the executed software of the mobile device is further configured to cause the mobile device to assign each of the one or more electronic irrigation notes to a geospatial location within one or more holes of the irrigation site or a geospatial location of the at least one sprinkler of the plurality of sprinklers.

In some aspects, the techniques described herein relate to a system, wherein the executed software of the mobile device is further configured to cause the mobile device to automatically add to each electronic irrigation note of the one or more electronic irrigation notes: text descriptive of an issue associated with the at least one sprinkler of the plurality of sprinklers or an area of physical terrain located near the at least one sprinkler of the plurality of sprinklers based on one or more photos of physical terrain of the irrigation site.

In some aspects, the techniques described herein relate to a method of managing irrigation site maintenance activities, the method including: outputting a graphical user interface to a display of a central irrigation controller or a mobile device from which irrigation control software is configured to be accessed, wherein the central controller and the mobile device each including a processor and a non-transitory computer readable storage medium; displaying an electronic irrigation note list on the graphical user interface to a first user accessing the irrigation control software at the central irrigation controller or the mobile device, wherein the electronic irrigation note list is stored on a remote database accessible by the mobile device and the central irrigation controller, the central irrigation controller communicatively interconnected with a plurality of sprinklers of an irrigation site; creating at least one electronic irrigation note linked to a geospatial location of one or more sprinklers of the plurality of sprinklers; and adding the at least one electronic irrigation note to the electronic irrigation note list stored on the central irrigation controller or cloud.

In some aspects, the techniques described herein relate to a method, wherein the method further includes: outputting the graphical user interface to a display of a second mobile device from which the irrigation control software is configured to be accessed, wherein the second mobile device includes a processor and a non-transitory computer readable storage medium; and displaying the electronic irrigation note list on the graphical user interface of the irrigation control software to a second user accessing the mobile irrigation control software at the second mobile device.

In some aspects, the techniques described herein relate to a method, wherein displaying the electronic irrigation note list to the second user includes automatically generating an audible, visual, or haptic alert based on an assignment of the at least one electronic irrigation note to the second user by the first user.

In some aspects, the techniques described herein relate to a method, wherein displaying the electronic irrigation note list includes sorting a plurality of electronic irrigation notes of the plurality of electronic irrigation notes based on a geospatial location of the second user with respect to the plurality of sprinklers.

In some aspects, the techniques described herein relate to a method, wherein creating the at least one electronic irrigation note includes automatically adding text descriptive of an issue associated with the at least one sprinkler of the plurality of sprinklers or an area of physical terrain located near the at least one sprinkler of the plurality of sprinklers based on one or more photos of physical terrain of the irrigation site.

In some aspects, the techniques described herein relate to a method, wherein creating the at least one electronic irrigation note includes capturing one or more photos with the first mobile device of the area of physical terrain located near the at least one sprinkler of the plurality of sprinklers.

In some aspects, the techniques described herein relate to a method, wherein creating the at least one electronic irrigation note includes automatically identifying, based the one or more photos, a disease or assessing health of turf of vegetation of the physical terrain located near at least one sprinkler of the plurality of sprinklers.

In some aspects, the techniques described herein relate to a method, wherein creating the one or more electronic irrigation notes includes viewing, on the graphical user interface, soil moisture data, water usage data, or weather data stored on the central irrigation controller, remote database, or a remote server.

In some aspects, the techniques described herein relate to a method of managing irrigation site maintenance activities, the method including: communicatively interconnecting a first mobile device with a central irrigation controller and remote database, the central irrigation controller in communication with a plurality of sprinklers of an irrigation site, wherein the first mobile device includes a processor and a non-transitory computer readable storage medium; outputting, in response to a first user input, a first user interface screen of mobile irrigation control software to a display of a first mobile device from which the mobile irrigation control software is configured to be accessed; displaying, in response to a second user input, a second user interface screen of mobile irrigation control software on the display of the first mobile device; and adding, in response to one or more additional user inputs to a third user interface screen, at least one maintenance entry to a maintenance activity log based on the one or more additional user inputs, wherein the one or more additional user inputs causes the mobile irrigation control software to receive at least one parameter or issue associated with one or more sprinklers of the plurality of sprinklers, or an area of physical terrain located near the one or more sprinklers of the plurality of sprinklers, wherein the maintenance activity log is stored on the central irrigation controller or remote database of the irrigation site.

In some aspects, the techniques described herein relate to a method, wherein the first user interface screen includes an action menu including a plurality of user selectable objects that are vertically listed with respect to one another, the plurality of user selectable objects including at least a map view object and a list view object.

In some aspects, the techniques described herein relate to a method, wherein the second user interface screen includes a graphical representation of one or more holes of the irrigation site, the graphical representation including a plurality of sprinkler icons each corresponding to a geospatial location of one of the plurality of sprinklers on the irrigation site, and wherein the first user input is a touch input to the map view object of the action menu and the second user input is a touch input to one or the plurality of sprinkler icons.

In some aspects, the techniques described herein relate to a method, wherein the second user interface screen includes the maintenance activity log, and wherein the first user input is a touch input to an activity log object of the action menu and the second user input is a touch input to one of a plurality of maintenance activity entries of the maintenance activity log.

In some aspects, the techniques described herein relate to a method, wherein the third user interface screen includes: a first area for selecting or displaying one or more identifiers indicating which of the plurality of sprinklers the at least one maintenance entry is linked to; a second area for receiving and displaying text descriptive of the parameter or issue associated with the one or more sprinklers of the plurality of sprinklers or the area or an area of physical terrain located near the one or more sprinklers of the plurality of sprinklers; and a third area for attaching and displaying one or more photos of the area of physical terrain located near the one or more sprinklers of the plurality of sprinklers.

In some aspects, the techniques described herein relate to a method, wherein the method further includes: communicatively interconnecting a second mobile device with the central irrigation controller and the remote database, wherein the second mobile device includes a processor and a non-transitory computer readable storage medium; outputting, in response to a first user input by the second user, the first user interface screen from which the mobile irrigation control software is configured to be accessed; displaying, in response to a second user input, a second user interface screen of mobile irrigation control software on the display of the first mobile device; and editing, in response to one or more user inputs by the second user, at least one maintenance entry of the maintenance activity log stored on the central irrigation controller or remote database.

In some aspects, the techniques described herein relate to a method, wherein editing the at least one maintenance entry of the maintenance activity log is performed in response to receiving an audible, visual, or haptic alert based on an assignment of the at least one maintenance entry to the second user by the first user.

In some aspects, the techniques described herein relate to a method, wherein editing the least one maintenance entry of the maintenance activity log stored on the central irrigation controller or remote database includes adding, based on one or more user inputs by the second user, one or more photos captured by the second mobile device and automatically generating descriptive text based on the one or more photos.

In some aspects, the techniques described herein relate to a method, wherein the method includes automatically adding one or more maintenance items to the maintenance activity log stored on the central irrigation controller or remote database by the irrigation control software of the central irrigation controller, each indicative of a communication or synchronization failure between one or more sprinklers of the plurality of sprinklers, the one or more maintenance items linked to a geospatial location of the one or more sprinklers.

In some aspects, the techniques described herein relate to an irrigation control system for an irrigation site including: a central irrigation controller including a memory, a processor configured to execute software stored in the memory, and display a graphical user interface on a display that is determined by the executed software of the central irrigation controller; wherein the executed software of the central irrigation controller is further configured to cause the central irrigation controller to: execute an irrigation schedule that causes irrigation, via one or more sprinklers of the plurality of sprinklers, of an area of physical terrain located near the one or more sprinklers of the plurality of sprinklers; display, in response to a user input to the graphical user interface, one or more electronic irrigation notes on the graphical user interface of the central irrigation controller, wherein each of the one or more electronic irrigation notes is associated with at least one sprinkler of the plurality of sprinklers; and store the one or more electronic irrigation notes on a remote database; the electronic irrigation notes including: a group of data logically associated with each other that is stored in one or more of a database or a log file; the group of data including one or more identifiers; and one or more of the following: a text-based message inputted by a user, an electronic photograph, geographic location data, personnel identification, note creation times.

In some aspects, the techniques described herein relate to an irrigation control system, wherein the one or more identifiers include an electronic character string associated with an irrigation equipment, geolocation data, or personnel data.

In some aspects, the techniques described herein relate to a method of managing irrigation site activities, the method including: executing irrigation control software on a central controller, the central controller including a non-transitory computer readable storage medium storing the irrigation control software and a processor configured to execute the irrigation control software; displaying an irrigation note input interface; entering an identifier into a first input area of the irrigation note input interface; causing the irrigation control software to look up the identifier in a database and reading a status of the identifier; and, displaying a status indicator in the irrigation note interface communicating a status of the irrigation equipment or personnel associated with the identifier.

In some aspects, the techniques described herein relate to a method of managing irrigation site activities, the method including: executing irrigation control software on a central controller, the central controller including a non-transitory computer readable storage medium storing the irrigation control software and a processor configured to execute the irrigation control software; displaying an irrigation note input interface; entering an identifier into a first input area of the irrigation note input interface that is associated with personnel of an irrigation site; causing the irrigation control software to look up a work availability of the identifier in a database; and, displaying the work availability of the personnel in the irrigation note interface.

In some aspects, the techniques described herein relate to a method of managing irrigation site activities, the method including: executing irrigation control software on a central controller, the central controller including a non-transitory computer readable storage medium storing the irrigation control software and a processor configured to execute the irrigation control software; displaying an irrigation note input interface; entering an identifier into a first input area of the irrigation note input interface; causing the irrigation control software to look up the identifier in a database and populating a second input area with words or sentence templates associated with the identifier; and, adding the words or sentence templates to the second input area.

In some aspects, the techniques described herein relate to a method of managing irrigation site activities, the method including: executing irrigation control software on a central controller, the central controller including a non-transitory computer readable storage medium storing the irrigation control software and a processor configured to execute the irrigation control software; displaying an irrigation note input interface; receiving a first geographic location data; causing the irrigation control software to access a database containing a plurality of geographic location data that are each associated with an identifier; add with the irrigation software one or more identifiers to a first input area that are within a predetermined distance of the first geographic location data.

BRIEF DESCRIPTION OF THE DRAWINGS

The following figures are included to illustrate certain example aspects of the present disclosure and should not be viewed as exclusive or limiting. The subject matter disclosed is capable of considerable modifications, alterations, combinations, and equivalents in form and function, as will occur to one having ordinary skill in the art and having the benefit of this disclosure. The present disclosure references the drawings as follows:

FIG. 9 illustrates an example watering plan interface with a sprinkler interface displayed and an activity log tab selected, in accordance with at least one example of the present disclosure.

DETAILED DESCRIPTION

Figure 1:
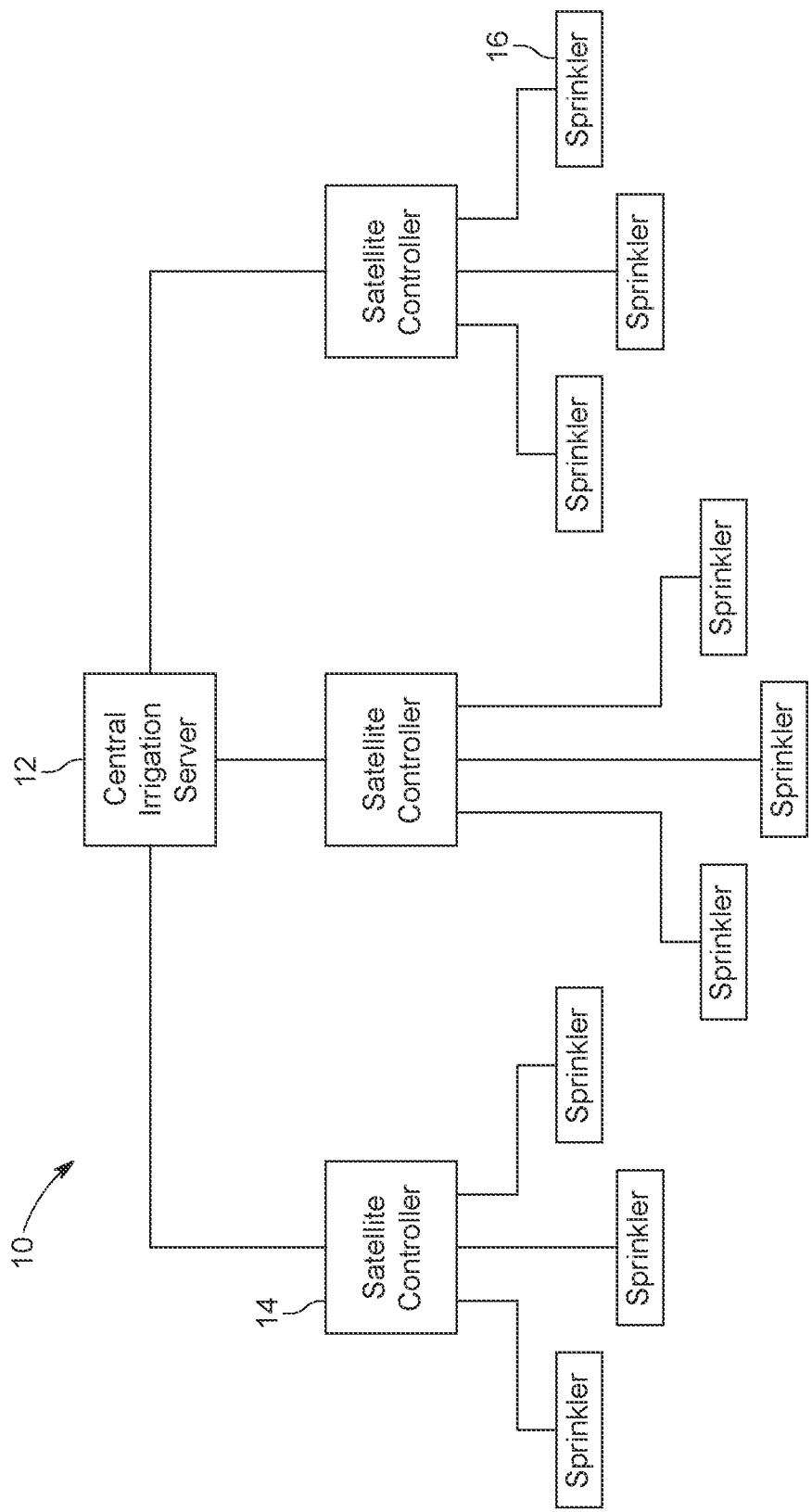
FIG. 1 illustrates an example irrigation system, in accordance with at least one example of the present disclosure.

It will be appreciated by persons skilled in the art that the present disclosure is not limited to what has been particularly shown and described herein. A variety of modifications and variations are possible in view of the teachings herein without departing their scope, spirit, or intent.

While different examples may be described in this specification, it is specifically contemplated that any of the features from the different examples can be used and brought together in any combination. In other words, the features of different examples can be mixed and matched with each other. Hence, while every permutation of features from different examples may not be explicitly shown or described, it is the intention of this disclosure to cover any such combinations, especially as may be appreciated by one of skill in the art.

The terminology used in this disclosure should be interpreted in a permissive manner and is not intended to be limiting. In the drawings, like numbers refer to like elements. Unless otherwise noted, all of the accompanying drawings are not to scale. Unless otherwise noted, the term "about" is defined to mean plus-or-minus 5% of a stated value.

A variety of different software-based systems are presently in use by the central controllers of computerized irrigation systems, which generally provide interactive interfaces capable allowing users to adjust or program various settings of a watering or irrigation scheme. For example, central irrigation controllers may present an entirely text-based interface (e.g., alphanumeric), or graphical user interface including a combination of text, symbols, or graphics, to a user. However, while existing interfaces may employ a variety of different approaches to display information to the user, presently available interfaces are significantly limited in their ability to receive, display, and communicative information pertaining to routine maintenance of the irrigation system or the grounds of a business.

As a result, many businesses that utilize large-scale computerized irrigation systems, such as golf courses, employ several different commercially available software systems to manage day to day maintenance related activities. For example, many golf courses utilize one software system to create and implement an irrigation scheme, and one or more additional software systems or tools to log, archive, and distribute the information necessary to properly maintain the irrigation system and/or turf or other landscaping features. As may be appreciated, the concurrent use of multiple software systems or tools may significantly contribute to the overall complexity, and limit the efficiency, of managing golf courses, arboretums, or other businesses that maintain large areas of highly water-dependent vegetation.

In view of the above, it would be advantageous to provide a software-based system that is capable of both controlling large-scale computerized irrigation systems and managing maintenance-related tasks and communications, such as to help streamline various aspects of grounds facility management and reduce technology-related complexities and inefficiencies. The present disclosure can help to address the above issues, among others, such by providing software that is both adapted for use by both central irrigation controllers, and mobile devices communicatively interconnected therewith, and adapted to implement complex watering or irrigation scheme while integrating electronic irrigation notes, tasks, or assignments (e.g., text and/or image based tags, notifications, or messages) that describe or indicate issues with vegetation or irrigation system components.

These electronic irrigation notes can, for example, be linked or assigned to specific users within a grounds-maintenance network, specific hardware components such as individual sprinklers or valves, or specific geospatial positions located about the grounds of a business. Additionally, these electronic irrigation notes can be saved to a central server or remote storage device, from which they are sorted, categorized, and accessed and/or edited by other users to create detailed and collaborative electronic irrigation note histories or activity logs, and may be linked to various hardware components or specific geospatial areas. In view of the above, the irrigation control software of the present disclosure can help to significantly improve the efficiency with which important information related to any aspect of irrigation system or landscaping maintenance can be logged, recalled, and distributed to relevant personnel.

Irrigation System Background

FIG. 1 illustrates an example irrigation system 10, in accordance with at least one example of the present disclosure. The irrigation system 10 may include a central irrigation server 12, which may be a local computer or server including any of the various aspects or features of the computer system 22 described with respect to FIG. 2 below. In some examples, the central irrigation server 12 may be communicatively connected (e.g., via various wired or wireless means) to a plurality of satellite controllers or two-wire communication gateways 14. Each satellite controller or gateway of the plurality of satellite controllers or gateways 14 may be connected to a valve in one or more of a plurality of sprinklers 16 of the irrigation system 10.

The central irrigation server 12 may wirelessly communicate watering or irrigation schedule information to an appropriate satellite controller or gateway of the plurality of satellite controllers or gateways 14 via various techniques known in the art. In turn, the satellite controller or gateways 14 may cause the plurality of sprinklers 16 to water physical terrain proximal thereto according to the watering or irrigation schedule of the central irrigation server 12. In this way, the plurality of satellite controllers 14 may determine when each of the plurality of sprinklers 16 distributes water to an area of physical terrain located proximally thereto.

Typically, satellite controllers will selectively supply power to a valve within a sprinkler or a valve supplying a water to a sprinkler. Hence, the valve may be opened or closed when powered or unpowered.

Gateways typically supply current over two wires and then modify aspects of the current to transmit data. Decoders are typically connected to valves within sprinklers 16 or to nearby valves that supply water to one or more sprinklers 16. When these decoders receive a command to water, they open the valve they are connected to, causing water to flow from one or more sprinklers 16.

The irrigation control server 12 may include irrigation control software that is executable by a processor thereof, to enable the central irrigation controller 12 to implement various methods and techniques in accordance with this disclosure. In some examples, the irrigation control server 12 may be a local computer storing data (e.g., local to the irrigation site), including executable irrigation control software, in a locally attached storage device (e.g., in an attached hard drive). In some examples, the irrigation control software, or any software described herein, may be executed, and stored on a storage device on a remote server. In such an example, any network connected device, such as a remote computer, tablet, phone, or similar device, may display an interface of the central control server 12 via a webpage over the internet or the network 28, as well as a display and input mechanism (e.g., keyboard/mouse) directly connected to the central control server 12. In some examples, processes, methods, algorithms, and similar aspects of the irrigation control server 12 may be partially executed on a local computer (e.g., local to the irrigation site) and partially executed on a remove server (i.e., remote from the irrigation site).

Figure 2:
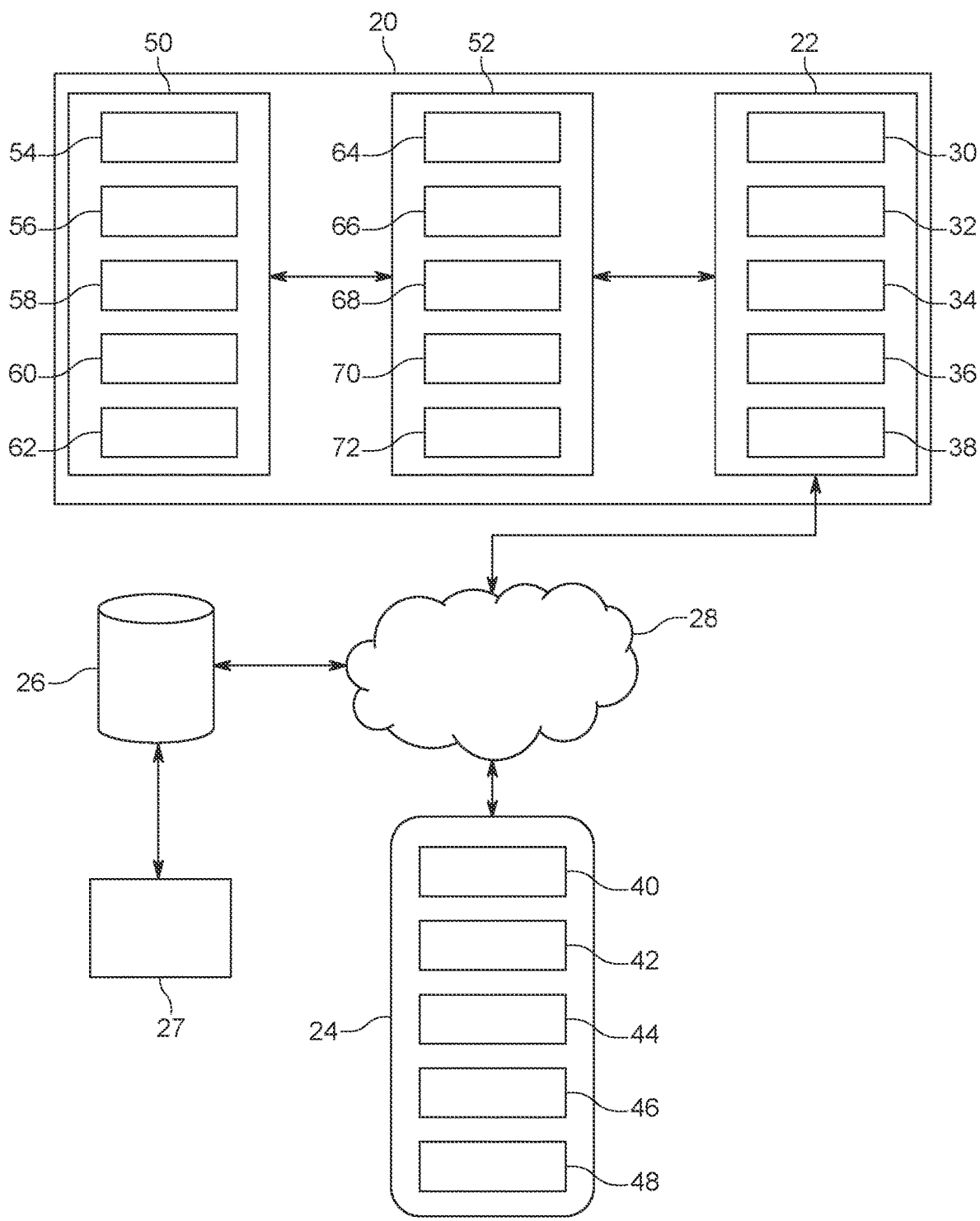
FIG. 2 illustrates an example irrigation system in network communication with a mobile device, a remote storage device, and a remote server over a network, in accordance with at least one example of the present disclosure.

FIG. 2 illustrates an example irrigation system 20 including a central controller 22 in communication with a mobile device 24, a remote storage device 26, and a remote server 27, over a network 28. The central controller 22 may be, or may not be component of, the central irrigation server 12 (FIG. 1). The central controller 22 and the mobile device 24 may each enable a user to perform any of the methods or techniques of the present disclosure. Each of the central controller 22 or the mobile device 24 may operate as an independent device or may be networked to other systems or devices. In a networked configuration, the central controller 22 may operate as a server machine, a client machine, or both, such as in server-client network environments. In one example, the central controller 22 may act as a peer machine in a peer-to-peer (P2P), or any distributed network environment.

The central controller 22 may be realized in the form of a personal computer ("PC"), an electronic tablet, a personal digital assistant (PDA), a set-top box (STB), a network router, a web appliance, a switch or bridge, or any other device or system capable of executing instructions that cause or specify actions to be taken by that device or system. Further, while only a single box representing the central controller 22 is illustrated, the term "central controller" or "central computer" is to be taken as including any collection of devices that may individually, or jointly, execute one or more sets of instructions to perform any of the methods or techniques of the present disclosure, such as cloud computing, software as a service ("SaaS"), other computer cluster configurations.

The mobile device 24 may be a mobile phone (e.g., a smartphone), an electronic tablet, a personal digital assistant (PDA), or any mobile device or computing system capable of executing instructions that cause or specify actions to be taken by the mobile device. The central controller 22 may include, among others, a processor 30, a memory 32, an input/output system ("I/O") 34, a global positioning system 36 ("GPS"), and a communication module 38. Similarly, the mobile device 24 may include, among others, a processor 40, a memory 42, an input/output system ("I/O") 44, a global positioning system 46 ("GPS"), and a communication module 48.

The processor 30 and the processor 40 may, for example, each be representative of a central processing unit ("CPU"), a graphics processing unit ("GPU"), a hardware processor core, or a combination thereof. The memory 32 and the memory 42 may be representative of a main memory and a static memory, some or all of which can communicate with each other via an interlink (e.g., bus). The memory 32 and the memory 42 may further be representative of a storage device (e.g., a drive unit) of the central controller 22 and the mobile device 24, respectively, including a machine-readable medium on which the irrigation controller software (e.g., one or more sets of data structures or instructions embodying or utilized by any one or more of the method, techniques, or functions of the present disclosure) of the present disclosure is stored.

The irrigation control software of the present disclosure may also reside, completely or partially, within the main memory or the static memory of the memory 32, within the main memory of the static memory of the memory 42, or within the processor 30 or the processor 40, during execution thereof by the central controller 22 or the mobile device 24, respectively. In further examples, any combination of the processor 30 or the processor 40, the main memory or the static memory of the central controller 22 or the mobile device 24, or the storage device of the central controller 22 or the mobile device 24 may constitute machine-readable media. In some examples, the memory 32 and the memory 42 may also include cloud-based memory storage. While the memory 32 and the memory 42, and by extension, the machine readable medium thereof, are each illustrated as a single boxes in FIG. 2, it is to be appreciated that the term "machine readable medium" as used herein also includes a single medium or multiple mediums or media (e.g., a centralized or distributed database, or any associated caches or servers) configured to store the irrigation control software of the present disclosure.

Additionally, as used in the present document, the term "machine readable medium" is to be taken as including or encompassing any medium that is capable of storing, encoding, or carrying instructions (e.g., software) for execution by the central controller 22 or the mobile device 24 to perform any one or more of the method or techniques of the present disclosure, or that is otherwise capable of storing, encoding or carrying data structures used by, or associated with, such instructions. Some non-limiting machine-readable medium examples may include, among others, solid-state memories, or optical and magnetic media.

The I/O system 34 and the I/O system 44 may include, among others, a display unit (e.g., a screen), an alphanumeric input device (e.g., a keyboard), and a user interface (UI) navigation device (e.g., a mouse). In some examples, the display unit, the alphanumeric input device, and the UI navigation device can be a touch screen display. The GPS system 36 and the GPS system 46 may each be a GPS sensor or receiver, such as locatable by a global position system (GPS) based on GPS satellite signals as well known in the art. Alternatively, geospatial positioning of the mobile device 24 or the central computer 22 may be determined by triangulating a position thereof based on the signal strengths of at least two wireless communications transceivers, as described in U.S. Pat. Nos. 6,694,142; 4,926,161; and 6,826,162; the contents each of which are hereby incorporated by reference.

The central controller 22 or the mobile device 24 may further include a variety of additional features not specifically discussed above, such as, but not limited to, a signal generation device (e.g., a speaker), a camera, a haptic feedback device (e.g., a vibration motor, linear actuator, etc.) and one or more sensors including, for example, a compass, accelerometer, or various other sensors known in the art for mobile devices or personal computers. In some examples, the central controller 22 or the mobile device 24 may include an output controller, such as a serial (e.g., Universal Serial Bus (USB), parallel, or other wired or wireless (e.g., infrared (IR), near field communication (NFC), etc.) connection to communicate or control one or more peripheral devices (e.g., a printer, card reader, etc.).

The instructions (e.g., the irrigation control software) of the present disclosure may be transmitted or received, over the network 28 using a transmission medium provided by the communication system 48 of the mobile device 24 or the communication system 38 of the central computer 22. For example, the communication system 34 or the communication system 46 may be representative of a network interface device utilizing any of a number of transfer or communication protocols, such as, but not limited to, frame relay, internet protocol ("IP"), transmission control protocol (TCP), user datagram protocol (UDP), or hypertext transfer protocol ("HTTP). The term "transmission medium" as used in the present document is to encompass any intangible medium that may store, encode or carry instructions for execution by an electronic device or system, and includes digital or analog communications signals or other intangible medium to facilitate communication of software.

Example communication networks represented by the network 28 may include, for example, but not limited to, a packet data network (e.g., the Internet) a wide area network (WAN), a local area network (LAN), a mobile telephone network (e.g., cellular network), or a wireless data network, for example, but not limited to, the Institute of Electrical and Electronics Engineers ("IEEE") 802.11 family of standards, also known as Wi-Fi®, the IEEE 802.16 family of standards, also known as WiMax®, the IEEE 802.15.4 family of standards, Bluetooth (e.g., Bluetooth Low Energy (BLE), "LoRa", or "LoRaWAN", or peer-to-peer (P2P) networks. In further examples, the communication system 36 and the communication system 46 may include one or more physical jacks (e.g., Ethernet, coaxial, or phone jacks) or one or more antennas to connect to the network 28. In some examples, the communication system 38 or the communication system 48 may also include a plurality of antennas to wirelessly communicate using at least one of single-input multiple-output (SIMO), multiple-input multiple-output (MIMO), or multiple-input single-output (MISO) techniques.

The irrigation system 20 may include at least one sprinkler 50, and in some examples, a satellite controller or gateway 52. Each of the sprinkler 50 or satellite controller/gateway 52 may operate as an independent device or may be networked to other systems or devices. The sprinkler 50 may be, for example, representative of each of the plurality of sprinklers 16 described with reference to FIG. 1 above. Similarly, the satellite controller or gateway 52 may be, for example, representative each of the plurality of satellite controllers or gateways 14 described with reference to FIG. 1 above.

The satellite controller or gateway 52 may generally include some or all of the features or capabilities described with respect to the mobile device 24, such as, but not limited to, a processor 64, a memory 66, an input/output system ("I/O") 68, a global positioning system 70 ("GPS"), and a communication module 72 each of which may be similar or different to the processor 40, the memory 42, the input/output system ("I/O") 44, the global positioning system 46 ("GPS"), and the communication module 48. In some examples, the communication module 72 may be different from the communication module 48, at least in that it may include terminals that selectively supply power to water valve that is connected to multiple sprinklers, or to a water valve of each sprinkler of the plurality of sprinklers 16 (FIG. 1).

In such examples, the communication module 72 may support command protocols of more conventional electric solenoid interface (e.g., selectively applying 24 VAC (e.g., alternating current) at 1 amp), as well as more complicated communications protocols that may support two-wire physical power line communication for operational control of the sprinkler 50. In some examples, the communication module 72 may include or function as a gateway or a protocol converter to connect two networks (e.g., the central irrigation controller 22 and each sprinkler 50) that may work upon different networking models or communication protocols. Hence, a "satellite controller" may include a gateway component within it and/or traditional protocols of selectively applying power to specific sprinklers/valves.

In some examples, the sprinkler 50 may include a solenoid valve that opens or closes when power when power is supplied to it, causing water to spray from a nozzle of the sprinkler.

In some examples, the sprinkler 50 may include a two-wire decoder that receives power and communications from two wires connected between it and a gateway. When an irrigation command is received, the decoder causes a solenoid valve within the sprinkler to open and therefore water to spray from a nozzle of the sprinkler. Two-wire decoders typically include a processor or microcontroller, as well as memory to receive communications and cause irrigation from the sprinkler 50.

In some more complicated examples, the sprinkler 50 may include a microprocessor 54 that controls various electrical components of the sprinkler 50. For example, such electrical components may include a stepper motor component 56 which controls the rotation of a nozzle base (the portion of the sprinkler 50 containing a sprinkler nozzle), a solenoid driver component 58 that may actuate a valve inside the sprinkler 50 to begin or end irrigation, a sensor component 60 that may sense the nozzle position (rotational position and horizontal position), and a communication component 62 that may send and receive data between the satellite controller 52, other sprinklers, or in some examples, the central controller 22. In some examples, the microprocessor 54 and the communication component 62 may be components of a two-wire decoder for accepting power and communication signals, which may selectively power to the solenoid driver component 58 to cause the valve inside the sprinkler 50 to open or close.

In the operation of some examples of the irrigation system 20, command signals from either the central controller 22 or the satellite controller/gateway 52 are addressed to an individual sprinkler, such as the sprinkler 50 of the plurality of sprinklers 16 (FIG. 1) and received by the communication component 62 thereof. The microprocessor 54 may then process the command signals and actuate an appropriate component of the sprinkler 50. For example, a watering command signal delivered from the central controller 22 may cause the microprocessor 54 to activate the solenoid driver component 58 to open an internal water valve of the sprinkler 50, causing the nozzle base to rise from the sprinkler body and water to exit the nozzle. In some such examples, a watering arc may be manually set or otherwise adjusted by a user. In other examples, the microprocessor 54 may send watering arc control data to the stepper motor component 56 to determine a specific arc and rotation speed that the stepper motor should move the nozzle through.

The microprocessor 54 may also simultaneously interrogate the sensor component 60 for data on the position of the nozzle base (e.g., the vertical position, the rotation position, or the rotational speed). Thus, the sprinkler 50 may execute received watering or irrigation signal commands that are sent to it by the central controller 22, such as via the satellite control 52, or any other device in communication with the satellite controller 52 or directly with the sprinkler 50 via the network 28, such as the mobile device 24. Optionally, the sprinkler 50 or the satellite controller 52 may transmit sensor feedback back to the central controller 22 or the mobile device 24 (e.g., did the sprinkler popup, did the sprinkler rotate, how long did the sprinkler run, how many cycles or rotations through the desired arc did the sprinkler make, what was the water pressure at the sprinkler, what was the flow at the sprinkler, etc.).

The remote storage device 26 may be representative of any remote storage device or system configured for use by authorized users of a business, such as a golf course. In some examples, the remote storage device 26 may be a cloud database deployed, delivered, and accessed via cloud computing (e.g., the internet). The remote storage device 26 may organize and store structured, unstructured, and semi-structured data in a manner similar to a physical database. The remote storage device 26 may be, for example, but not limited to, a managed database-as-a-service (DBaaS) or deployed on a cloud-based virtual machine (VM). The remote storage device 26 may, in some examples, constitute a machine-readable medium on which the irrigation control software of the present disclosure (e.g., one or more sets of data structures or instructions utilized by any device embodied by any method or technique herein) is stored.

In one example, the remote storage device 26 may include any irrigation control software executable by a processor of the remote server 27, as well as a database containing data (e.g., software settings, irrigation site settings, irrigation data, and similar data) directly connected to the remote server 27. The remote storage device 26 may also, in some examples, function as a private inter-business server storing, among others, employee work schedules or other data that may enable the central controller 22 or the mobile device 24 to make determinations about when, for example, but not limited to, an employee will be present on the grounds of the business (e.g., a work schedule). In some examples, the remote server 27 may be representative of, for example, a third-party or "outside" (e.g., not proprietary or inter-business) server via the network 28. In some examples, the remote server 27 may enable the central controller 22 or the mobile device 24 to obtain map or satellite information and/or imagery, weather data such as past, present, or forecasted rainfall, humidity, or other weather-related information to automatically adjust or vary an irrigation schedule, or present a text based or graphical suggestion or alert.

Figure 7:
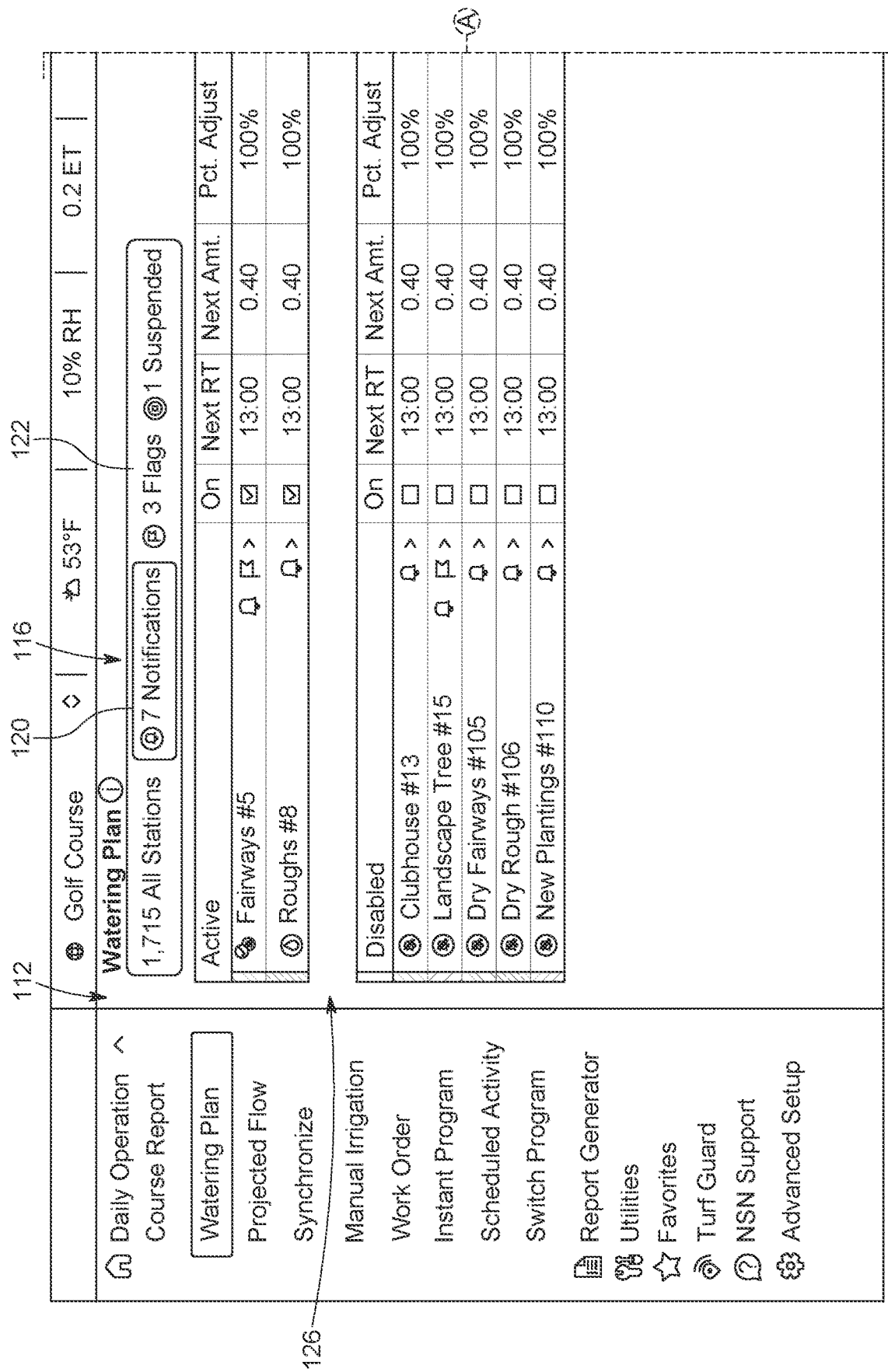
FIG. 7 illustrates an example watering plan interface with a notification tab selected, in accordance with at least one example of the present disclosure.
Figure 7:
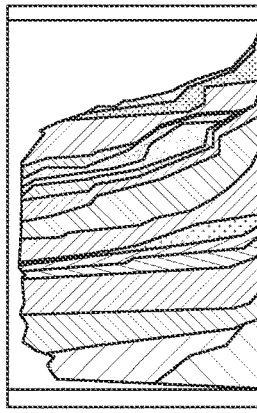
Figure 8:
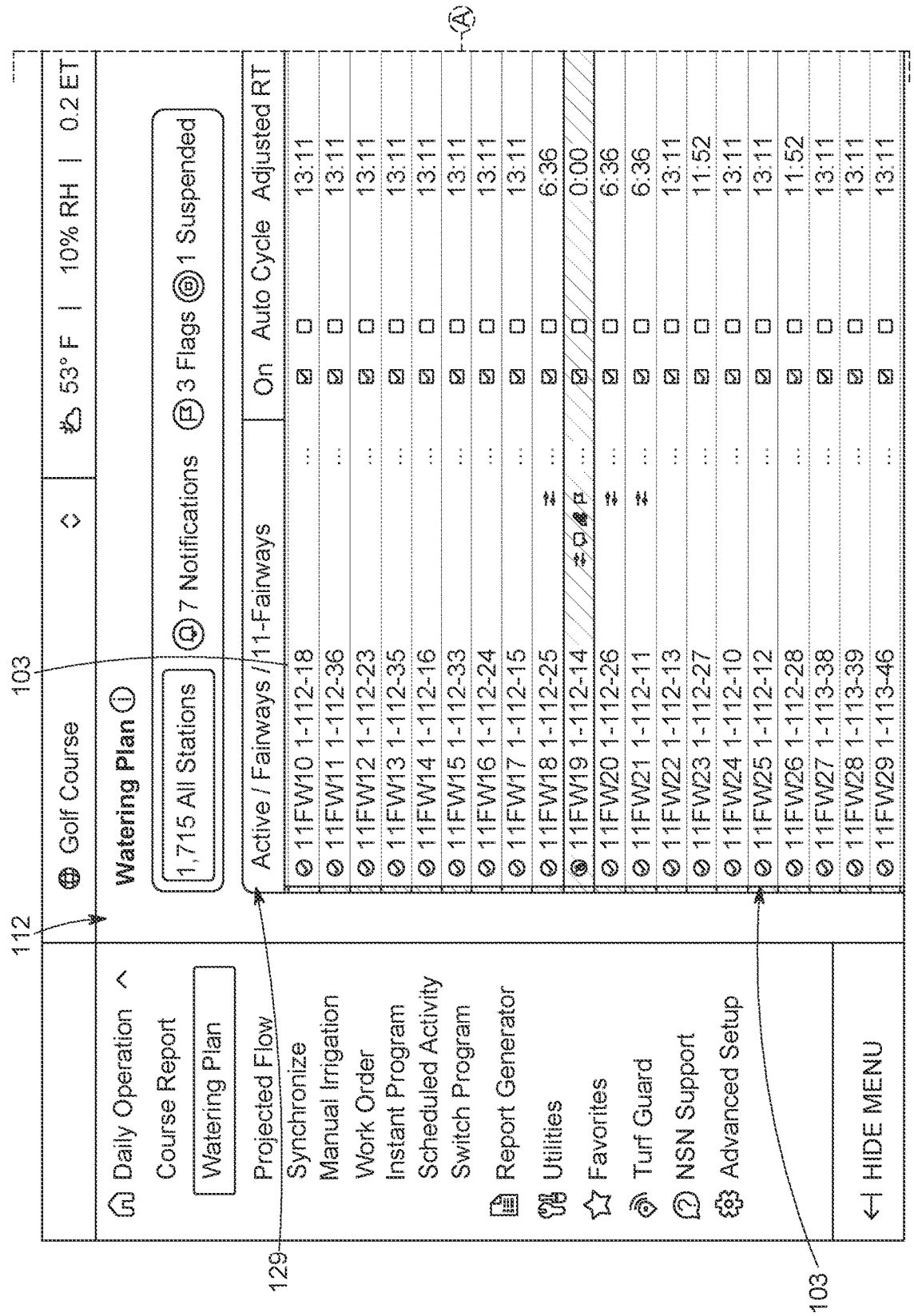
FIG. 8 illustrates a watering plan interface with a sprinkler interface displayed and a note history tab selected, in accordance with at least one example of the present disclosure.
Figure 8:
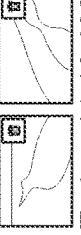

In some examples, the irrigation system 20 may further include any of the components described with respect to FIGS. 7-8 of U.S. Pat. No. 10,743,482 previously incorporated above to enable the central controller 22 to obtain water use or flow data from a water pump station and display the data to on a graphical user interface. This may allow a user to, or the central controller 22 to automatically, create an electronic irrigation note (e.g., information such as text and/or image(s) associated with at least one of one or more identifiers 103) in response to, or at least partially based thereon. In some examples, the irrigation system 20 may further include any of the components described with respect to FIGS. 7-8 of U.S. Pat. No. 10,743,482 previously incorporated above, to enable the central controller 22 to obtain soil moisture data from a plurality of moisture or soil sensors, to utilize to obtain soil moisture data and display the data to on graphical user interface.

This may allow a user to, or the central controller 22 to automatically, create an electronic irrigation note in response to, or at least partially based thereon. In view of all the above, each of the central controller 22, the mobile 24, the sprinkler 50, and the satellite controller or gateway 52 may, in various examples or combinations, communicate with each other via the same or a combination of network protocols, and with other devices via the communication network 28, and may be configured to perform operational functions including, among others, data display and entry, data or signal processing, data or signal transmitting, and geospatial location.

Electronic Irrigation Note Interface

Turning now to the central controller control software of the present disclosure, the central controller software (hereinafter "software") may provide various graphical user interfaces, such as those shown in FIGS. 4-13 and 31-33, each configured to enable users to monitor, manage, and control a wide range of settings of a watering or irrigation schedule implemented by the central controller 22 and/or the central irrigation server 12, or in some examples, at least partially by the satellite controller 52 (FIG. 2) (e.g., the plurality of satellite controllers 14) or the mobile device 24 (FIG. 2). Many aspects of the graphical user interfaces described below are detailed in U.S. Pat. Nos. 7,584,023, 9,192,110, 10,231,391, or 10,743,482, each of which is hereby incorporated by reference in its entirety.

However, in contrast to the disclosure of the patents listed above, the software of the present disclosure provides users with an ability to, using various graphical user interfaces, create and save electronic irrigation notes (e.g., information such as text and/or image(s) associated with at least one of one or more identifiers 103) to a central location, such as the remote storage device 26 (FIG. 2). Generally, the present specification will first discuss an example interface for creating, editing, and inputting data into an electronic irrigation note. Subsequently, various example interfaces will be discussed that allow the electronic irrigation notes (or abbreviated portions thereof) to be viewed, sorted, represented by icons/colors/symbols, accessed, or initiated/created.

The discussion of the various interfaces in this specification describes aspects of inputting data and accessing data. In some examples, this means that the software is storing data in one or more databases, such as a single master database or log file, or as a plurality of individual files. This database or log file may be subsequently accessed by various aspects of the software to, for example, display data from a saved electronic irrigation note, provide suggestions to modify aspects of an irrigation schedule, provide suggestions to perform maintenance at the irrigation site, or perform similar actions. These data files may be stored on the central controller 22 as well as the remote server 27.

Generally, an electronic irrigation note is a group of data logically associated with each other that is stored in a database, a log file, or any other type of electronic file (e.g., individual files for each electronic irrigation note). The electronic irrigation note includes one or more identifiers 103 (e.g., an electronic character string associated with certain irrigation equipment, geolocation data, or personnel data), as described further below. The electronic irrigation note may also include one or more of a text-based message inputted by a user, an electronic photograph, geographic location data (e.g., GPS coordinates), personnel identification, note creation times, and similar data. This data may be stored, accessed, and modified by the software to provide the interfaces discussed in this specification (both for the central controller 22 and mobile device 24).

Figure 3:
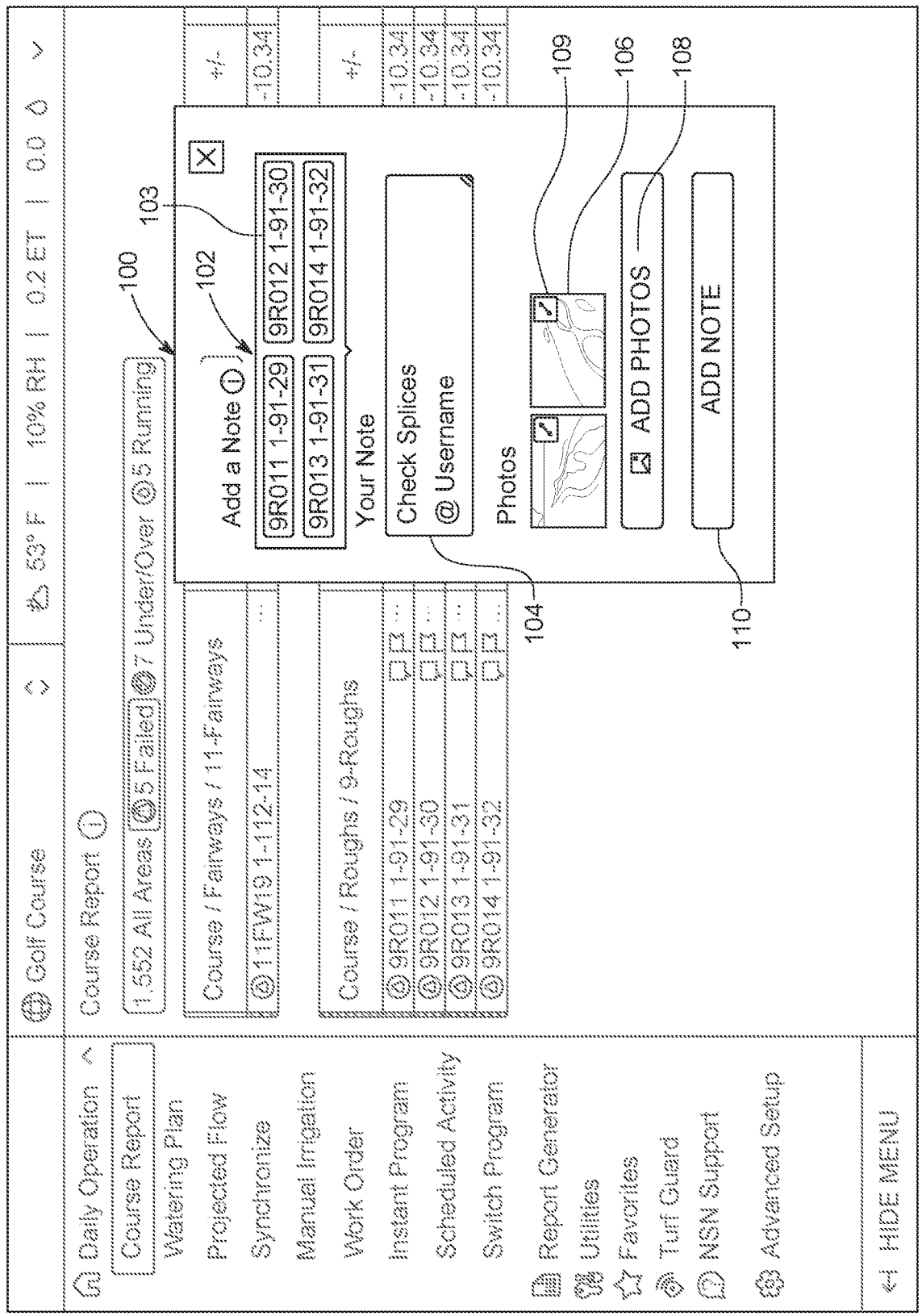
FIG. 3 illustrates an example electronic irrigation note interface, in accordance with at least one example of the present disclosure.

FIG. 3 illustrates an example electronic irrigation note interface 100, in accordance with at least one example of the present disclosure. In some examples, the software may cause the electronic irrigation note interface 100 to be displayed in response to a "click" or "touch" selection (hereinafter a "user input") on, for example, but not limited to, a first note addition object 160 (FIG. 8) accessible through navigation of the watering plan interface 112, a second note addition object 288 (FIG. 32), or a note addition element 289 accessible through navigation of the map view interface 280 (FIGS. 13 and 31-33).

The electronic irrigation note interface 100 may include a first area 102, a second area 104, and a third area 106. The first area 102 may be adapted to display one or more identifiers 103. The one or more identifiers 103 may each display alphanumeric text and/or an icon that, when entered or selected in the first area 102, associates or links the electronic irrigation note interface 100 with the one or more identifiers 103.

The one or more identifiers 103 may generally represent equipment (e.g., irrigation equipment), a geolocation area, or personnel identification (personnel names or numbers). More specifically, the "equipment" (i.e., an irrigation equipment identifier) may include sprinklers, water valves, water pumps, satellite controllers, two-wire gateways, soil moisture sensors, weather stations, irrigation pipes, a central controller, outdoor lighting, power transformers, electrical wiring, lawn mowers, golf carts, and similar items. Any of these items may be further referred to as specific types of identifiers, such as a sprinkler identifier or a satellite controller identifier. Generally, many of the interfaces described in this specification will illustrate sprinkler identifiers, since many irrigation sites include large numbers or sprinklers.

The "geolocation area" (i.e., a geolocation area identifier) may include a single GPS coordinate, a geographic area defined by a plurality of GPS coordinates, and a geographic area predefined in the software (e.g., golf holes, golf tees, golf fairways, etc.) that may or may not be associated with specific GPS coordinates. Again, any of these items may be further referred to as specific types of identifiers, such as a GPS coordinate identifier, a geographic area identifier, a golf hole identifier, or a golf tee identifier.

The "personnel" (i.e., a personnel identifier) may include employees, staff, volunteers, owners, or other people. Personnel may include have predetermined user accounts setup or accessible within the software and/or a remote server 27, allowing for notifications for assignments, changes, or deletions of the electronic irrigation note interface 100. Again, any of these items may be further referred to as specific types of identifiers, such as a personnel identifier, a maintenance worker identifier, or a manager identifier.

Mixed types of the one or more identifiers 103 may also be included, such as both an equipment identifier and a personnel identifier (e.g., a sprinkler identifier and a personnel identifier).

The first area 102 is generally illustrated as a single input area or element where multiple identifiers 103 may be entered. Alternatively, the first area 102 may comprise several different areas that allow input of only certain types of one or more identifiers 103. For example, the previously described equipment (e.g., irrigation equipment), geolocation areas, and personnel identifications (personnel names or numbers), may each have their own separate input areas where only those types of one or more identifiers 103 may be entered.

Figure 9:
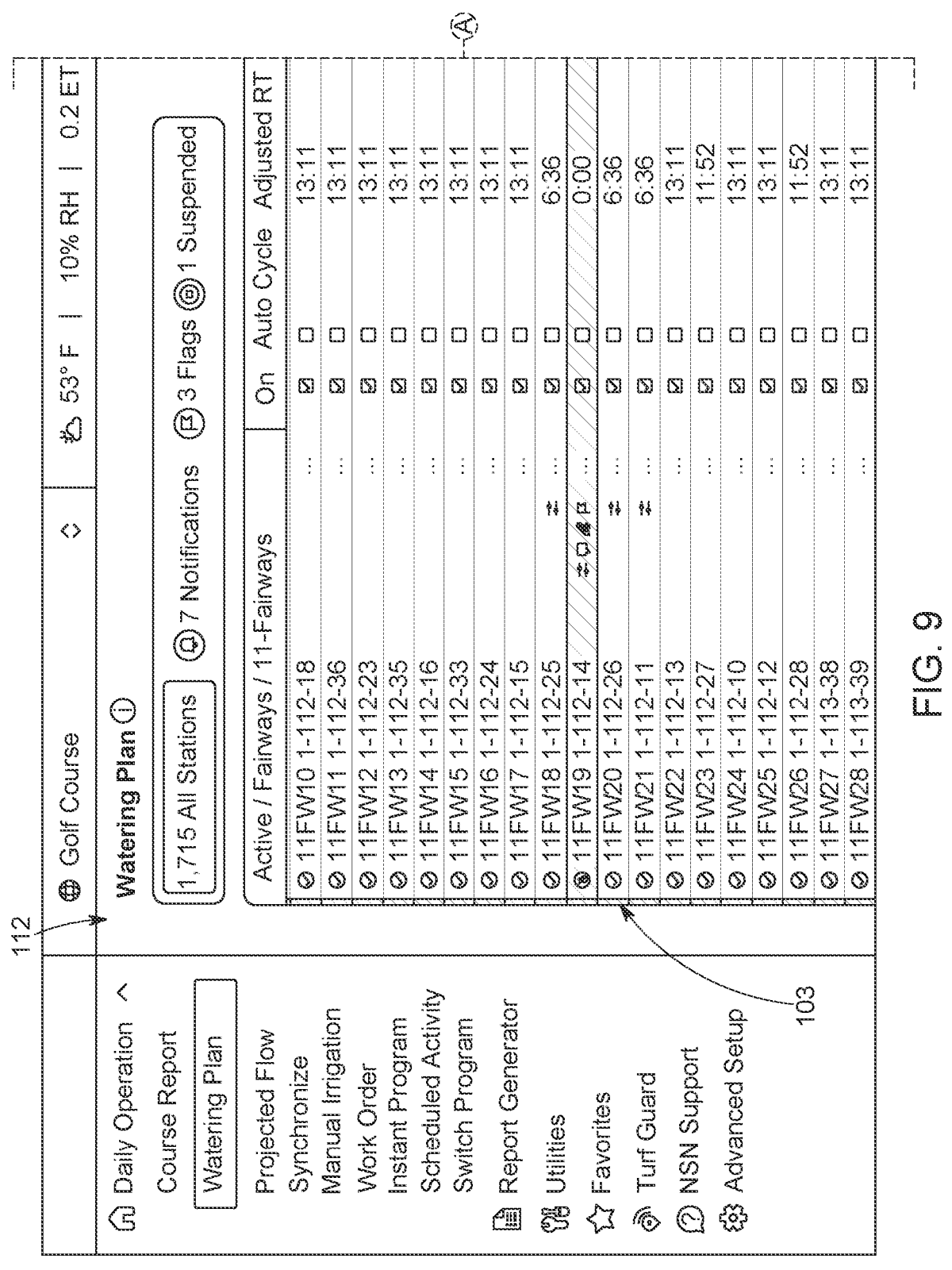
Figure 9:
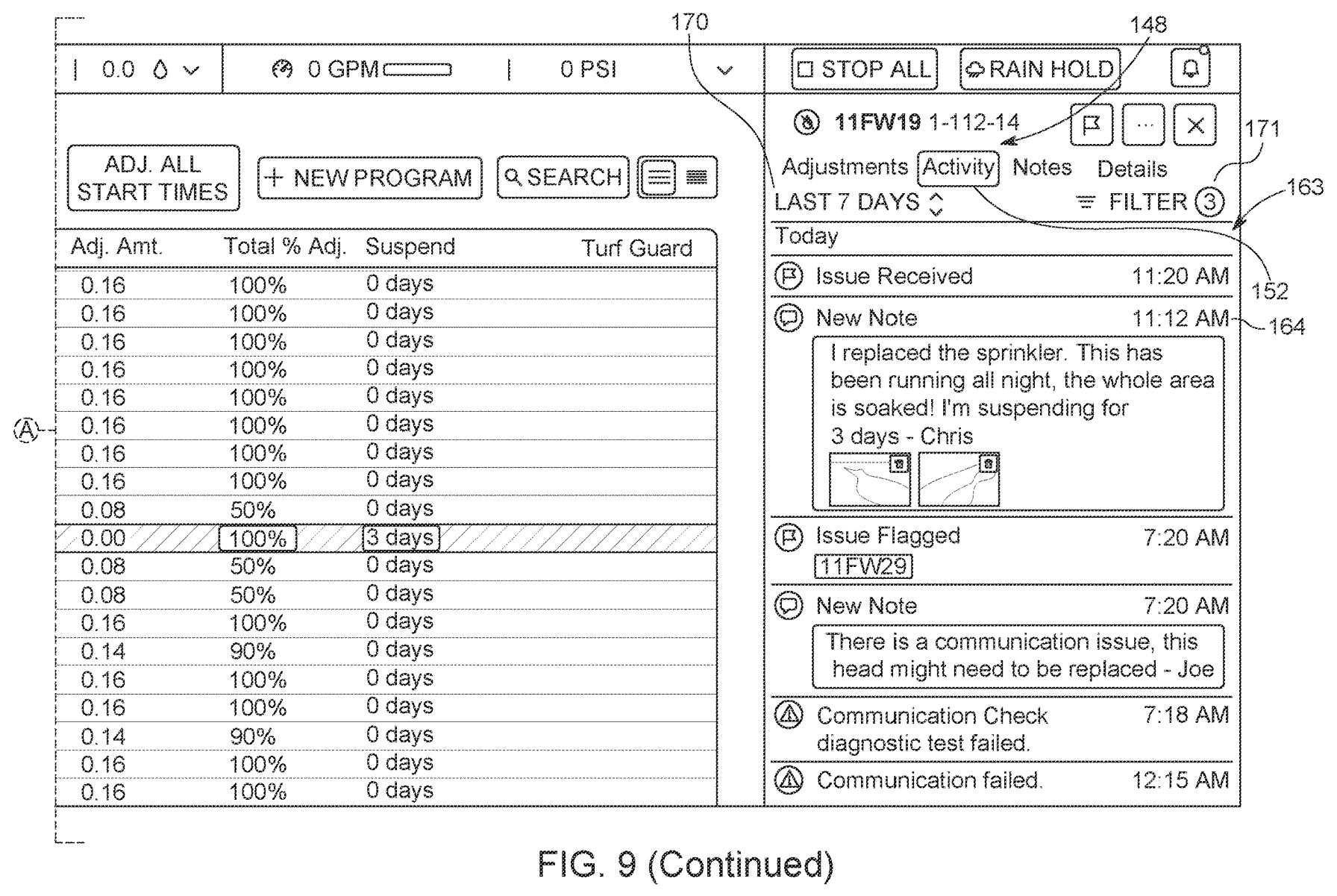
Figure 10:
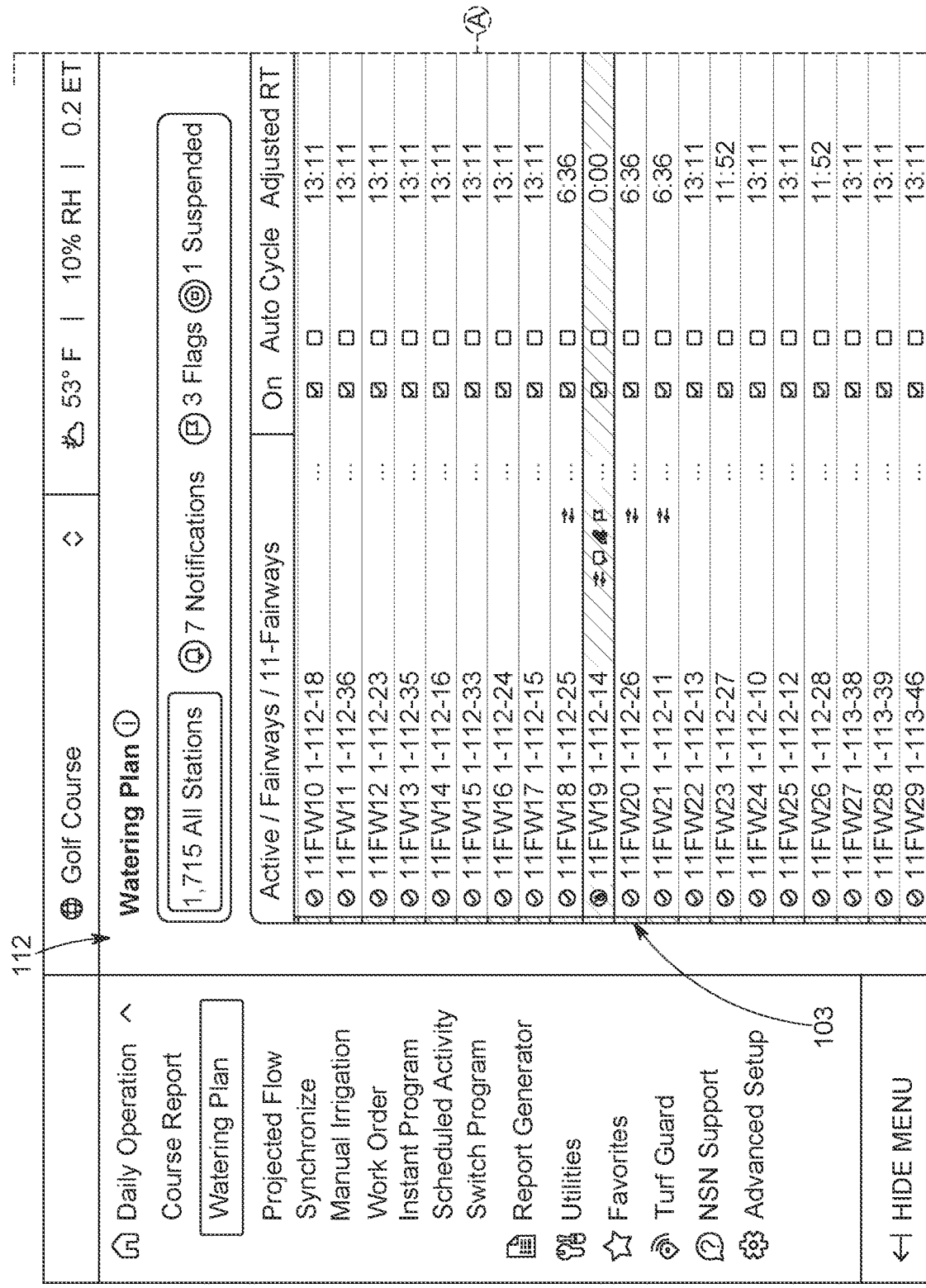
FIG. 10 illustrates an example watering plan interface with a sprinkler interface displayed and an activity log tab selected, in accordance with at least one example of the present disclosure.

In some examples, the first area 102 may be pre-set or filled in automatically via user selection of an individual sprinkler of the plurality of sprinklers, such as shown in in FIGS. 9-10. In other examples, the first area 102 may be an interactive area that, when selected by a user input thereto, may allow a user to manually enter identifying numbers or other text, such as via various inputs to the I/O system 36 (FIG. 2) of the central controller 22. In other examples, the first area 102 may be caused to display a larger map, allowing the user to select a displayed equipment, geographic area (e.g., GPS coordinate(s) or predetermined area), or personnel.

In other examples, the first area 102 may be caused to display a list of various types of the one or more identifiers 103, such as equipment identifiers, geolocation area identifiers, and/or personnel identifiers, which can be sorted and filtered in various ways, such as by alphabetical/numerical order, categories (e.g., the previously noted identifier types), recently used identifiers of the one or more identifiers 103, or note identifiers of the one or more identifiers 103 within a predetermined distance of the user (e.g., within 100 feet of a user's mobile device 24).

Entering one or more identifiers 103 into the first area 102 may trigger the software to perform certain actions, depending on the type of one or more identifiers 103 being entered.

In one example, when an equipment identifier (or other identifier) is entered in the first area 102, the software may lookup the equipment identifier from a database or log file (e.g., a central database or log file on the central controller 22 or the remote server 27) to determine the most recent status of the equipment and optionally displaying a status indicator in the electronic irrigation note interface 100 that indicates a status of the indicator. For example, a text window may be briefly displayed communicating a status (e.g., offline, error, watering, personnel not on duty), a color of the text of the identifier may be changed such as red to indicate an error state of the equipment or green to indicate an operation state of the equipment, or an icon may be displayed.

In another example, when the one or more identifiers 103 include at least one personnel identifier, the software may cause the central controller 22, or in mobile examples, the mobile device 24, to query a database or log file (e.g., a central database or log file on the central controller 22 or the remote server 27) or third-party employee work scheduling software, such as located on, or in, any of the remote server 27 (FIG. 28), the database 26 (FIG. 2), or the central controller 22, and subsequently, display a message, window, table, or any other indication that conveys a work availability (e.g., the days of the week and/or the hours of each day) of the worker identified by the one or more identifiers 103 to the user.

Generally, the second area 104 may be representative of any display or user interface for displaying and enabling user input, and subsequent automatic formatting, of alphanumeric text. In other words, the second area 104 may allow a user to input a text message or electronic irrigation note text message. For example, the second area 104 may be representative of an interactive text box that, when selected by a user input thereto, may allow a user to manually enter or edit text via, among others, various inputs to the I/O system 36 of the central computer 22. For example, users may generally choose to enter text into the second area 104 that is descriptive of a condition, issue, or a task (e.g., maintenance task) associated with the one or more identifiers 103 (e.g., sprinklers, irrigation equipment, irrigation software, geographical terrain, specific geographic locations, personnel, or similar items).

The second area 104 is generally described as a single text entry box or space for adding a note. Alternatively, an electronic irrigation note may be updated to have several different text entries inputted via second area 104. For example, different users may update a single electronic irrigation note with responses or other comments. Hence, other user interfaces described in this specification that describe various displays of electronic irrigation notes, including any electronic irrigation note text message 165 (e.g., FIG. 8), may display multiple electronic irrigation note text message 165 per electronic irrigation note. Optionally, each electronic irrigation note text message 165 may include a user name and/or time stamp indicated a creation date of the electronic irrigation note text message 165.

In some examples, one or more sprinklers, or any other irrigation equipment item identified by the one or more identifiers 103, may need to be repaired, physically adjusted, installed, replaced, or removed; and proof of the completion of any such maintenance tasks may need to be confirmed. In such an example, the text of the second area 104 may describe a physical condition or problem for any irrigation equipment items including, but not limited to, (1) a type of physical damage, such as a cracked housing or a severed communication wire or cable, (2) a needed physical adjustment, such as a nozzle change or an arc adjustment, (3) a type of repair to be made, such as total replacement or component(s) to be replaced, (4) a physical status (e.g., a repair status or state). Such text may also request that a user confirm that the maintenance or repair task has been completed (e.g., by adding text to the second area 104 or through use of a status element 161 or 461 (FIG. 8 or 19)).

One specific example of creating and performing such an irrigation task comprises causing the software to display the electronic irrigation note interface 100. One or more identifiers 103 are added to the first area 102, including an identifier 103 associated with equipment, geographic area, or other irrigation task that is to be performed. Optionally further adding one or more identifiers 103 associated one or more personnel for completing the irrigation task. A text description of the objective, goal, or directions for the irrigation task are entered into the second area 104. Any photos are optionally added to the third area 106. The electronic irrigation note is saved via the saving object 110 to a database or log file. An assigned personnel (e.g., via identifier 103) views the electronic irrigation note (e.g., via a mobile device via software that accesses the database or log file to view the electronic irrigation note) and performs the task. Finally, the assigned personnel edits the electronic irrigation note, such as via software on a mobile device or central controller, to indicate the task has been completed. This may include modifying the status indicator 161 to a status indicating completion of the task (e.g., "completed") and/or by further editing the text of the second area 104.

Figure 11:
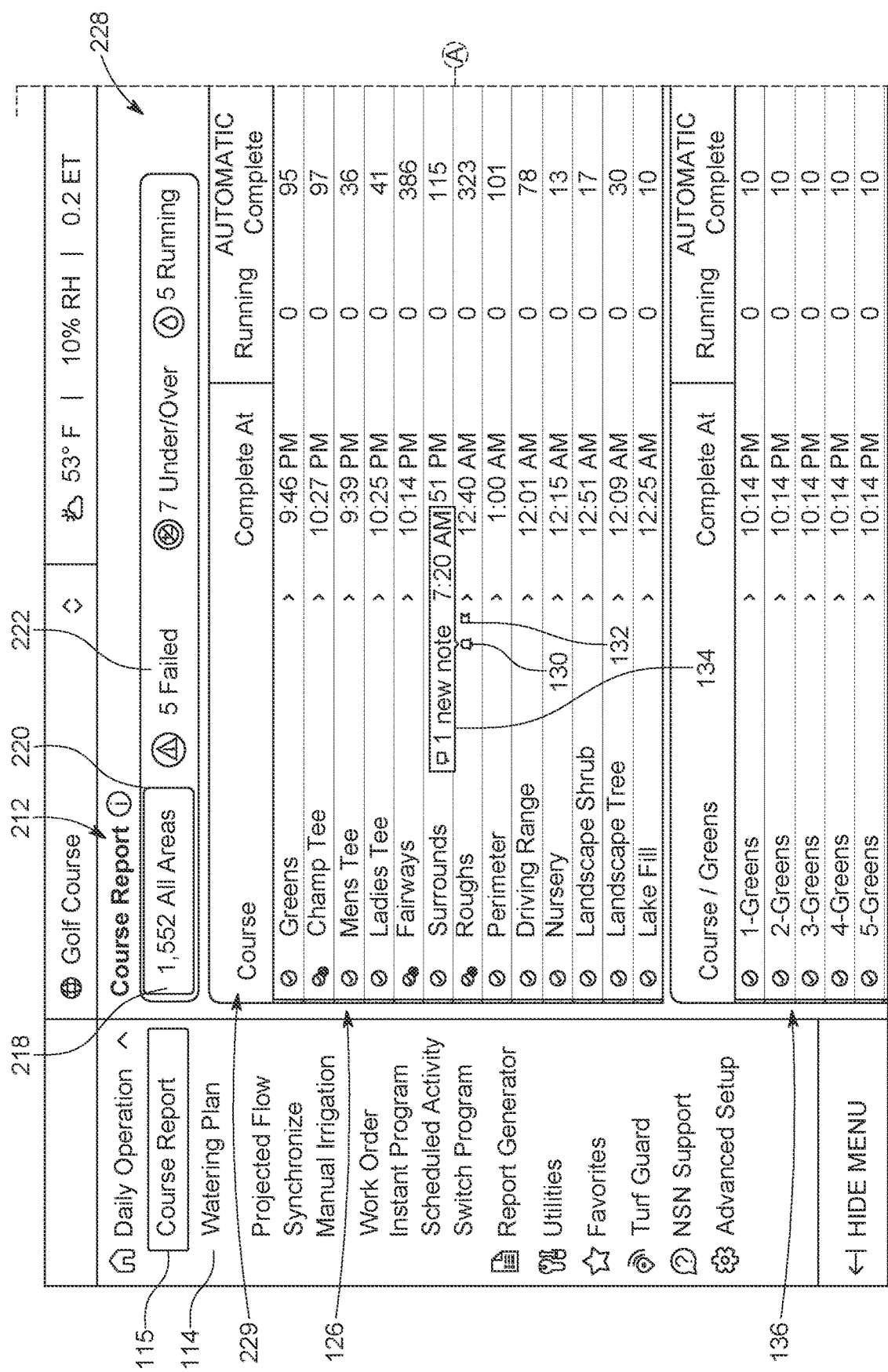
FIG. 11 illustrates an example course report interface with a maintenance log display, in accordance with at least one example of the present disclosure.
Figure 12:
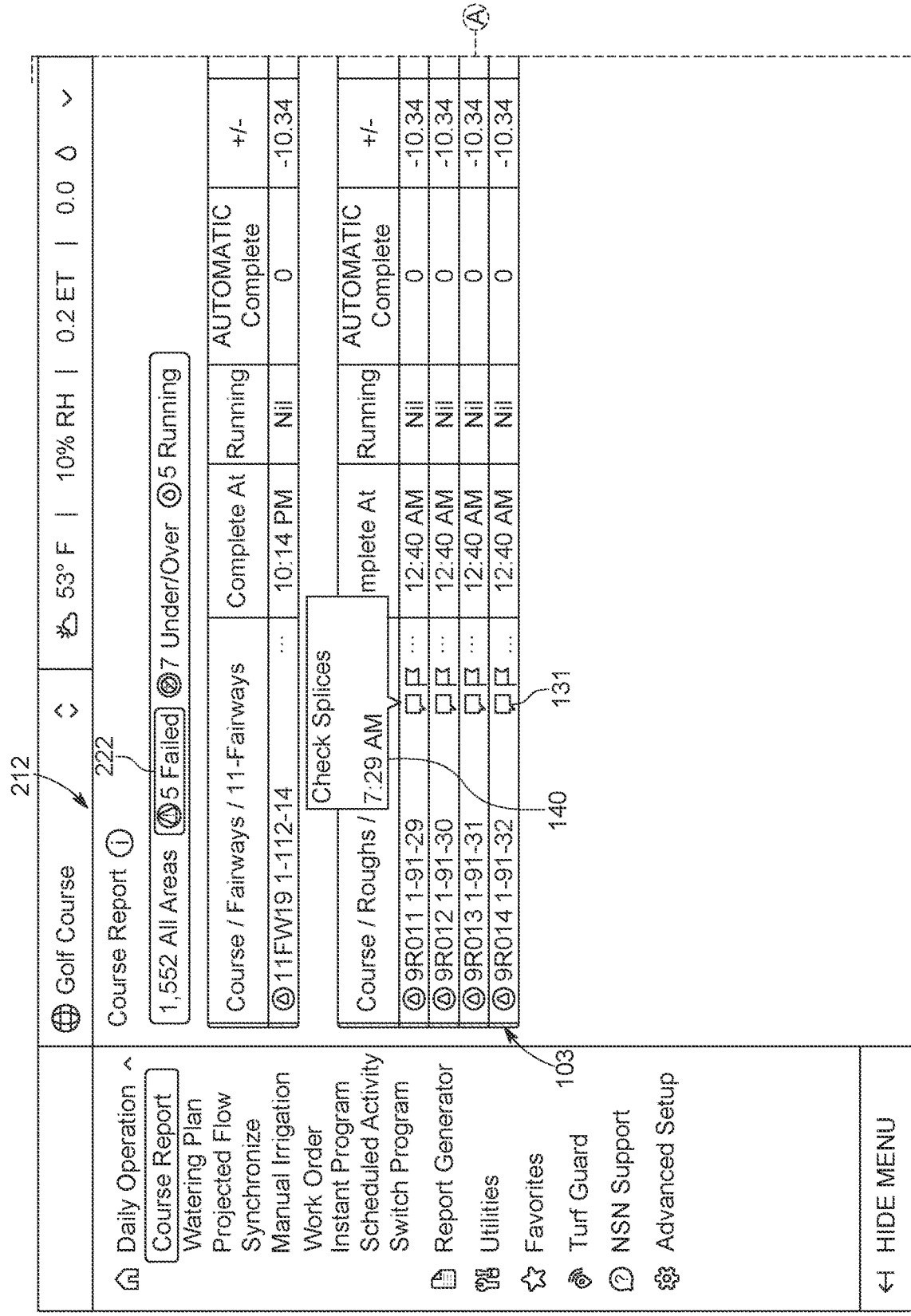
FIG. 12 illustrates an example course report interface with a failure tab selected, in accordance with at least one example of the present disclosure.
Figure 13:
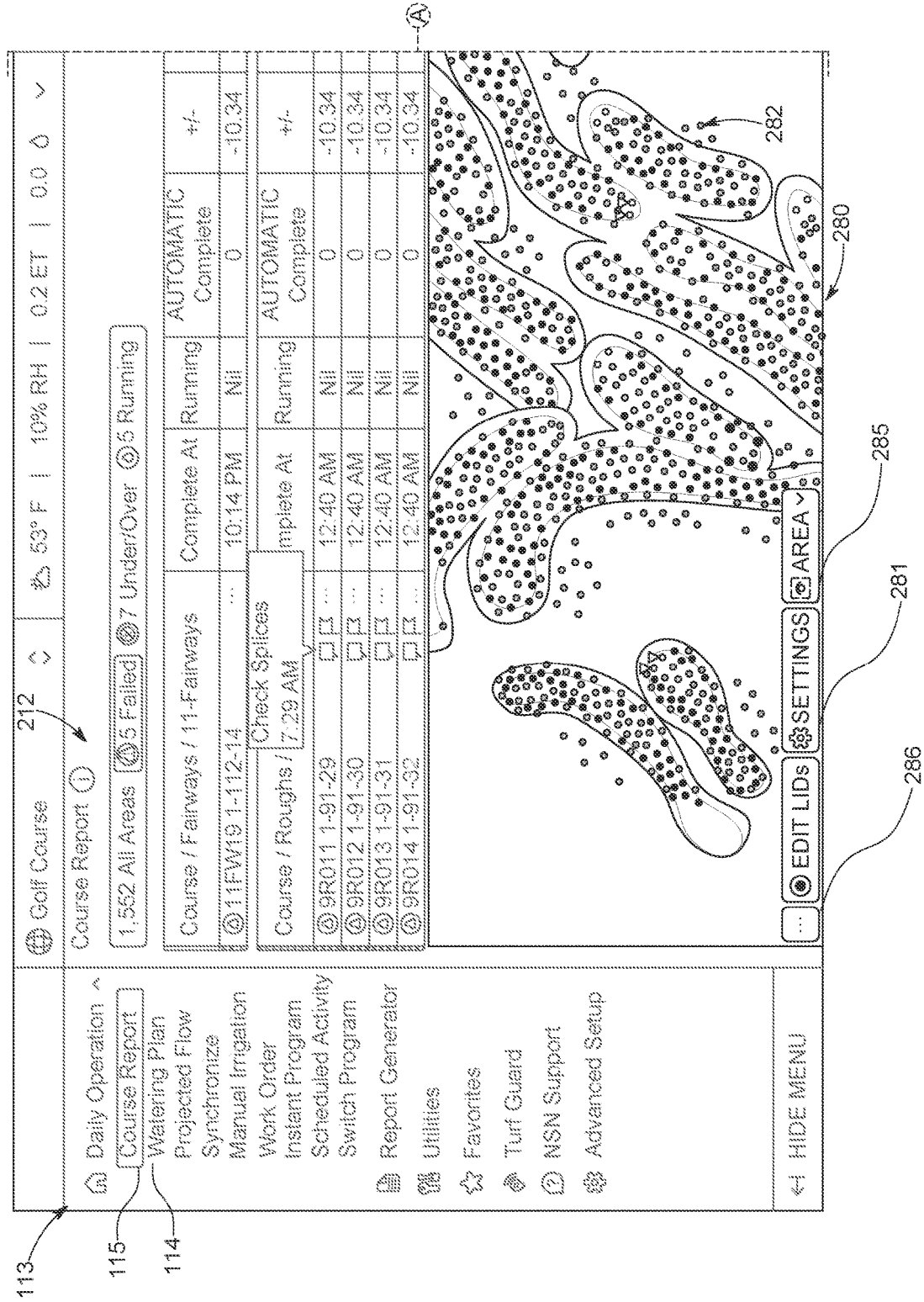
FIG. 13 illustrates an example course report interface with a map view display open, in accordance with at least one example of the present disclosure.

In another example, an irrigation schedule may need to be adjusted or changed for various reasons. In such an example, the text of the second area 104 may describe a desired software change including, but not limited to, inches of water to be applied to an area, a percentage adjustment, a change to a scheduled start or end time, an watering or rotation arc for a sprinkler, or which weekdays are active, such as based on various metrics including, but not limited to, recent rainfall amounts, soil moisture sensor values, evapotranspiration values, or any physically observed characteristics of turf of other landscaping features. In some examples, such adjustments may be made using, or based on, a plurality of information or control columns 128, or various other features, of a watering plan interface 112 (FIGS. 4-10) or a course report interface (FIGS. 11-13).

In another example, observed physical needs of various landscaping features may need to be addressed. In such examples, the text of the second area 104 may be used to describe various tasks concerning, for example, but not limited to, (1) a flooded area, (2) downed or broken tree branches or other debris, (3) a plant disease, (4) an overly dry area, (5) a damaged area of turf having many divots, (6) or an area of turn needing seeding, gardening, or other landscaping work. In one such example, the text of the second area 104 may include instructions or directions for an assignee to physically travel to, observe, and then report back on (via additional text entry), one or more sprinklers or other equipment, a geospatial location or rea identified by, the one or more identifiers 103. In a further example, the text of the second area 104 may include instructions or directions for an assignee to review a compiled history of (e.g., an activity log or a note history linked to) one or more sprinklers or other equipment, or a geospatial area identified by the one or more identifiers 103 and provide a maintenance recommendation or action in response.

In a further example, a software-based or wireless communication issue, a hydraulic issue, a water flow issue, or other any other computer-detectable electrical or mechanical issue with components of the irrigation system, may need to be addressed. In such examples, the text of the second area 104 may further describe the issue or may include instructions on how to address the issue. In another example, the text of the second area 104 may simply be information related to a general business communication, such as an observation that sprinklers or other equipment identified by the one or more identifiers 103 are operating properly, a geospatial area identified by the one or more identifiers 103 looks satisfactory or needs mowing or trimming, or further, such as in addition to the one or more identifiers 103, describe how work order or task relates to a specific user (e.g., the assignee of the task or work order).

In some examples, the software may be configured to input, such as through an integration of a recommendation engine of the software, automatically generated text or automatically generated text input options (e.g., suggestions or suggested text), when the interactive text box (e.g., the second area 104) is selected. In one or more such examples, the suggestions or options presented to a user may be based on past text of other electronic irrigation notes stored on the remote storage device 26 (FIG. 2) or the central controller 22, past text frequently entered by an individual user accessing the electronic irrigation note interface 100 the central controller 22, or past computer-generated text routinely used to describe computer detected issues (e.g., maintenance issues or entries of the list of operational events 163 (FIGS. 11-12)). In such examples, the software may access and reference a database or log file (e.g., a central database or log file on the central controller 22 or the remote server 27) and search for or identify relevant information, such as recently used text, then display such information/text in the second area 104.

In another suggestion example, the second area 104 may be automatically populated with text based on the one or more identifiers 103. For example, if one or the one or more identifiers 103 representing an individual sprinkler is added to, or is present in, the first area 102, the text of the sprinkler identifier may be added to the one or more identifiers 103 as well as other text, such as the term "Sprinkler" before the sprinkler identifier. This may allow the user to complete a sentence in the one or more identifiers 103, such as "Sprinkler [identifier text] requires adjustment." If more than one of the one or more identifiers 103 are present in the first area 102, multiple identifiers of the one or more identifiers 103 may be populated into the second area 104. This may allow the user to add only a short amount of text to complete a sentence, such as "Sprinkler [identifier text] requires adjustment by Personnel [identifier text]." In one example, the software may perform this by referring to a database or log file (e.g., a central database or log file on the central controller 22 or the remote server 27) and looking up certain words or sentence templates associated with the one or more identifiers 103, then adding that text or sentence template to the second area 104.

In another suggestion example, the second area 104 may be populated with text based on nearby equipment or geographic areas. For example, if a mobile device 24 is near a sprinkler 50, the one or more identifiers 103 designation for that sprinkler 50 may be automatically populated into the second area 104. In another example, the second area 104 may be automatically populated based on weather data, sensor data (e.g., soil moisture sensor data or rain sensor data), evapotranspiration data, or similar information. Any of these data sets may be obtained via local sensors or from remote third-party data providers (e.g., remote weather websites). For example, if a soil moisture sensor identifier is added to the first area 102 and recent soil moisture data from that soil moisture sensor with that identifier is low, the second area 104 may automatically populate with a message indicating that an irrigation schedule should be adjusted. In one example, the software may perform this by referring to a database or log file (e.g., a central database or log file on the central controller 22 or the remote server 27) and looking up certain words or sentence templates associated with the one or more identifiers 103, then adding that text or sentence template to the second area 104.

In various methods of operation, a user may select, via a user input to, the second area 104 to begin entering text into the second area 104, such as for any of the reasons described above with respect to, for example, but not limited to, physical damage to equipment, software-based issues, physical needs of landscaping or terrain, or general business or facilities management observations. Next, the user may begin typing, such as by adding only a small amount of text, such as one word, that is relevant to a work assignment. For example, a user may type "Personnel," at which point the software may auto-populate the identifier text (e.g., full names and/or unique identification numbers) of any of the one or more identifiers 103 of the first area 102 associated with specific persons. In another example, a user may type a text tagging symbol (e.g., @, #, etc.) into the second area 104, at which point the software may auto-populate the identifier text (e.g., full names and/or unique identification numbers) of any of the one or more identifiers 103 of the first area 102 associated with specific persons.

A user may then continue typing, such as by adding a short amount of text directed to a piece of equipment, such as "Sprinkler" or "Location", at which point the software may auto-populate the identifier text (e.g., unique sprinkler identification numbers and/or GPS coordinates) of any of the one or more identifiers 103 of the first area 102 associated with specific sprinklers or specific geospatial locations or areas. Alternatively, in a mobile example, such as if the user is utilizing the mobile device 24 (FIG. 2), the user may continue typing by adding a short amount of text directed to a piece of equipment, such as "Sprinkler" or "Location", at which point the mobile software may automatically populate any of the one or more identifiers 103 associated with one or more sprinklers, or a specific geospatial location, near the mobile device 24. Next, a user may, in some examples, further continue typing by adding text that is categorically relevant, such as "Issue", at which point the software may suggest a plurality of different text-fill phrases or sentences, such as presented in list format, that each describe a different condition, issue, or a maintenance task associated with the one or more of the identifiers 103.

The third area 106 may be representative of any display or user interface adapted for enabling user input, and subsequent automatic formatting, of various media files such as including, but not limited to, photographs or videos. For example, the third area 106 may be representative of an interactive area, when selected by a user input thereto, may allow a user to enter photographs or videos via various inputs to the I/O system 36 of the central computer 22. In one example, the third area 106 may include an upload object 108 (e.g., and icon, button, or similar interface element) that may, in response to a user input thereto, cause the software to open an interface or display usable to upload, capture, or otherwise attach media files stored on the central controller 22 or the remote storage device 26. In some examples, the software may also cause the electronic irrigation note interface 100 to display an expansion element 109 on each uploaded file, that may, in response to a user input thereto, cause the software to expand the selected file to a larger size, such as into a full screen view or format.

Generally, users may generally choose to enter media files into the third area 106 that helps support or illustrate the condition, issue, or maintenance task associated with one or more of the one or more identifiers 103 (e.g., sprinklers, irrigation equipment, irrigation software, geographical terrain, specific geographic locations, personnel, or any similar items) described by text in the second area 104. For example, the images of the third area 106 may photographically illustrate (1) a flooded area, (2) downed or broken tree branches or other debris, (3) a plant disease, (4) an overly dry area, (5) a damaged area of turf having many divots, (6) an area of turn needing seeding, gardening, mowing, or other landscaping work, or (7) a type of physical damage to a piece of equipment, such as a cracked housing or severed communication cable or wire.

In some examples, the software may be configured to, upon the uploading or capturing of a photograph or video by a user, store the photograph or video (e.g., on the central controller 22 or the remote server 27), analyze the photograph or video such as by utilizing an algorithm or trained artificial intelligence (AI) algorithm to analyze the photograph, and then auto-populate a text description into the second area 104 that describes the photograph's contents and/or disease state. For turf or other plants, a photograph of the third area 106 may be analyzed to determine the health or a disease state, and may then auto-populate a text based summary within the second area 104. For example, some algorithms may perform this by determining the colors and/or percentages of certain colors (e.g., shades of green and brown) of turf in the photograph. The second area 104 may then be updated with a statement reflecting this analysis, such as "Turf health is poor, check if overwatering or underwatering has occurred."

In another example, an AI algorithm may analyze a photograph of the third area 106 to determine a type of equipment pictured, and any damage thereto that may have occurred. For example, a broken sprinkler may be identified as such and the second area 104 may be updated by the software with a statement to that effect. In another example, a physical issue such as a flooded or water damaged area or location may be identified as such, and the second area 104 may be updated accordingly by the software.

Finally, the electronic irrigation note interface 100 may include a saving object 110 that may, in response to a user input thereto, cause the software to perform various functions including, among others, saving or otherwise transmitting an electronic irrigation note to the remote storage device 26 (FIG. 2) for access by other authorized devices over the network 28 (FIG. 2). For example, the software may, in response to a user selection of the saving object 110, cause a text, an email, or any other electronic message to be sent to the mobile devices (e.g., the mobile device 24) of the users (e.g., business employees, contractors, etc.) identified via at least one of the or more identifiers 103 which includes personnel-identifying text, such as at least one personal or unique employee name and/or number. In some such examples, as may be appreciated, the electronic messages generated by the software may cause the mobile devices, such as the mobile device 24 (FIG. 2) of the linked or identified users to generate an audible or a visual alert.

In still further examples, the software may cause electronic messages to be sent to one or more users that are scheduled to work at certain times, such as by querying third-party employee work scheduling software, such as located on, or in, any of the remote server 27 (FIG. 28), the database 26 (FIG. 2), the central controller 22, or the mobile device 24, and subsequently, making a determination whether to send an electronic message to a mobile device or email account of the users, such as based on whether a user is scheduled to work on the day the electronic maintenance note is assigned to the user. In an additional example, the software may cause electronic messages to be sent to one or more users that are physical present, such as by determining a geospatial (e.g., GPS) location of the mobiles devices of the users identified by the or more identifiers 103, and subsequently, making a determination whether to send an electronic message to a mobile devices of the users based on whether a user's mobile device (e.g., the mobile device 24) is located within a predetermined distance of the central controller 22.

Irrigation Control User Interfaces

Turning now to FIGS. 4-13 and 31-33, these figures illustrate various aspects of graphical user interfaces for operating a computerized irrigation system via a central controller, such as the central irrigation server 12 of the irrigation system 10 (FIG. 1), or the central controller 22 of the irrigation system 20 (FIG. 2). Generally, the following discussion of FIGS. 4-13 and 31-33 provide examples of how the electronic irrigation notes (or abbreviated portions thereof) may be viewed, sorted, represented by icons/colors/symbols, accessed, or initiated/created.

With regard to the general functionality of the examples shown in FIGS. 4-10, the watering plan interface 112 may be selected from an action menu 113, such as via a user input to a watering plan object 114, to cause the software to display the watering plan interface 112. The watering plan interface 112 may include a filtering control 116 that allows a user to view various different irrigation system components, and the settings thereof, that collectively form or comprise an irrigation or watering schedule. In some examples, the filtering control 116 may include an all-station tab 118, a notification display, and a flag tab 122.

Figure 4:
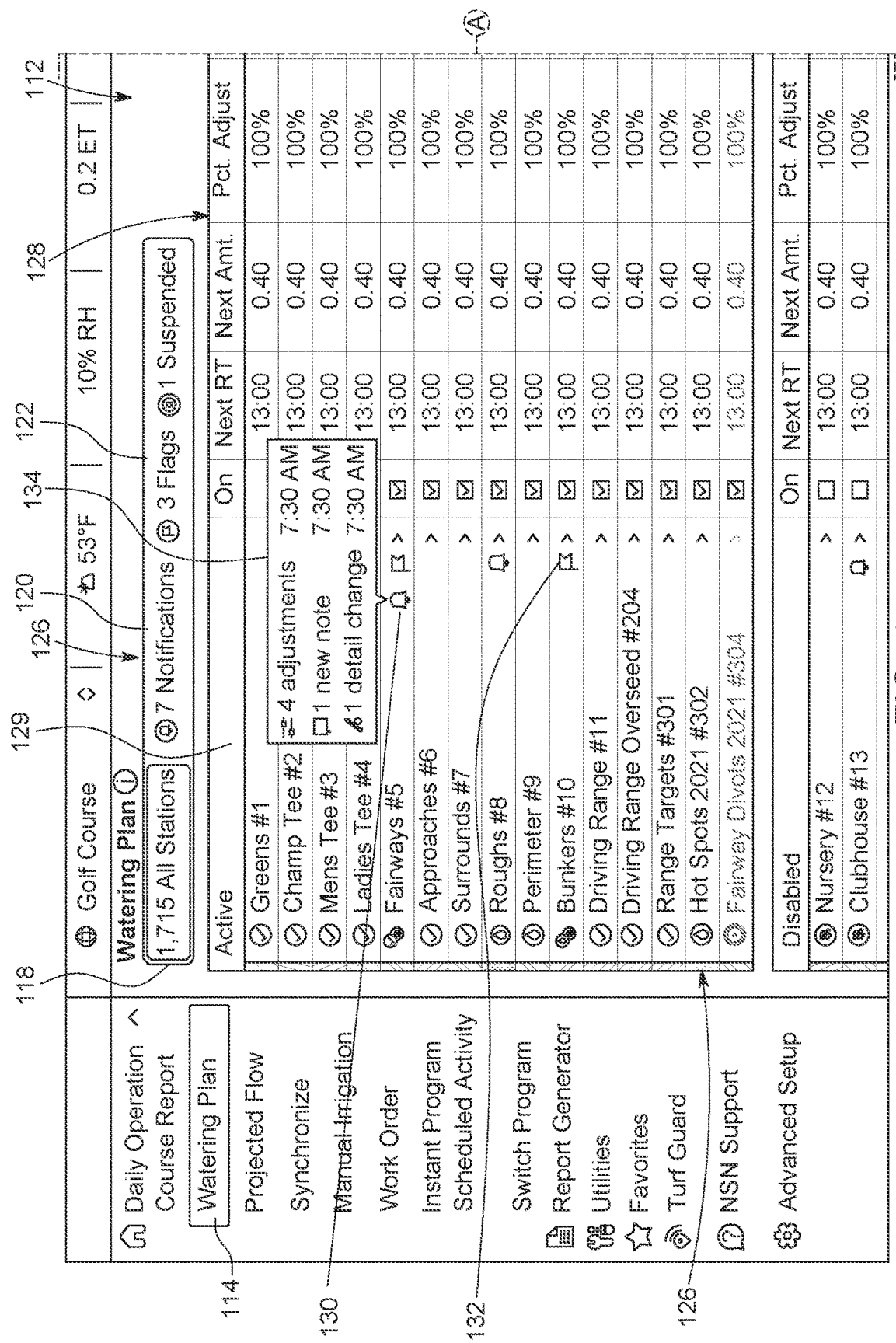
FIG. 4 illustrates an example watering plan interface, in accordance with at least one example of the present disclosure.
Figure 4:
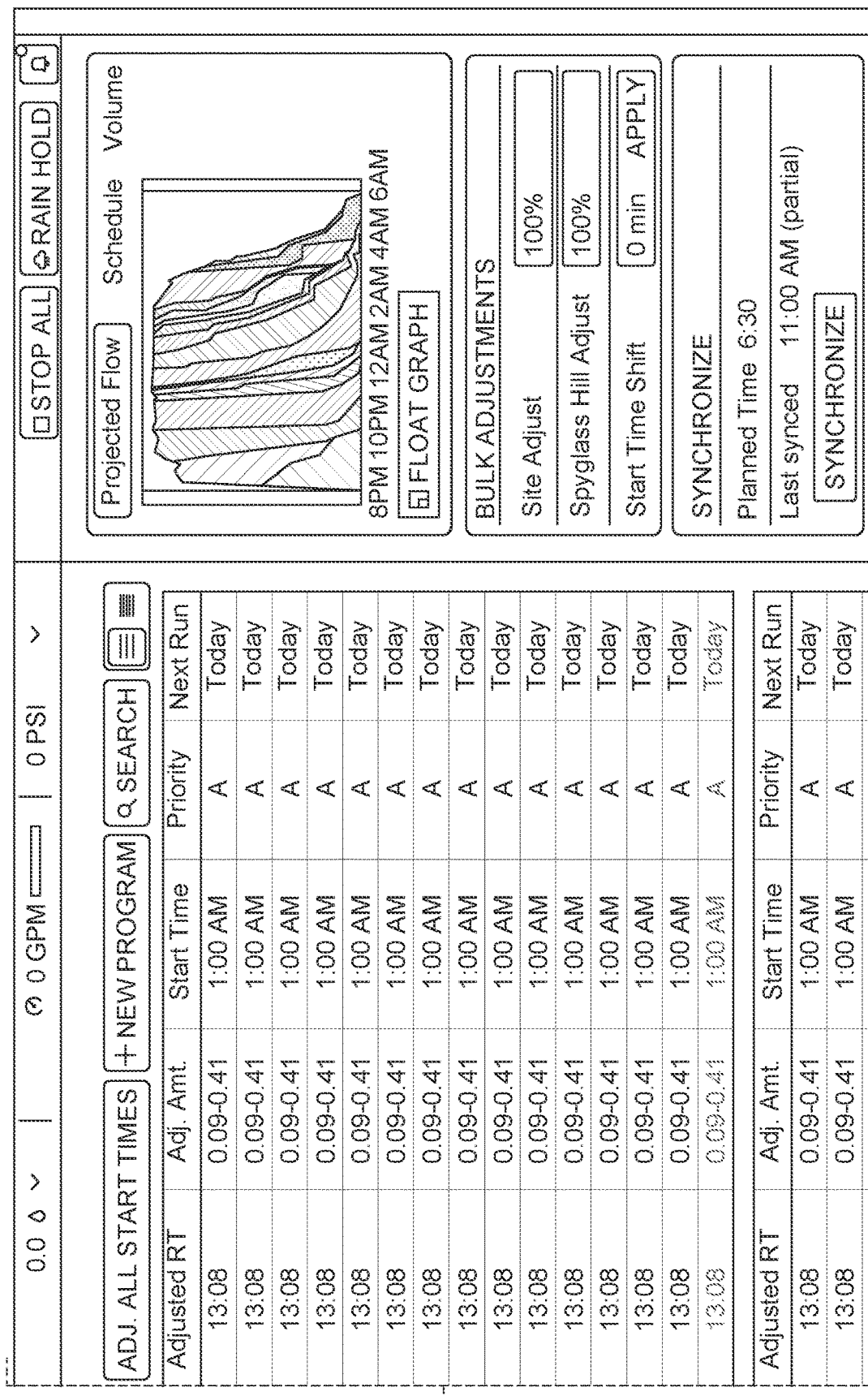

When the all-station tab 118 is selected by a user, the software may cause the watering plan interface 112 to display a list of a plurality of identifier groups 126 of a golf course or other business, such as in the form of a plurality of vertically stacked rows. The plurality of identifier groups 126 typically are groupings of one or more identifiers 103 based on a geographic area, portion of a golf course, or other logical groupings. Typically such one or more identifiers 103 of a plurality of identifier groups 126 may include sprinkler identifiers that correspond to sprinklers at an irrigation site. As shown in FIG. 4, for user convenience, each sprinkler group of the plurality of identifier groups 126 may generally be identified by a descriptive name, such as including, but not limited to, a numbered green, a numbered tee, a numbered fairway, or a numbered rough, or any other text that is generally indicative of any aspect how the sprinklers thereof are grouped. In some examples, the watering plan interface 112, when the all-station tab 118 is selected by a user, the software may only display sprinkler groups that include one or more sprinklers that are active, such as those programmed or scheduled to run on the day the all-station tab 118 is selected.

The watering plan interface 112 may display a plurality of information or control columns 128 for each row (e.g., each sprinkler group) of the plurality of identifier groups 126. The plurality of information or control columns 128 may include, for example, but not limited to, a program name, a program number, an auto cycle control, a last runtime, the last inches of water applied, the next inches of water to be applied, a percentage adjust, a program start time, a priority level, active days, run time calculation adjustments, evapotranspiration mode, evapotranspiration source, reference evapotranspiration value, rainfall amount, or a soil moisture sensor value (e.g., from a Turf Guard™ sensor). In this respect, a user may quickly scroll through the plurality of identifier groups 126 to determine, among others, their present status, their adjustment history, or their scheduled settings.

In some examples, if one or more electronic irrigation notes are associated with certain irrigation equipment or geographic areas, an icon and/or notification summary may be displayed on an interface of the software to communicate this information.

Figure 5:
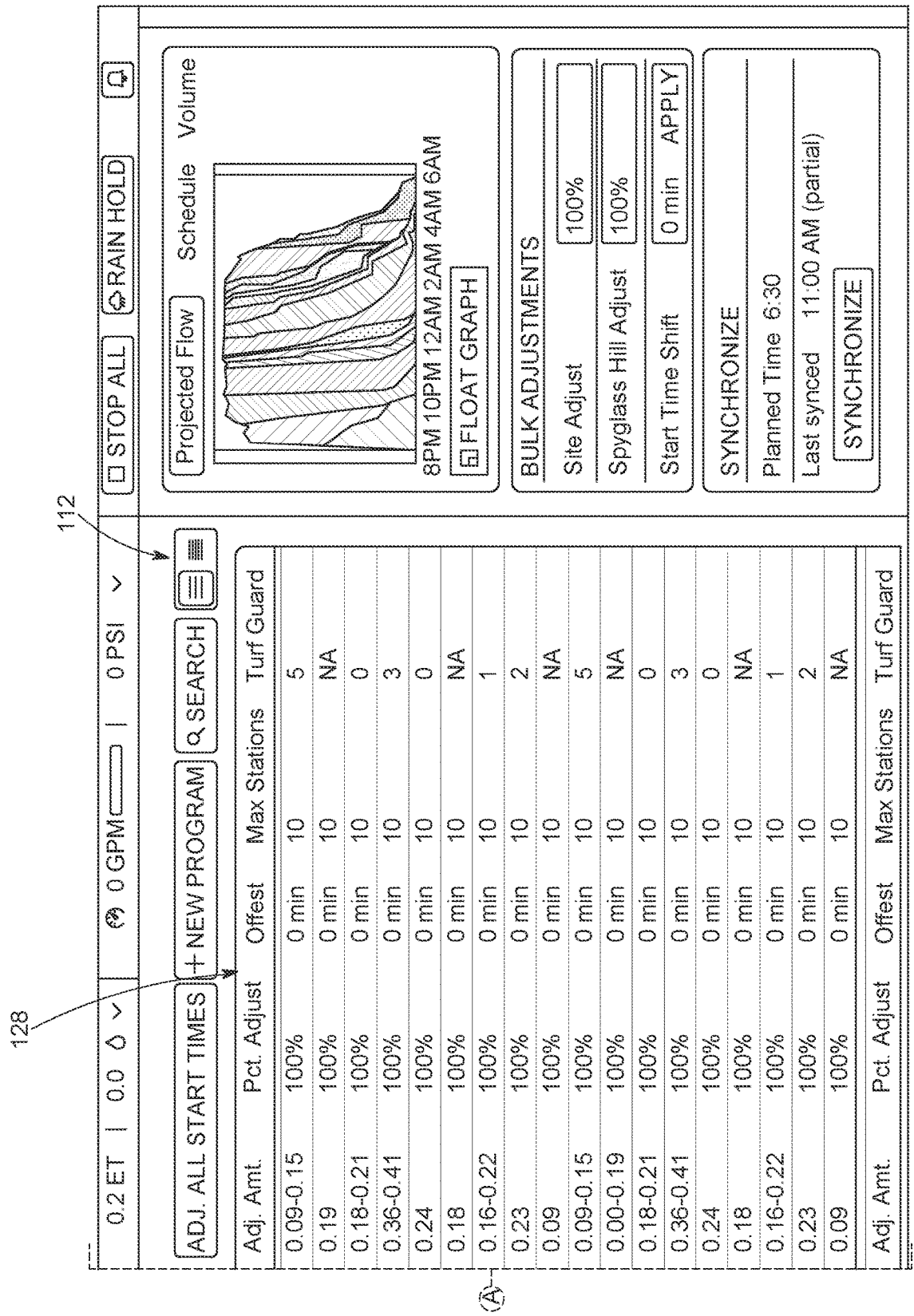
FIG. 5 illustrates an example watering plan interface, in accordance with at least one example of the present disclosure.

In one example, FIG. 4 illustrates a watering plan interface 112 in a first configuration and FIG. 5 illustrates the watering plan interface 112 in a second configuration. Both configurations of the watering plan interface 112 illustrate a notification icon 130 next to entries of a plurality of identifier groups 126 and a plurality of identifier subgroups 136 (note, the plurality of identifier subgroups 136 are similar to plurality of identifier groups 126 but are a further subset or sub grouping of the plurality of identifier groups 126).

When an input device, such as a mouse pointer or touch screen input are positioned over the notification icon 130 or actuate the notification icon 130 (e.g., mouse click), a notification summary display 134 is displayed (e.g., near the notification icon 130). The notification summary display 134 may illustrate a quick summary of a variety of information, such as new irrigation schedule adjustments and other software changes. In one example, each category, such as "adjustments" may indicate the number of changes (e.g., 4 in the present example), as well as the time the changes were made, or information became available.

A further category or entry of the notification summary display 134 includes an irrigation note entry, illustrated as "new note" in FIGS. 4 and 5. This indicates the number of new electronic irrigation notes that have been recently created in a predetermined period of time. The notification summary display 134 may be located in a variety of different locations in different configurations of the watering plan interface 112, such as next to or adjacent to the plurality of identifier groups 126 and plurality of identifier subgroups 136, as well as next to other data, such as geographic areas or other irrigation equipment.

Generally, the software may read or access a central database or log file with information regarding the number of electronic irrigation notes associated with an entry displayed on the watering plan interface 112, then may display the number of electronic irrigation notes in the notification summary display 134 next to or near a text label and or an icon. Further, if a user input device is activated over the electronic irrigation note number, text, and/or icon, this action may display the electronic irrigation note interface 100 as described in FIG. 3, thereby allowing the user to view all of the information in the electronic irrigation note and/or to edit the same.

As shown in FIG. 5, the software may cause the watering plan interface 112 to, in response to a user input to one irrigation group of the plurality of identifier groups 126 (FIG. 4) identified in the first column 129 of the plurality of information or control columns 128, replace the list of the plurality of identifier groups 126 with a list of a plurality of identifier subgroups 136.

Each of the plurality of identifier subgroups 136 may, for user convenience and efficiency, be representative of a smaller or more specific, relative to each of the plurality of identifier groups 126, location group or network of sprinklers. For example, such as shown in FIG. 5, each program subgroup of the plurality of identifier subgroups 136 may be representative of a group or network of sprinklers for irrigating or watering a specified area of an individual golf hole (e.g., 1—fairways, 1—greens, 1—roughs, 2—fairways, 2—greens, 2—roughs, 3—greens, 3—fairways, 3—roughs, etc.). In some examples, when a user is viewing the watering plan interface 112, the software may only display sprinkler subgroups that that are active, such as those programmed or scheduled to run on the day the all-station tab 118 (FIG. 4) is selected.

Additionally, the software may also cause the first column 129 of the plurality of information or control columns 128 to display the notification icon 130 and/or the notification summary display 134 when an electronic irrigation note has been linked to one or more sprinklers (e.g., a sprinkler or a grouping of sprinklers defined by at least one of the one or more identifiers 103) of, or within, a sprinkler network represented by a sprinkler subgroup of the plurality of identifier subgroups 136. In some examples, the software may also cause the first column 129 to display the flag icon 132 when a flag (e.g., an indication that there may be an issue with one or more sprinklers, one or more sprinklers may need an adjustment, or a general reminder to check or inspect one or more sprinklers or a nearby area) has been linked to one or more sprinklers of an sprinkler subgroup of the plurality of identifier subgroups 136. In view of the above, a user may navigate from the display shown in FIG. 4 to the display shown in FIG. 5 to, for example, determine which of the plurality of identifier subgroups 136 located within an irrigation group of the plurality of identifier groups 126 have at least one electronic irrigation note, or an active flag indication, linked to a least one sprinkler thereof or therein.

Figure 6:
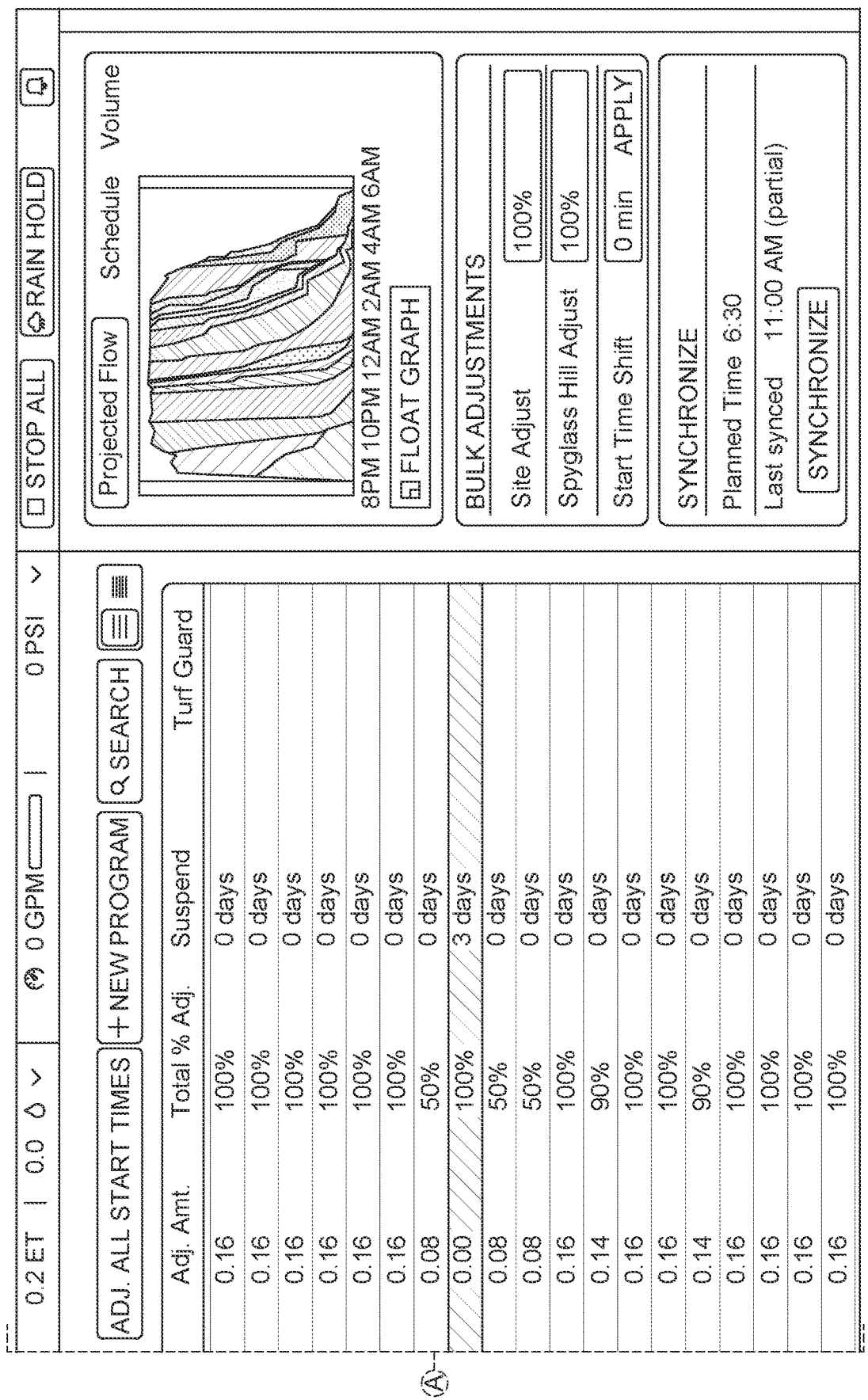
FIG. 6 illustrates a watering plan interface displaying an example electronic irrigation note, in accordance with at least one example of the present disclosure.

In another example, FIG. 6 illustrates another configuration of the watering plan interface 112 that includes an abbreviated note display 140 that displays some, but not all, of the information of an electronic irrigation note. In one example, abbreviated note display 140 comprises a graphical window that is displayed at certain times, such as when a mouse cursor is moved over the message icon 131 (e.g., a "pop-up" or "tool tip" message). The abbreviated note display 140 may comprise predetermined portions of an electronic irrigation note. In the present example, the abbreviated note display 140 displays the text from the second area 104, as well as a time stamp 144 displaying a time and/or date that the irrigation note was created and a user identification stamp 143 that displays which user created the note. However, any of the information in an irrigation note may be presented in the abbreviated note display 140.

In one example, when the abbreviated note display 140 is activated (e.g., by moving or clicking a mouse over message icon 131, the software accesses a database or log file (e.g., on the central controller 22 or remote server 27) to access the information stored for the irrigation note associated with the specific message icon 131. The software then displays the abbreviated note display 140 with select portions of the irrigation note associated with the message icon 131 (e.g., text in the second area 104). Clicking on the abbreviated note display 140 may cause an electronic irrigation note interface 100 similar to that seen in FIG. 3 to display on the screen for the specific note associated with the message icon 131, thereby allowing the user to view all of the information associated with that electronic irrigation note.

As shown in FIG. 6, the software may, in response to a user input to one sprinkler subgroup of the plurality of identifier subgroups 136 (FIG. 5) identified in the first column 129 of the plurality of information or control columns 128, display a list of identifiers 103. In view of the above, a user may navigate from the display shown in FIG. 5 to the display shown in FIG. 6 to, for example, view a list of sprinklers (e.g., the identifier 103) of, or within a sprinkler network formed by, a selected sprinkler subgroup. In some examples, when a user is viewing the watering plan interface 112, the software may only display sprinklers that that are active, such as those programmed or scheduled to run on the day the all-station tab 118 (FIG. 4) is selected.

In another example of a summary/notification use of the electronic irrigation notes, FIG. 7 illustrates another configuration of the watering plan interface 112 that includes a filtering control 116 which may be used to display and filter irrigation equipment and/or geographic areas of an irrigation site with various notifications. As shown in FIG. 7, the irrigation note filter 120 may be selected from the filtering control 116, via a user input thereon, to cause the software to display only sprinklers of the identifier 103, geographic areas, or groupings of either which have an electronic irrigation note linked associated therewith. This may enable a user to efficiently locate and identify individual sprinklers, or areas of physical terrain located nearby the identified (e.g., noted) sprinklers, which may need attention. Thus, utilizing the irrigation note filter 120 of the watering plan interface 112 represents another example of how a user may access the electronic irrigation notes of the present disclosure.

In one example, when the irrigation note filter 120 is selected, the software may access a database or log file to determine which entries (e.g., irrigation equipment such as sprinkler, geographic areas, or other associated items) are associated with electronic irrigation notes. Those entries are then displayed on the watering plan interface 112.

Similarly, while not shown, the flag tab 122 may also be selected, via a user input thereon, to cause the software to display only the sprinklers of the identifier 103 which have an active flag alert or indication linked directly thereto. This may enable a user to efficiently locate and identify individual sprinklers, or areas of physical terrain located nearby the identified (e.g., flagged) sprinklers, which may need attention.

In another example, FIGS. 8-10 illustrate another configuration of the watering plan interface 112 that includes an irrigation list interface 146 that may display information to a user in several different ways, depending on which of a plurality of interface elements of a selector area 148 are selected (e.g., graphical buttons).

As shown in FIGS. 8-10, the software may cause the watering plan interface 112 to display the irrigation list interface 146 (e.g., the right-hand side of the watering plan interface 112). For example, the irrigation list interface 146 may be opened or updated in response to a user input to any of the one or more identifiers 103 (or elements associated with one or more identifiers 103) displayed in the main column 129 (e.g., an identifier 103). The irrigation list interface 146 may include a selector area 148 that includes interface elements including, but not limited to, a note selection interface element 150 and an activity log element 152, which allow the user to switch the irrigation list interface 146 between displaying the plurality of irrigation note elements 154 and the plurality of operational event elements 163 respectively, among other possible display options. The selector area 148 may also include a flag element 162 that, when actuated, filters the plurality of irrigation note elements 154 (or other items in the list) by those which have a flag indicator associated with it.

When the note selection interface element 150 of the irrigation list interface 146 is actuated (e.g., by the user), the irrigation list interface 146 displays any irrigation notes associated with a selected identifier of the plurality of identifiers 103 (e.g., an identifier 103 selected from the main column 129 in FIG. 8) as the plurality of irrigation note elements 154. The irrigation list interface 146 may generally allow a user to view and scroll through all of the electronic irrigation notes associated with a specific identifier 103 (e.g., an identifier entered in the first area 102 of the electronic irrigation note interface 100).

Each of the plurality of irrigation note elements 154 may be an abbreviated form of the information in an electronic irrigation note or may display all of the information of an electronic irrigation note. In one example, any of the plurality of plurality of irrigation note elements 154 may include an electronic irrigation note text message 165 that contains the electronic irrigation note text (e.g., inputted in the second area 104 of electronic irrigation note interface 100, FIG. 3), an electronic irrigation note image display 167 displaying an electronic irrigation note image (e.g., inputted in the third area 106 of electronic irrigation note interface 100, FIG. 3), a timestamp 159 displaying a date and time of when the electronic irrigation note was created or last edited, a status indicator 161 that indicates if whether information within the electronic irrigation note needs to be addressed (e.g., "active," "on hold," or "completed"), and a editing object 158 that may open or display the electronic irrigation note interface 100 (FIG. 3).

The irrigation list interface 146 may display several of the plurality of irrigation note elements 154 at one time, such as in a list format that the user can scroll through. Thus, engaging with one or more messages icons which may be displayed in the main column 129 of the plurality of information or control columns 128 represents one example of how a user may access the electronic irrigation notes of the present disclosure.

Over a period of time, the plurality of irrigation note elements 154 may form an archived history or log of an identifier 103, such as a specific irrigation equipment (sprinkler or satellite controller) or geographic area (e.g., golf hole or golf rough). In some examples, the irrigation list interface 146 may include a filtering input selector element 156 which may provide one or more aspects by which the plurality of irrigation note elements 154 may be filtered. For example, the filtering input selector element 156 may filter the plurality of irrigation note elements 154 by date/time, note status (status indicator 161), or other aspects. In one example, in response to a user input/actuation thereto, the software displays one or a plurality of irrigation note elements 154 within a user-defined date/time. For example, the filtering input selector element 156 may open an input area where a user may input a date/time range (e.g., a calendar configured to allow a user to select a periodic time frame). This may enable user to, for example, efficiently view notes created during one identified month over several years, such as to analyze or review electronic irrigation notes that may concern seasonal conditions. In various examples, the software may automatically delete electronic irrigation notes after a predetermined period of time has passed, such as, but not limited to, between about 1 year and about 5 years, or may retain (e.g., store) electronic irrigation notes indefinitely.

The software may cause any of the plurality of irrigation note elements 154 to display a status indicator 161. The status indicator 161 may comprise, for example, but not limited to, text such as "active" or "completed", to indicate that an electronic maintenance note has, or has not been, viewed, addressed, or completed. In such examples, the software may, in response to a user input to the status element 161, cause the status indicator 161 to switch or toggle between "active" or "completed" states, among other possible states. In view of the above, a user may respond to, edit, confirm the completion of, or delete any electronic irrigation note linked to one or more sprinklers.

The software may also cause the irrigation list interface 146 to display a first note addition object 160, which may also, in response to a user input thereto, cause the software to open or display the electronic irrigation note interface 100 (FIG. 3). This may enable a user to create a new electronic irrigation note for a selected sprinkler, which will subsequently show up as an additional entry below the plurality of irrigation note elements 154 on the irrigation list interface 146. Additionally, as shown in FIG. 8, when electronic irrigation notes are accessed or displayed on the irrigation list interface 146, the software may cause each electronic irrigation note to display a timestamp 159 and/or a status indicator 161.

In one example, the software may access a database or log file (e.g., a central database or log file on the central controller 22 or the remote server 27) and search for all electronic irrigation notes associated with a selected identifier 103 (e.g., a selected identifier 103 in the main column 129). These electronic irrigation notes are then displayed as the one or a plurality of irrigation note elements 154, according to any filtering input selector element 156.

As seen in FIGS. 9-10, when the activity log element 152 of the irrigation list interface 146 is actuated (e.g., by the user), the irrigation list interface 146 displays any operation events associated with a selected identifier of the plurality of identifiers 103 (e.g., a identifier 103 selected from the main column 129 in FIG. 9) as plurality of operational event elements 163.

The plurality of operational event elements 163 may generally form or comprise a comprehensive activity log or history associated with a sprinkler identified by the one or more identifiers 103 displayed on the irrigation list interface 146. The plurality of operational event elements 163 may include, for example, any of a large variety of different operation activities, maintenance activities, personnel activities, or other activities. Specific examples may include one or more electronic irrigation notes, one or more flag notifications, one or more communication failure notifications, one or more operational success notifications, one or more one or more detail changes (e.g., a mechanical adjustment such as a nozzle size change), one or more adjustment changes (e.g., an electronic programming adjustment), one or more flow management changes, and/or one or more creations of an electronic irrigation note.

In one example, the plurality of operational event elements 163 may include an electronic irrigation note event element 164 (FIG. 9) that may display if a new electronic irrigation note was recently created for the selected identifier 103. The plurality of operational event elements 163 may include similar information as the plurality of irrigation note elements 154 but may also include text communicating that a new electronic irrigation note was created and the time at which it was created.

In some examples, such as shown in FIGS. 8-10, the software may cause the irrigation list interface 146 to display a time filtering object 170 which may, in response to a user input thereto, cause the software to increase, or decrease, a period of time within which maintenance entries or events detected or created there within will be displayed on the irrigation list interface 146, and maintenance activities or entries detected or created there outside will no longer be displayed.

In further examples, the software may, in response to a user input to the time filtering object 170, open a menu or a calendar configured to allow a user to select a periodic time frame, such as a specific month of the calendar year. This may enable user to, for example, efficiently view notes created during one identified month over several years, such as to analyze or review electronic irrigation notes that may concern seasonal conditions. In various examples, the software may delete any of the maintenance entries or events of the list of operational events after a predetermined period of time has passed, such as, but not limited to, between about 1 year and about 5 years, or may retain (e.g., store) operational events indefinitely.

In some examples, the software may cause the irrigation list interface 146 to display a filtering object 171 which may, in response to a user input thereto, cause the software to open a checkbox menu 172 see in FIG. 10. The software may cause the checkbox menu 172 to display a plurality of checkboxes 174, each of which may correspond to, and selectively filter in response to a user selection or deselection thereof (e.g., a click or a touch input), one type or category of operational event elements 163 (e.g., alerts, success, issues, electronic irrigation notes, adjustments, detail changes, etc.). In some examples, the software may also cause the checkbox menu to display a clearing object 176, which may, in response to a user input thereto, delete any of the categories or types of operational events selected (e.g., display a checkmark) in the plurality of checkboxes 174 at the time the user selects the clearing object 176. While any combination of filtering may be selected by the user, this checkbox menu 172 may allow the irrigation list interface 146 to display electronic irrigation notes (e.g., one or more electronic irrigation note event elements 164) in combination with certain other information, such as "alerts" which may help a user better understand whether an electronic irrigation note was added after certain types of events.

FIG. 11 illustrates an example course report interface 212 which includes aspects similar to the watering plan interface 112 for displaying and interacting with the electronic irrigation notes, in accordance with at least one example of the present disclosure. The general function and elements of the course report interface 212 is discussed further below, followed by a discussion of how various display elements are used to display and interact with the electronic software notes.

As shown in FIG. 11, the course report interface 212 may be selected by a user from the action menu 113, such as via a user input to a course report object 115 below the watering plan object 114, which may cause the software to display the course report interface 212. The course report interface 212 may be similar to the watering plan interface 112 described with reference to FIG. 11, at least in that the course report interface 212 may include a plurality of information or control columns 228 for each row of a list of the plurality of identifier groups 126.

However, in contrast to the plurality of information or control columns 128 of the watering plan interface 112, the course report interface 212 may group, sort, arrange, present, or otherwise the plurality of identifier groups 126, the plurality of identifier subgroups 136, the identifier 103, and the settings, options, or information linked thereto, differently in the plurality of information or control columns 228. Moreover, a filtering control 218 of the course report interface 212 may include, or may otherwise provide, different filtering options relative to the filtering control 116 of the watering plan interface 112. In some examples, the filtering control 218 may include an all-areas tab 220 and a failure notification tab 222.

As shown in FIG. 11, when the all-areas tab 220 of the filtering control 218 is selected, via a user input thereto, the software may cause the course report interface 212 to display a list of the plurality of identifier groups 126 and/or a list of the plurality of identifier subgroups 136. In contrast to the plurality of identifier groups 126, when viewed after a selection of the all-station tab 118 (FIG. 4), the plurality of identifier groups 126 may include only groups of sprinklers that have been predefined to water or irrigate one or more specific physical geographical areas via a watering program specific to each sprinkler group of the plurality of identifier groups 126. For example, such an area may include a front lawn or back lawn of a business, an area or location known to have many divots, an area or location known to be particularly hot or dry, an area or location that is known to experience heavier traffic than other areas, or simply an entire golf hole of a golf course.

While not shown, it is to be appreciated that a user may navigate through various graphical interfaces or screens of the course report interface 212 in a manner similar to that described with respect to the watering plan interface 112. For example, a user may select one of the plurality of identifier groups 126 to cause the software to display a list of a plurality of identifier subgroups 136 of a selected irrigation, such as shown in FIG. 5, and subsequently select one of the plurality of identifier subgroups 136 to cause the software to display the identifier 103, such as shown in FIG. 6.

The software may cause the course report interface 212 to display an activity log interface 252 which is generally similar to the previously described irrigation list interface 146 with the activity log element 152 selected. While the irrigation list interface 146 with the activity log element 152 selected may illustrate a plurality of operational event elements 163 associated with a specific one or more identifiers 103 selected from the main column 129, the activity log interface 252 may display a plurality of operational event elements 163 associated with equipment within a geographic area or from one a plurality of identifier groups 126 in the first column 229. Hence, a plurality of operational event elements 163 may display alerts from a plurality of equipment (e.g., sprinklers). The activity log interface 252 may be filtered in a similar manner as the irrigation list interface 146 (e.g., via filtering object 170, 171). In this manner, any electronic irrigation notes may also be viewed by a user.

As also seen in FIG. 11, the previously discussed notification icon 130 and notification summary display 134 may be similarly used with the plurality of identifier groups 126 of the first column 229. When an input device, such as a mouse pointer or touch screen input are positioned over the notification icon 130 or actuate the notification icon 130 (e.g., mouse click), a notification summary display 134 is displayed (e.g., near the notification icon 130). The notification summary display 134 may illustrate a quick summary of a variety of information, such as new irrigation schedule adjustments and other software changes. In one example, the notification summary display 134 includes an irrigation note entry, illustrated as "new note" in FIG. 11. This indicates the number of new electronic irrigation notes that have been recently created in a predetermined period of time. The notification summary display 134 may be located in a variety of different locations in different configurations of the course report interface 212, such as next to or adjacent to the plurality of identifier groups 126, as well as next to other data, such as geographic areas or other irrigation equipment.

In some examples, the software may cause the first column 229 to display the flag icon 132 when a flag (e.g., an indication that there may be an issue with one or more sprinklers, one or more sprinklers may need an adjustment, a general reminder to check or inspect one or more sprinklers or a nearby area, etc.) has been linked to one or more sprinklers (e.g., a sprinkler or a grouping of sprinklers defined by one or more of the one or more identifiers 103) located within a geospatial area, or a sprinkler network, represented by any of the plurality of identifier groups 126 or the plurality of identifier subgroups 136.

The course report interface 212 may also include the previously discussed message icon 131 and abbreviated note display 140 for viewing and interacting with the electronic irrigation notes, as seen in the view or configuration of FIG. 12. In one example, the abbreviated note display 140 comprises a graphical window that is displayed at certain times, such as when a mouse cursor is moved over the message icon 131 (e.g., a "pop-up" or "tool tip" message). The abbreviated note display 140 may comprise predetermined portions of an electronic irrigation note. In the present example, the abbreviated note display 140 displays the text from the second area 104, as well as a time stamp 144 displaying a time and/or date that the irrigation note was created and a user identification stamp 143 that displays which user created the note. However, any of the information in an irrigation note may be presented in the abbreviated note display 140.

In one example, when the abbreviated note display 140 is activated (e.g., by moving or clicking a mouse over message icon 131, the software accesses a database or log file (e.g., on the central controller 22 or remote server 27) to access the information stored for the irrigation note associated with the specific message icon 131. The software then displays the abbreviated note display 140 with select portions of the irrigation note associated with the message icon 131 (e.g., text in the second area 104). Clicking on the abbreviated note display 140 may cause an electronic irrigation note interface 100 similar to that seen in FIG. 3 to display on the screen for the specific note associated with the message icon 131, thereby allowing the user to view all of the information associated with that electronic irrigation note.

FIG. 12 also illustrates a failure notification tab 222 that may be selected from the filtering control 218, via a user input thereon, to cause the software to display only one or more sprinklers (e.g., a sprinkler or a grouping of sprinklers defined by at least one of the one or more of the identifiers 103) of the identifier 103 which have an active communication failure notification detected or linked thereto. In some examples, the software may cause the course report interface 212 to display a message icon 131 when at least one electronic irrigation note is linked to one or more sprinklers (e.g., a sprinkler or a grouping of sprinklers defined by at least one or more of the identifiers 103) of the identifier 103.

Turning now to FIGS. 13 and 31-33, these figures provide examples of how electronic irrigation notes (or abbreviated portions thereof) may be viewed, sorted, represented by icons/colors/symbols, accessed, or initiated/created using an interface that includes a geographical representation or satellite view of an area of physical terrain.

Figure 31:
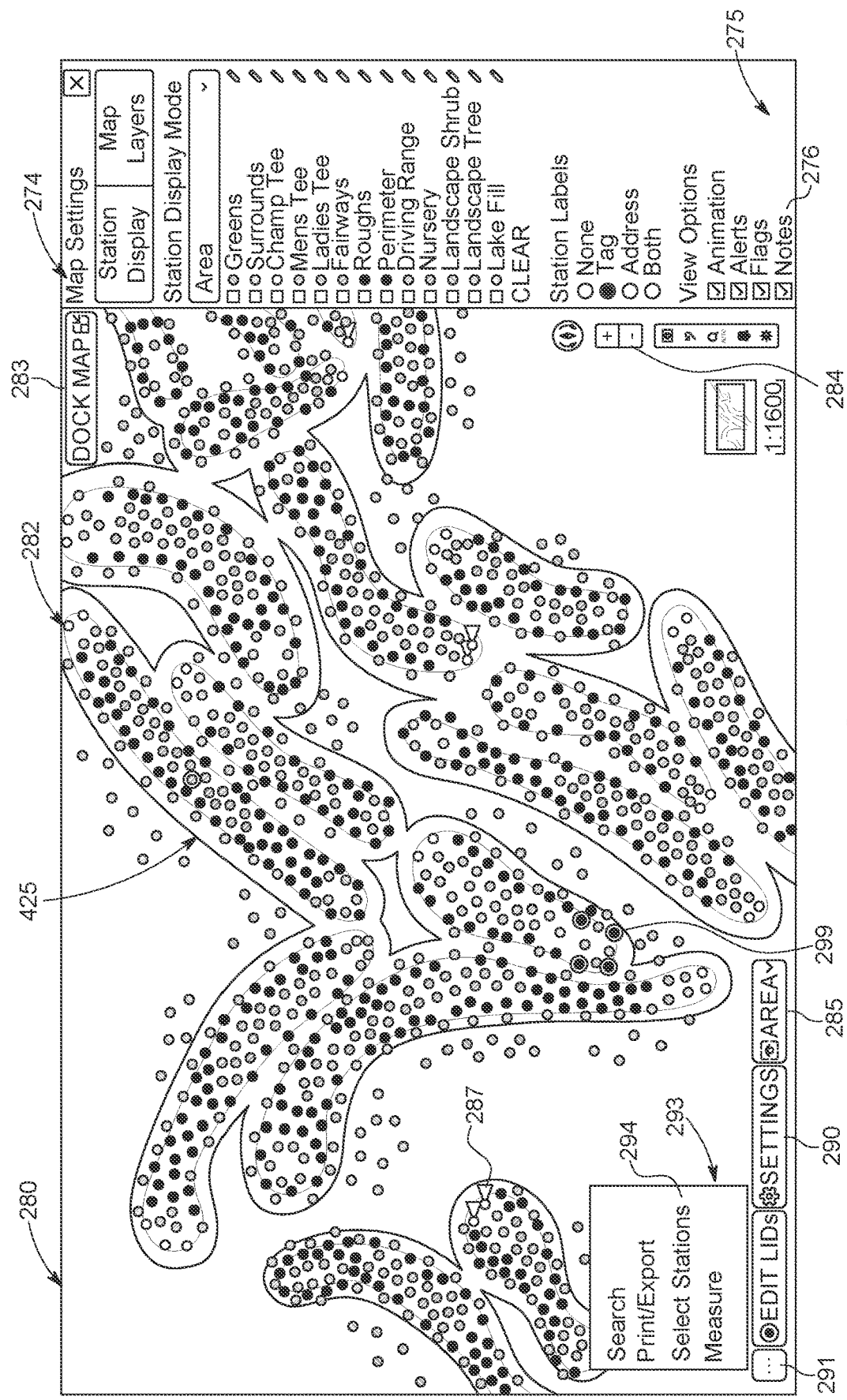
FIG. 31 illustrates a map view interface, in accordance with at least one example of the present disclosure.
Figure 32:
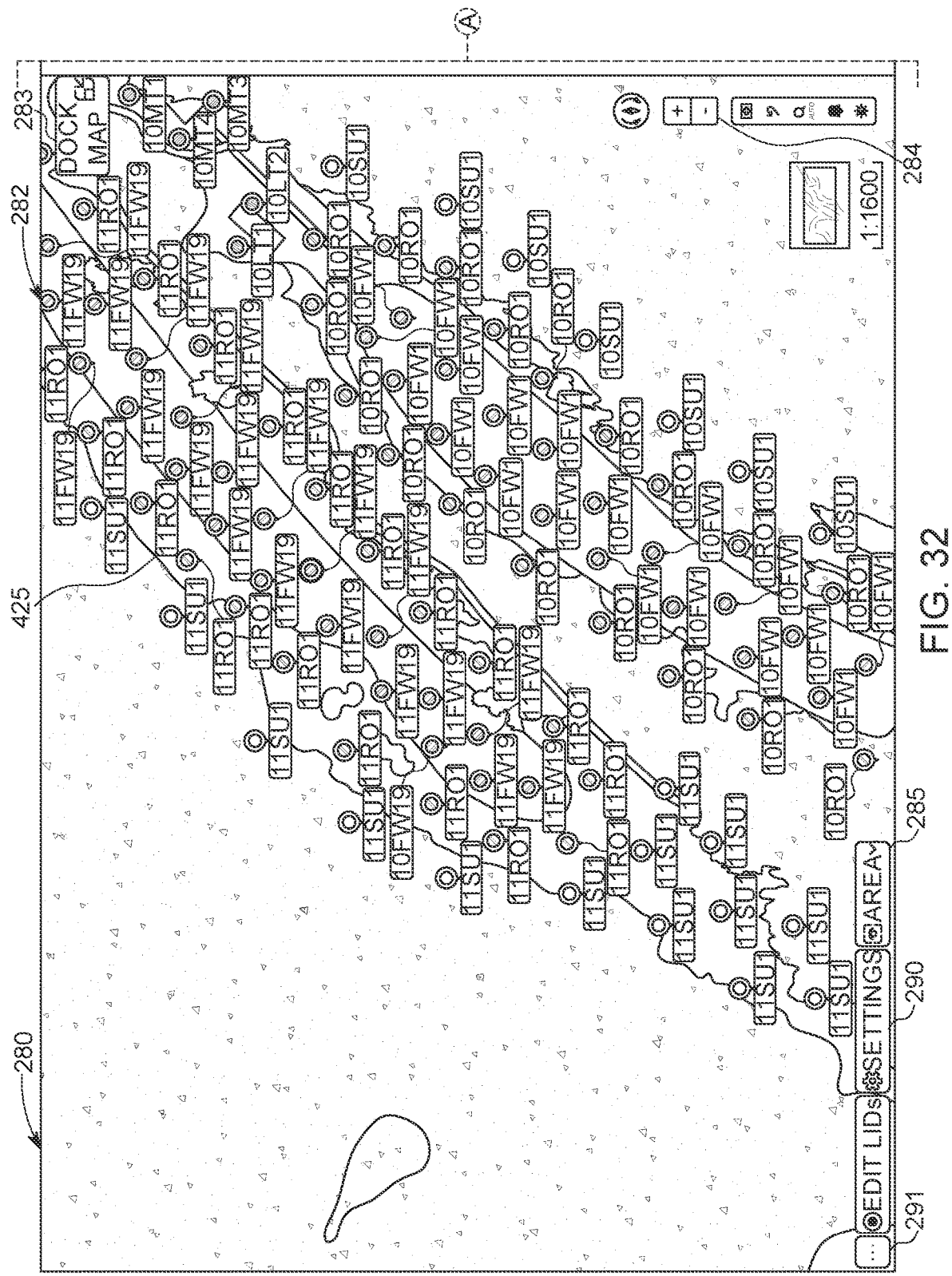
FIG. 32 illustrates a map view interface with a settings interface open, in accordance with at least one example of the present disclosure.
Figure 33:
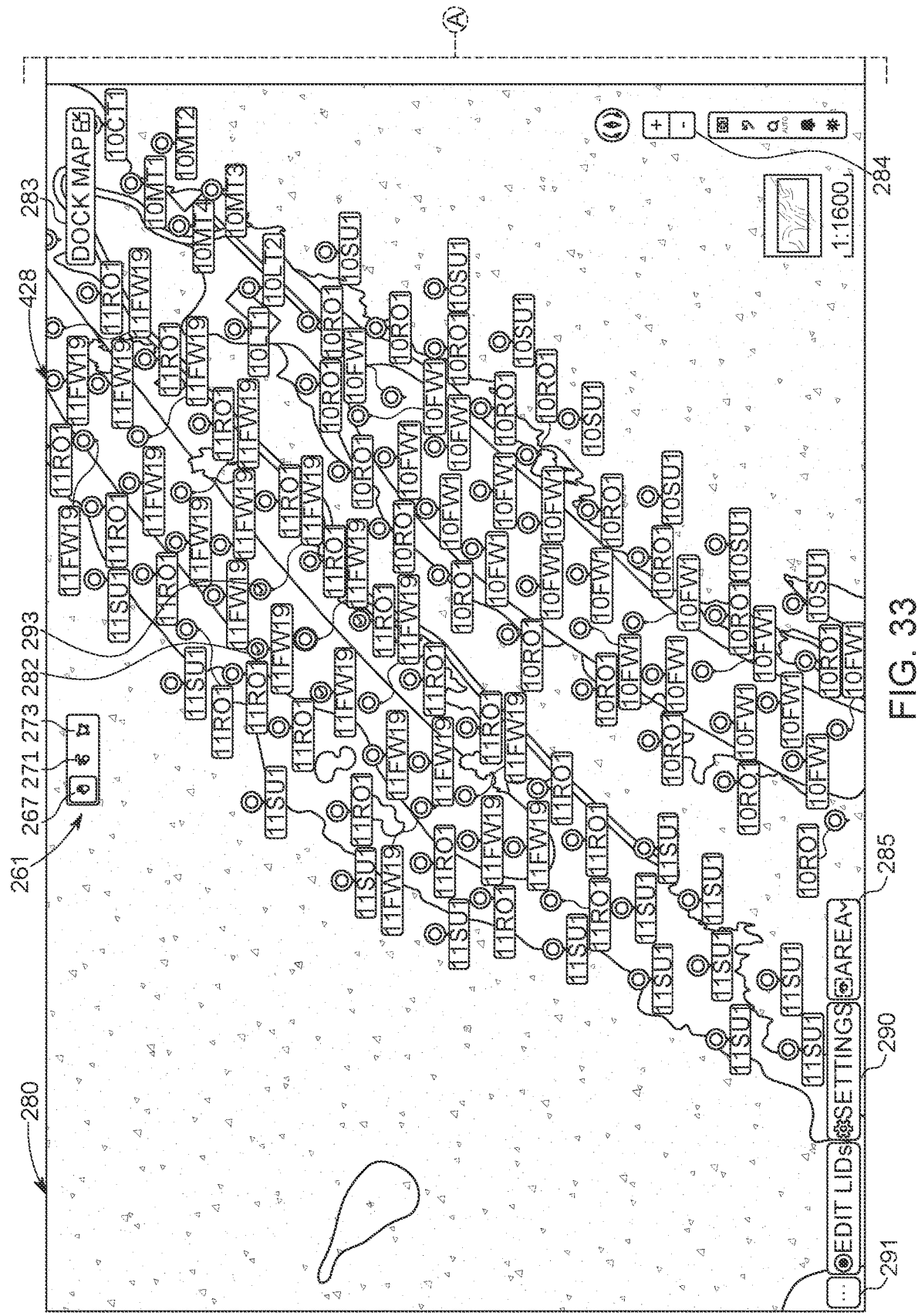
FIG. 33 illustrates a map view interface with a selector interface open, in accordance with at least one example of the present disclosure.
Figure 33:
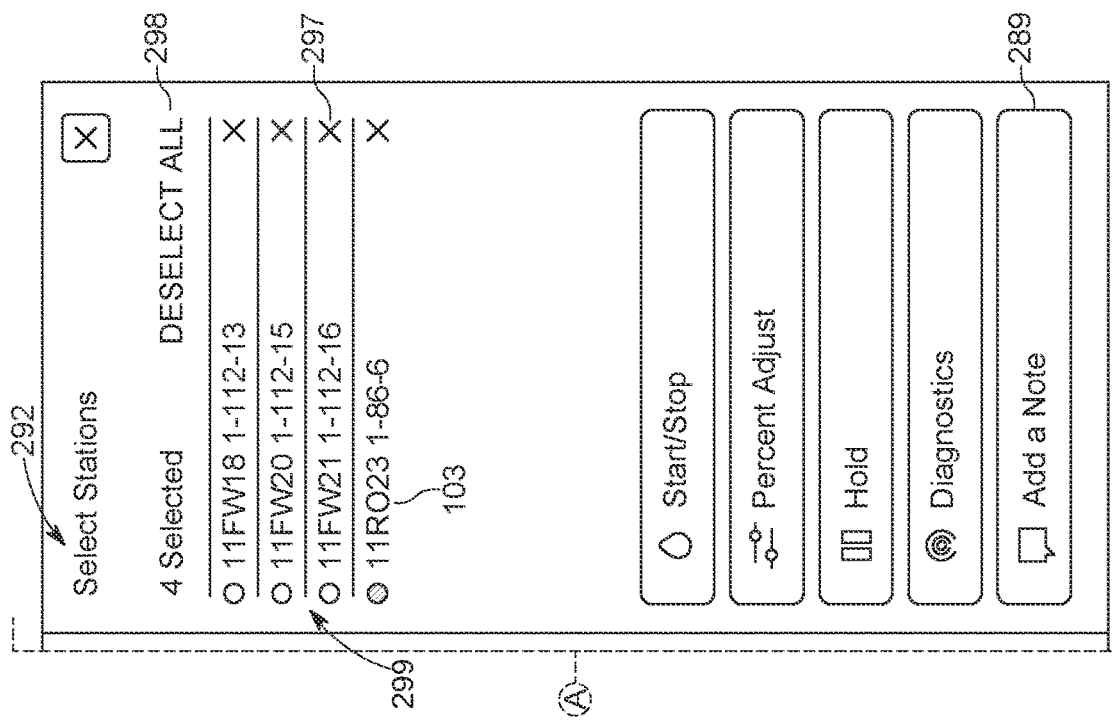

In a first example configuration, FIG. 13 illustrates the course report interface 212 with a map view interface 280 opened, in accordance with at least one example of the present application. In a second example configuration, FIG. 31 illustrates the map view interface 280 in a second configuration, in accordance with at least one example of the present disclosure. In a third example configuration, FIG. 32 illustrates the map view interface 280 with the irrigation list interface 146 open, in accordance with at least one example of the present disclosure. In a fourth example configuration, FIG. 33 illustrates the map view interface 280 with a selector interface open, in accordance with at least one example of the present disclosure. FIGS. 13 and 31-33 are discussed below concurrently.

FIGS. 13 and 31-33 illustrate a map view interface 280 that may include irrigation equipment elements 282 distributed about a plurality of geographic elements 425. Generally, the plurality of geographic elements 425 may be graphical areas, shapes, or boundaries (e.g., a two-dimensional or three-dimensional map) that correspond to real geographic areas. For example, the plurality of geographic elements 425 may be shaped to and correspond to portions of a golf course, such as golf course holes, golf course fairways, golf course roughs, golf course bunkers, etc. The irrigation equipment elements 282 may be one or more graphical shapes, icons, and/or texts positioned at various locations on the plurality of geographic elements 425 that represent an irrigation equipment and its relative real geographic location. In the configurations of the map view interface 280 in FIGS. 13 and 31, the plurality of geographic elements 425 are illustrates solely as icons while in FIGS. 32 and 33 the plurality of geographic elements 425 are illustrates as icons and text characters (e.g., one or more identifiers 103).

The map view interface 280 may indicate or display that an electronic irrigation note has been associated with one of the irrigation equipment elements 282 and/or plurality of geographic elements 425 in several different ways.

For example, in one graphical indication, the graphical shape, icon, and/or text of the irrigation equipment elements 282 and/or the plurality of geographic elements 425 may be outlined with a border, box, circle, or other shape. The lines defining the border or shape may be a different color than the main color or body color of the plurality of the irrigation equipment elements 282 or the geographic elements 425.

In another graphical indication example, the graphical shape, icon, and/or text of the irrigation equipment elements 282 and/or the plurality of geographic elements 425 may have a first displayed color indicating that no electronic irrigation note is associated with it and a second displayed color indicating that no electronic irrigation note is associated with it. The term "displayed color" means a part or all of the graphical shape, icon, and/or text of the irrigation equipment elements 282 or the plurality of geographic elements 425 displayed and which may change color. For example, an interior color of a circle and/or an outer perimeter line of a circle. In another example, a color of text may change color.

Hence, the software may access or read one or more database or log files to obtain information to display the map view interface 280, access or read one or more database or log files to obtain information regarding which of the irrigation equipment elements 282 and/or the plurality of geographic elements 425 have associated electronic irrigation notes, and then displays one of the previously described graphical indications of an electronic irrigation note being associated with the irrigation equipment elements 282 or plurality of geographic elements 425.

In some examples, if an electronic irrigation note is associated with one of the irrigation equipment elements 282 or the plurality of geographic elements 425, a notification summary display 134 and/or an abbreviated note display 140, as previously described, may be displayed nearby when the user actuates or mores an input marker (e.g., a mouse cursor) over the irrigation equipment elements 282 or the plurality of geographic elements 425.

FIG. 32 also illustrates another example of displaying and interacting with the electronic irrigation notes in which the map view interface 280 is caused to display an irrigation list interface 146. The irrigation list interface 146 was previously described with regard to the watering plan interface 112 and operates the same except that electronic irrigation notes for a specific identifier 103 may be selected as previously described by interacting with the items on the map view interface 280. For example, the irrigation list interface 146 may be opened or updated in response to a user input to any of the irrigation equipment elements 282 or the plurality of geographic elements 425. When the irrigation list interface 146 is displayed or otherwise open on the map view interface 280, the irrigation list interface 146 may include a second note addition object 288, which may, in response to a user input thereto, cause the software to open the electronic irrigation note interface 100 (FIG. 3). Additionally, plurality of operational event elements 163 may be further displayed in a list as previously described.

As shown in FIG. 13, the software may, in response to a user selection of the course report interface 212 from the action menu 113, or to a user selection of the watering plan interface 112 from the action menu 113, cause the software to open the map view interface 280 in a partial-screen view. This may enable the map view interface 280 to be displayed concurrently with the course report interface 212 or the watering plan interface 112 (e.g., the map view interface 280 may take up only a portion of the total screen area. The map view interface 280 may include a map expansion object 281 (FIG. 13) which may, in response to a user input thereto, cause the software to expand the map view interface 280 into a full screen view, such as illustrated in FIGS. 31-32. Conversely, when the map view interface 280 is displayed in the full screen view illustrated in FIGS. 31-32, the map view interface 280 may include a map retraction object 283 (FIGS. 31-33) which may, in response to a user input thereto, cause the software to reduce or otherwise return the map view interface 280 to the partial-screen view illustrated in FIG. 13.

Figure 16:
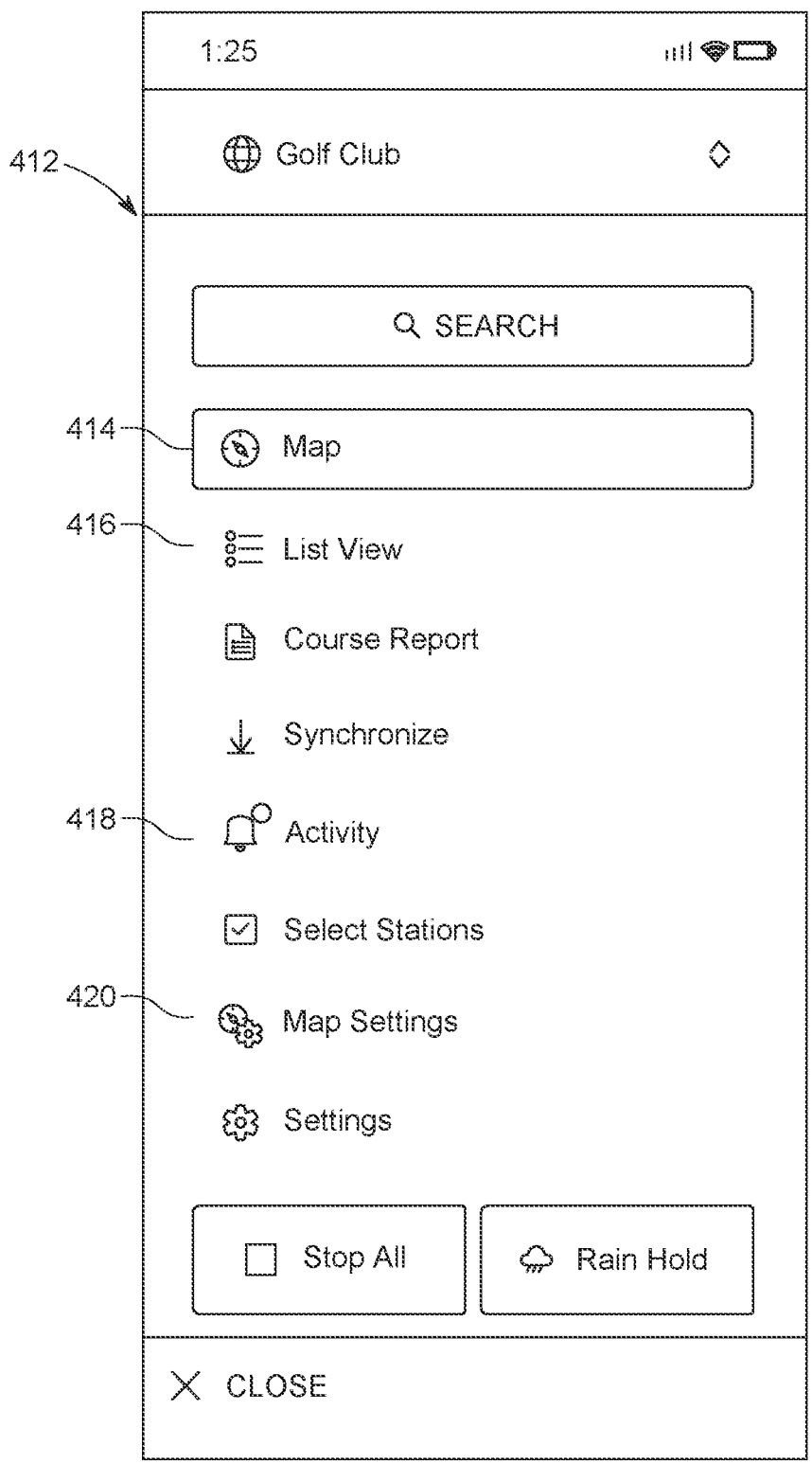
FIG. 16 illustrates an example mobile action menu displayed on a mobile device, in accordance with at least one example of the present application.

In an alternative example, a user may select a map view interface object, such as similar to the mobile map view object 414 shown on the mobile action menu 412 of FIG. 16 from the action menu 113, to cause the software to open the map view interface 280 in a full-screen view. The map view interface 280 may, depending on a view option selected, comprise a two-dimensional geographic representation, such as shown in FIGS. 13 and 31, or a three-dimensional satellite view, such as shown in FIGS. 32-33, of the grounds of a business, such as a plurality of geographic elements 425 of a golf course. In one example, the map view interface 280 may include an area object 285, which, in response to a user input to the area object 285, may cause the software to switch from displaying the two-dimensional graphical representation of FIGS. 13 and 31 to the three-dimensional satellite view of FIGS. 32 and 33, or vice versa. An ellipse object 286 and settings 281 object may also be included, as discussed elsewhere in this specification.

When the map view interface 280 is displayed to a user in a three-dimensional satellite view (FIGS. 32-33), the map view interface 280 may, depending upon a level of zoom selected via a zoom selector 284 of the map view interface 280, display either the identifier group icons 424 (FIG. 17), or the plurality of sprinkler icons 428 (FIGS. 18-20, 28-29, and 31-32), described in detail with respect to FIGS. 17-20 and 28-29 below. The software may also cause the map view interface 280 to, in response to a user input to any individual sprinkler of the plurality of sprinkler icons 428, display the irrigation list interface 146 (FIG. 32). When the irrigation list interface 146 is displayed or otherwise open on the map view interface 280, the irrigation list interface 146 may include a second note addition object 288, which may, in response to a user input thereto, cause the software to open the electronic irrigation note interface 100 (FIG. 3).

In another example, the irrigation equipment elements 282 and/or the plurality of geographic elements 425 may be filtered such that irrigation equipment elements 282 and/or plurality of geographic elements 425 that are associated with electronic irrigation notes may be displayed on the map view interface 280, with or without other irrigation equipment elements 282 and/or plurality of geographic elements 425 that are not associated with any electronic irrigation notes. Such a filtering feature may be actuated via checkboxes, pull-down menus, buttons, or similar input elements.

FIG. 31 illustrates a more specific filtering example. The map view interface 280 may include a settings object 290 and an ellipses object 291. The software may, in response to a user input to the settings object 290, open a map settings interface 274 including a plurality of checkboxes 275. The plurality of checkboxes 275 may each correspond to and selectively filter irrigation equipment elements 282 and/or plurality of geographic elements 425 according to various categories. For example, these items may be filtered by geographic location, types of plants, whether there are any associated alerts, whether there are any associates flags, and whether there are any associated electronic irrigation notes (e.g., "notes" check box 276). Filtering by any of these options may remove/hide all other irrigation equipment elements 282 and/or plurality of geographic elements 425 that are not associated with the previously described categories (e.g., hide all irrigation equipment elements 282 and/or plurality of geographic elements 425 that do not have electronic irrigation notes associated with them, leaving only those that do have electronic irrigation notes associates with them). Alternatively, filtering by any of these options may change the color or other display parameters (e.g., outlining, coloring change, etc., as previously discussed) of all other irrigation equipment elements 282 and/or plurality of geographic elements 425 that are not associated with the previously described categories or vice versa (e.g., change color of all irrigation equipment elements 282 and/or plurality of geographic elements 425 that do not have electronic irrigation notes associated with them, leaving the color of those that do have electronic irrigation notes associates with them). In the example of FIG. 31, this may be achieved with regard to the electronic irrigation notes by checking the "notes" check box 276.

In one example, in response to a user selecting a filter element configured to filter for irrigation equipment elements 282 and/or geographic elements 425 associated with one or more electronic irrigation notes, the software may access a database or log file containing data on associations with electronic irrigation notes. The software may then adjust the map view interface 280 to communicate which irrigation equipment elements 282 and/or geographic elements 425 are associated with electronic irrigation notes, as described above (e.g., hiding, outlining, changing color, changing icon shape, etc. of the irrigation equipment elements 282 and/or geographic elements 425).

It is also possible to add electronic irrigation notes in some views/configurations of the map view interface 280. For example, FIG. 33 illustrates the map view interface 280 with a selector interface 292 that allows a user to view and add electronic irrigation notes to irrigation equipment elements 282 and/or geographic elements 425. As shown in FIG. 33, the software may, in response to a user input to the ellipses object 291, open an option menu 293, and, in response to a subsequent user input to a selector object 294 of the option menu 293, cause the central controller 22 (FIG. 2) to display the selector interface 292. When the selector interface 292 is displayed on the map view interface 280, a user may individually select, or deselect, any number of sprinklers represented by the irrigation equipment elements 282 and/or geographic elements 425. The selector interface 292 may include a note addition element 289 that, when actuated, brings up an interface that allows the creation of an electronic irrigation note, such as electronic irrigation note interface 100 as previously described.

The selector interface 292 may also include functionality to allow the user to create an electronic irrigation note for only a single irrigation equipment element 282 and/or geographic elements 425 or a plurality. In the present example, a plurality of irrigation equipment elements 282 (e.g., sprinklers) have been selected on the map view interface 280 and are listed on the selector interface 292. Selector elements 299 (e.g., checkboxes, radio boxes, highlighting, or similar selection interface elements) may be used to select one or a plurality of irrigation equipment elements 282 and/or geographic elements 425 which are illustrated here as their corresponding identifiers 103. These identifiers 103 may also be removed with deselection elements 297 which deselect individual identifiers 103 or the deselection element 298 which deselects all identifiers 103 that are listed. When several identifiers 103 are selected, the user may actuate the note addition element 289 to create a single electronic irrigation note associated with multiple identifiers 103. For example, the electronic irrigation note interface 100 may be displayed and the first area 102 may be automatically populated with the selected identifiers 103.

Similar selection functionality may be used with other interface elements within the selector interface 292 irrigation equipment elements 282 and/or geographic elements 425, such as starting and stopping operation (e.g., sprinkler irrigation), percent adjust, hold, and diagnostics.

In some examples, the selector interface 292 may include a mode selector 261. The mode selector 261 may include, for example, a first object 267, a second object 271, and a third object 273. The first object 267 may cause the software to enable a user to pan, or otherwise move across or around, a geographical area illustrated by the map view interface 280, and to select sprinklers of the plurality of sprinkler icons 428 individually. The second object 271 may cause the software to enable a user to "draw" a shape, such as by making a circle around two or more of the plurality of sprinkler icons to select a desired sprinkler group or geospatial area. The third object 278 may enable a user to select multiple sprinkler icons sequentially to form a perimeter or polygonal shape defined by lines connecting the selected sprinkler icons. In such an example, a number of sprinklers icon located within the defined perimeter or polygonal shape will be automatically selected.

Figure 14:
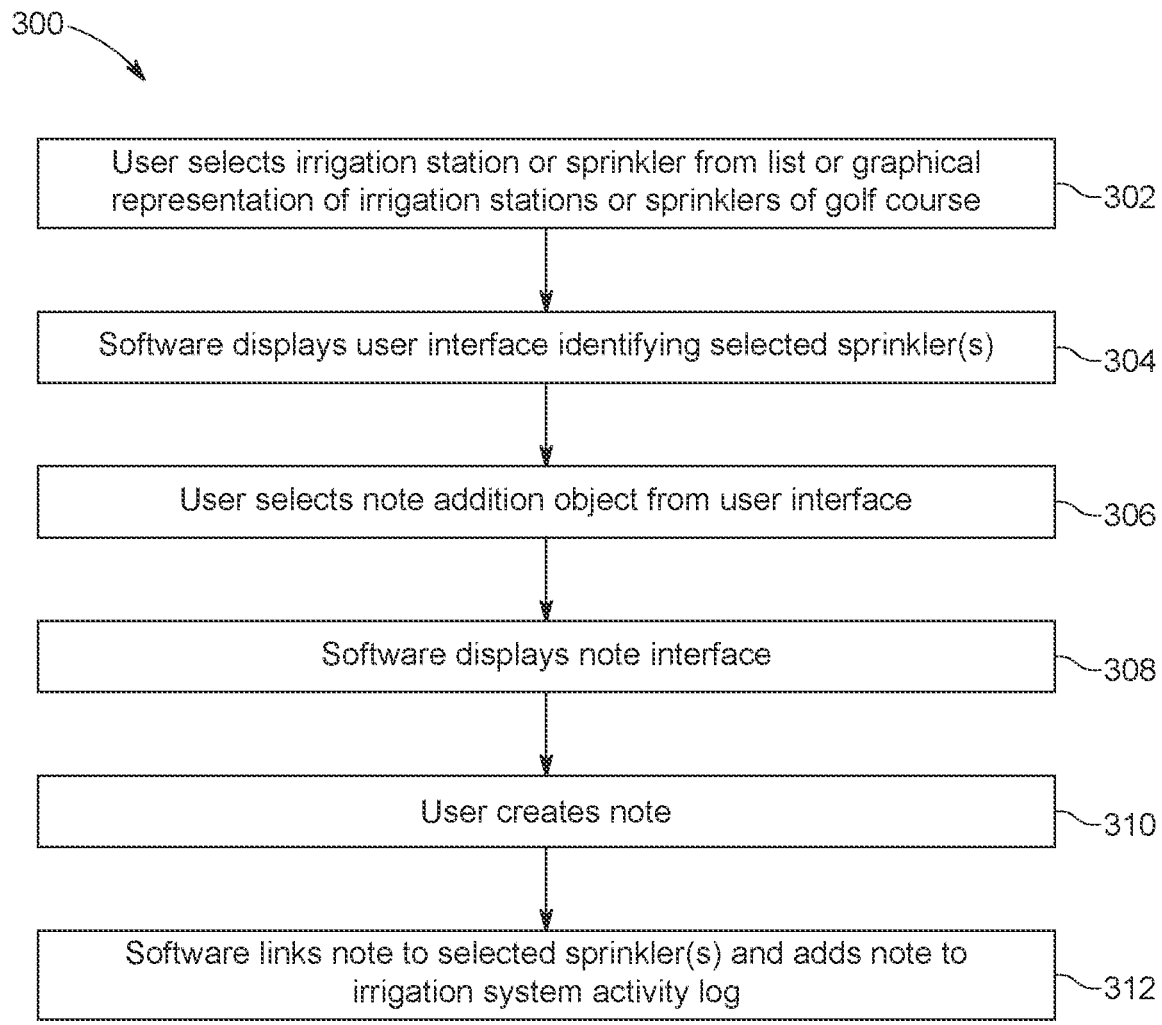
FIG. 14 illustrates a method of creating an electronic irrigation note using a central irrigation controller, in accordance with one example of the present disclosure.

FIG. 14 illustrates a method of creating an electronic irrigation note using a central irrigation controller, in accordance with one example of the present disclosure. The steps or operations of the method 300 are illustrated in a particular order for convenience and clarity; many of the discussed operations can be performed by multiple different actors, devices, or systems. It is understood that subsets of the operations discussed in the method 300 can be attributable to a single actor, device, or system and can be considered a separate standalone process or method.

The method 300 may begin at step 302. At step 302, a user may select a sprinkler subgroup or a sprinkler from a list, or a graphical representation, of sprinkler groups, subgroup, or individual sprinklers of a golf course. For example, the user may first select the watering plan object 114 or the course report object 115 from the action menu 113 of the software of the central controller 22. Next, the user may select an identifier group from the plurality of identifier groups 126, select an identifier subgroup from the plurality of identifier subgroups 136, and subsequently, select an identifier 103 corresponding to a desired irrigation equipment, geographic area, etc. Alternatively, the user may select the notification display 120 from the watering plan interface 112, and subsequently, select any individual identifier 103 which display the notification icon 130 or the message icon 131, as previously discussed.

In another example, if the user chooses to utilize the map view interface 280, the user may select a sprinkler group from the identifier group icons 424, and subsequently, select a sprinkler from the plurality of sprinkler icons 428. In an additional example, if the user chooses to utilize the selector interface 292, the user may select two or more sprinklers from the plurality of sprinkler icons 428.

At step 304, the software may display a user interface identifying the user-selected sprinkler. For example, the software may display the irrigation list interface 146 identifying a sprinkler via the one or more identifiers 103. Alternatively, if the user utilizes the selector interface 292, the software may display a list of equipment each identified via the one or more identifiers 103. At step 306, the user may select a note addition object from the user interface. For example, the user may select the first note addition object 160 or the second note addition object 288 accessible from the irrigation list interface 146, or the note addition element 289 accessible from the selector interface 292.

At step 308, the software may open or otherwise display a note interface. For example, the software may, in response to a user input to the first note addition object 160, open the electronic irrigation note interface 100 on a display of the central controller 22. At step 310, the user may create an electronic irrigation note. For example, the user may input text and/or attach images, photographs, or other media files, via one or more user inputs to the second area 104 and/or the third area 106 of the electronic irrigation note interface 100. In some examples, the user may utilize the second area 104 to input text, such via a keyboard of the central controller 22, that is descriptive of an issue associated with the sprinkler identified by the one or more identifiers 103, or an area of physical terrain located near the selected sprinkler. A user may also choose to utilize the third area 106, such as by attaching one or more photographs using a mouse, or a touchscreen display, of the central controller 22, to photographically illustrate the issue described by text of the second area 104, such as images of overly wet or dry turf or landscaping, turf or other vegetation afflicted by a disease, a geospatial area that is in need of seeding, gardening, or other landscaping work, or an observable defect in, or damage to, various electrical or mechanical components of the irrigation system 20.

In some examples, at step 310, may also choose to utilize the second area 104 to cause the software to assign the electronic irrigation note to one or more users. For example, a user may input identifier text into the first area 102 of the electronic irrigation note interface 100 that links one or more authorized users of the mobile software to an electronic maintenance note being created. In some examples, the software may further cause a message to be sent to a mobile device (e.g., the mobile device 24) of the user (e.g., the assignee of the electronic irrigation note), which may cause the mobile device to, in turn, generate an audible or a visual alert to bring the user's attention of the electronic irrigation note.

Finally, at step 312, the software may link or associate the electronic irrigation note to the selected one or more identifiers 103 by storing the data from the electronic irrigation note into a database or an activity log of the irrigation system. For example, the user may select, via a user input to, the saving object 110 of the electronic irrigation note interface 100 to cause the software to, among others, update the plurality of irrigation note elements 154 linked to the selected sprinkler, and the plurality of operational event elements 163 to reflect (e.g., display) the newly created electronic irrigation note.

Mobile Electronic Irrigation Note Interface

While the previously described interfaces are generally intended for a larger display, such as on a computer (i.e., the central controller 22), similar or the same interfaces are also possible on a mobile device 24. While some of these interfaces for a mobile device 24 are described in further detail below, it should be appreciated that they function in generally the same manner as the previously discussed interfaces. However, the mobile device 24 may provide several additional functions for inputting, displaying, modifying, and viewing the electronic irrigation notes. Specifically, mobile device 24 may generally include a global positioning system 46 that may provide the software with a user's real location via GPS coordinates, as well as the ability to take and store pictures with the mobile device 24 which may also be geotagged. These mobile interfaces and functionality are discussed further below.

Figure 15:
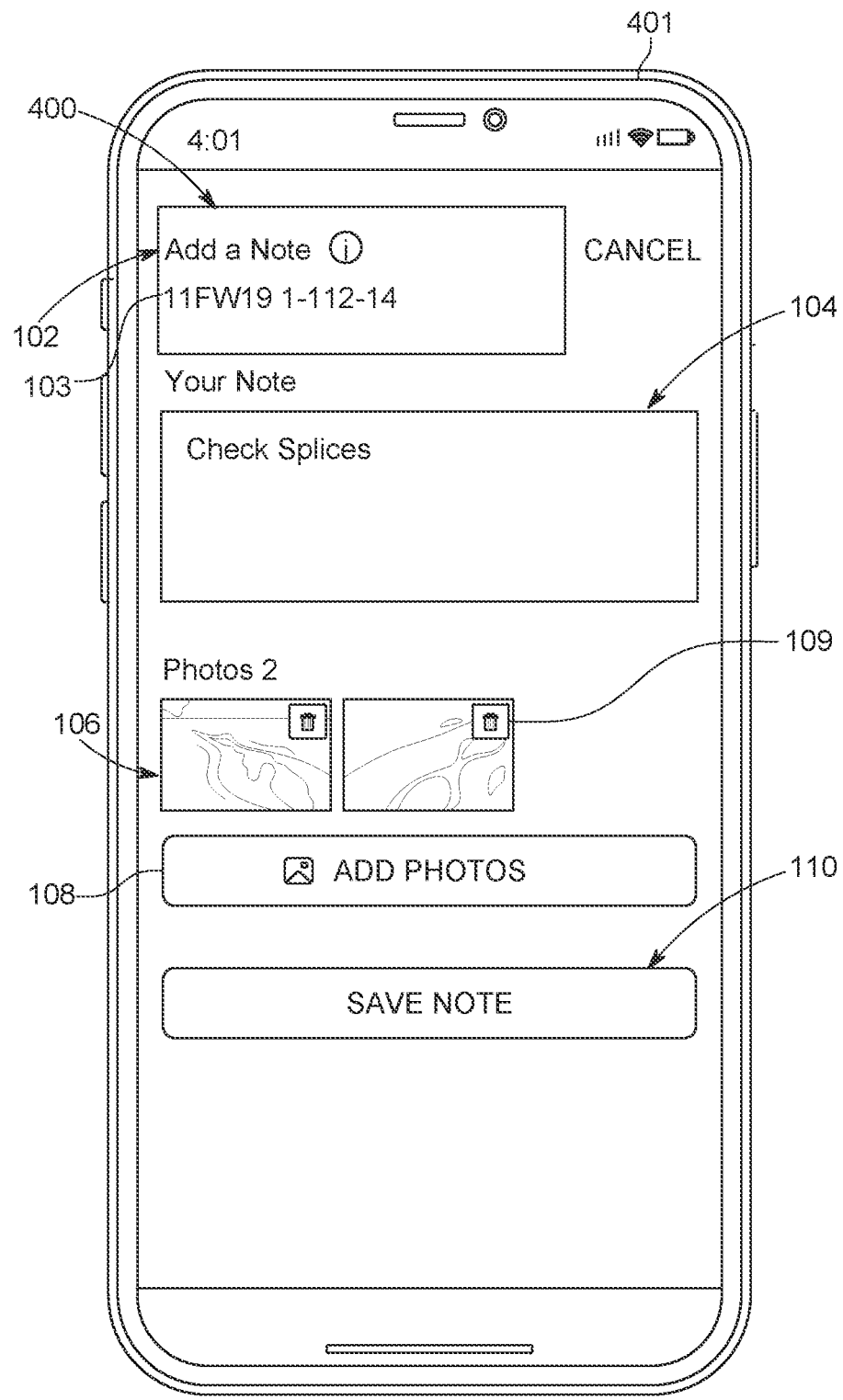
FIG. 15 illustrates an example mobile electronic irrigation note interface displayed on a mobile device, in accordance with at least one example of the present application.

FIG. 15 illustrates a mobile electronic irrigation note interface 400 displayed on a mobile device 401 (e.g., mobile device 24), in accordance with one example of the present disclosure. The central irrigation control software for mobile devices (hereinafter "mobile software"), such as shown in the form of a mobile application running on the mobile device 401 (e.g., the mobile device 24), may generally include any, or all, of the control options or functions provided by the electronic irrigation note interface 100 of the central controller 22 (FIG. 2), but may be adapted or configured to be displayed on a smaller mobile screen, among other differences described below. In some examples, the mobile software may be realized, such as alternatively to a proprietary mobile application running on the mobile device 401, in the form of remote software located on the central computer 22 (FIG. 2). In such an example, the remote software may comprise a mobile software interface in a web accessible format, such as HyperText Markup Language ("HTML"), to enable a user to interact with the remote software via the network 28 (FIG. 2) (e.g., by using a web browser of the mobile device 401).

As previously discussed, the irrigation note interface 400 may be similar to the electronic irrigation note interface 100. For example, the first area 102 may allow the addition of one or more identifiers 103, the second area 104 may allow the addition of text describing an issue, problem, reminder, etc., the third area 106 may allow one or more photos to be attached, stored or otherwise associated with the electronic irrigation note, element 109 may allow for either expansion or deletion of the one or more photos, upload object 108 may allow the user add additional photos, and saving object 110 may allow the data to be saved to a database or log as being associated with an electronic irrigation note.

Some additional functionality may be included with the mobile electronic irrigation note interface 400. In one example, the first area 102 may suggest one or more identifiers 103 based on a location of the mobile device 401 and hence the user. The software may obtain a geographic location (e.g., GPS coordinates) and then compare those coordinates to a list of coordinates stored in a database of other identifiers 103 and their respective geographic locations. If the obtained geographic location (e.g., GPS coordinate) from the mobile device 401 is within a predetermined distance (e.g., between 0-15 feet) of the geographic location (e.g., GPS coordinate) of one or more identifiers 103 within the database/log, the software may add these "nearby" identifiers 103 to the first area 102 (or provide the user with an option to add these identifiers, such as by a popup window).

In another example, if a user actuates the upload object 108 to add a photograph to third area 106, the file containing the data of the photograph may also be geotagged or include the GPS coordinates at which it was taken. This location may then by used in a similar manner as described above with regarding to suggesting one or more identifiers 103 to area first area 102.

Mobile Irrigation Control User Interfaces

Turning now to FIGS. 16-30, these figures illustrate various aspects of graphical user interfaces for operating a computerized irrigation system via a mobile device 24 or 401, such as the mobile device 24 of the irrigation system 20 (FIG. 2). Generally, the following discussion of FIGS. 16-30 is included for the purposes of describing various examples of how electronic irrigation notes may be added, modified, or displayed by users on mobile devices and is generally similar to the interfaces previously described in this specification, with some distinctions as discussed further below.

FIG. 16 illustrates an example mobile action menu 412 displayed on the mobile device 401, in accordance with at least one example of the present application. As shown in FIG. 16, when a user opens, or begins running, the mobile irrigation control software (hereinafter "mobile software"), the mobile software may cause the mobile device 401 to display the mobile action menu 412. The mobile action menu 412 may include, among others, a mobile map view object 414, a mobile list view object 416, a mobile activity log object 418, and a mobile selector object 420, each of which may be selected, via user input thereto, to cause the mobile software to display different user interface screens as described below.

Figure 17:
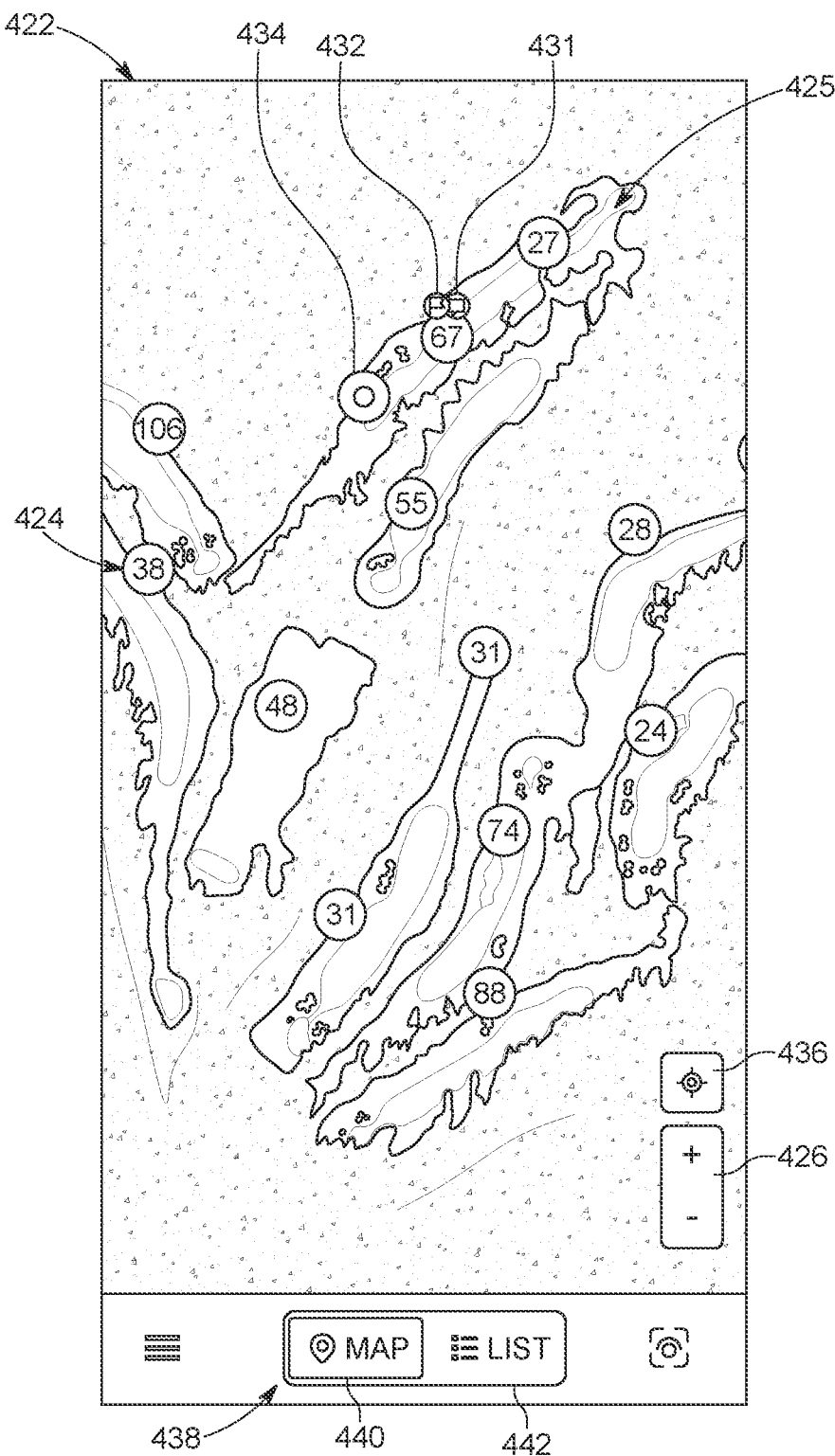
FIG. 17 illustrates an example mobile map view interface, in accordance with at least one example of the present application.
Figure 18:
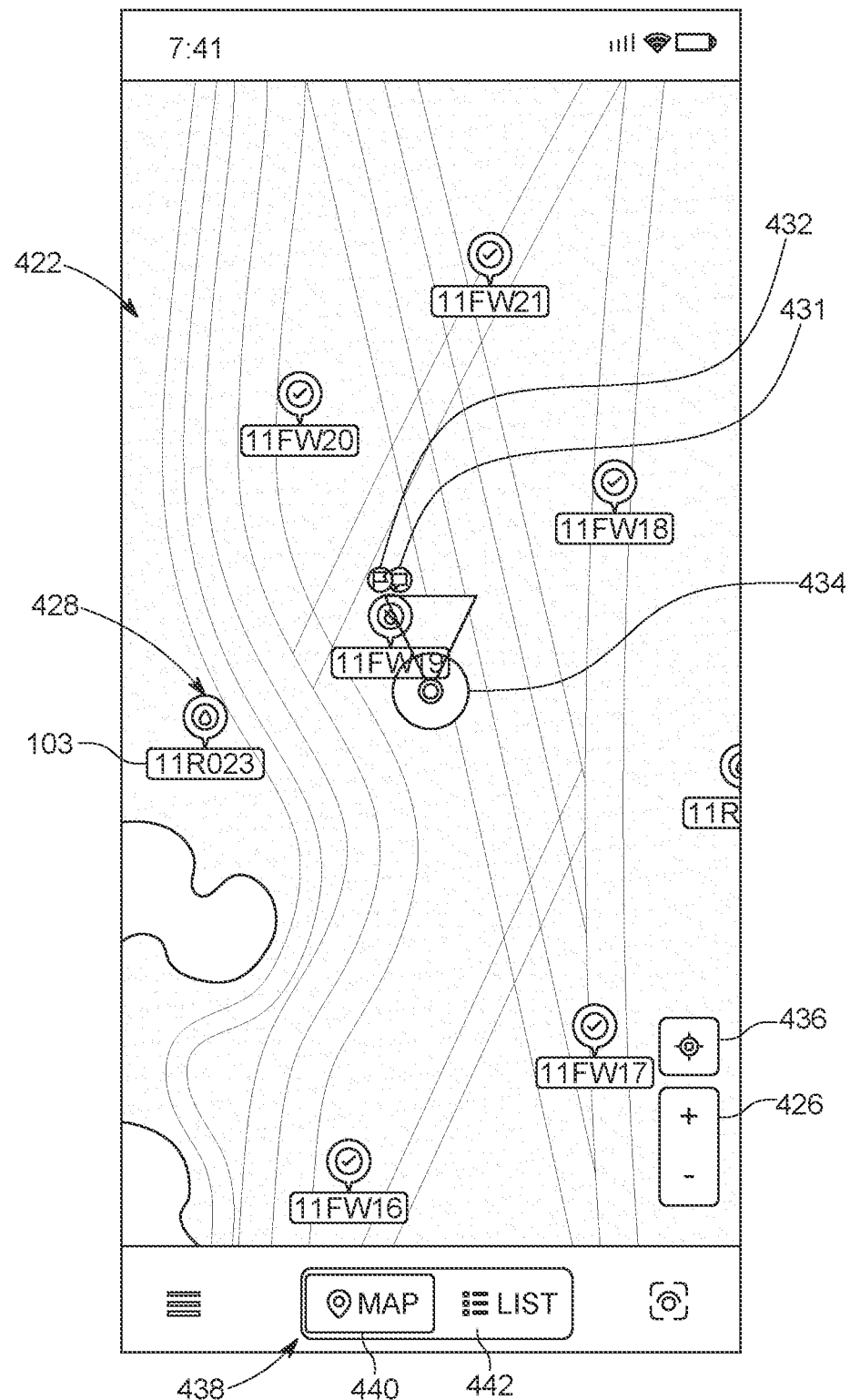
FIG. 18 illustrates an example mobile map view interface, in accordance with at least one example of the present application.

FIG. 17 illustrates an example mobile map view interface 422, in accordance with at least one example of the present application. FIG. 18 illustrates an example mobile map view interface 422, in accordance with at least one example of the present application. FIGS. 17-18 are discussed below concurrently. As shown in FIG. 17, the mobile software may, in response to a user input to the mobile map view object 414 (FIG. 16), cause the mobile device 401 (FIG. 15) to display the mobile map view interface 422. The mobile map view interface 422 may generally be a mobile version of the map view interface 280 of FIGS. 13 and 31-33. The mobile map view interface 422 may, depending upon a level of zoom selected by a user, display any of the plurality of identifier groups 126 (FIG. 4) or the identifier 103 (FIG. 6) in the form of a plurality of coordinate-linked icons distributed across the grounds of a business.

For example, as shown in FIG. 17, when the mobile map view interface 422 is operated by a user while in a relatively "zoomed-out" configuration or state, the mobile software may cause one or more of the plurality of identifier groups 126 to be graphically represented in the form of identifier group icons 424 distributed about a geospatial area, such as relative to the plurality of geographic areas 425 of a golf course. As shown in FIG. 18, when the mobile map view interface 422 is operated by a user in a relatively "zoomed-in" configuration or setting, the mobile software may cause the identifier 103 to be graphically represented in the form of a plurality of sprinkler icons 428 each located at a specific geospatial (e.g., GPS coordinate) position. In some examples, the mobile software may, in response to a user input to one sprinkler group icon of the identifier group icons 424, or alternatively, in response to one or more user inputs to a zoom object 426 of the mobile map view interface 422, cause the mobile map view interface 422 to display the plurality of sprinkler icons 428.

In some examples, the mobile software may cause the identifier group icons 424 or the plurality of sprinkler icons 428 to display a message icon 431 when an electronic irrigation note has been linked to one or more sprinklers (e.g., a sprinkler or a grouping of sprinklers defined by at least one of the one or more identifiers 103) within a geospatial area, or a sprinkler network, represented by each of the identifier group icons 424 (e.g., the plurality of identifier groups 126), or display a message icon 431 when an electronic maintenance note is linked directed to one or more of the plurality of sprinkler icons 428 (e.g., the identifier 103). Thus, viewing the identifier group icons 424 or the plurality of sprinkler icons 428 represents another example of how a user may access the electronic irrigation notes of the present disclosure.

In some examples, the mobile software may also cause the identifier group icons 424 to display a flag icon 432 when a flag has been linked to one or more sprinklers within a geospatial area, or a sprinkler subgroup network, represented by each of identifier group icons 424. The mobile software may also cause the plurality of sprinkler icons 428 to display a flag icon 432 when a flag has been linked to one or more of the sprinklers represented thereby. In view of the above, a user may navigate from, for example, the display shown in FIG. 17 to the display shown in FIG. 18 to efficiently determine which of a plurality of sprinklers located within a sprinkler group may need attention.

In some examples, when the mobile map view interface 422 is displayed, the mobile software may cause the mobile map view interface 422 to illustrate a user position icon 434 to graphically display the coordinate (e.g., geospatial GPS) position of the user at the time the mobile map view interface 422 is opened by the user from the mobile action menu 412. In some examples, the mobile software may cause the mobile map view interface 422 to display a user position object 436 which, in response to a user input thereto, may cause the mobile software to modify the mobile map view interface 422 into a "zoomed-in" configuration where only one or more sprinkler icons of the plurality of sprinkler icons 428 that are near, or proximal to, a user are displayed. This may enable a user to efficiently "zoom-in" on their present location (e.g., the user position icon 434) without, for example, utilizing the zoom object 426 or sequentially selecting one of the identifier group icons 424, and then one of the plurality of sprinkler icons 428.

Figure 23:
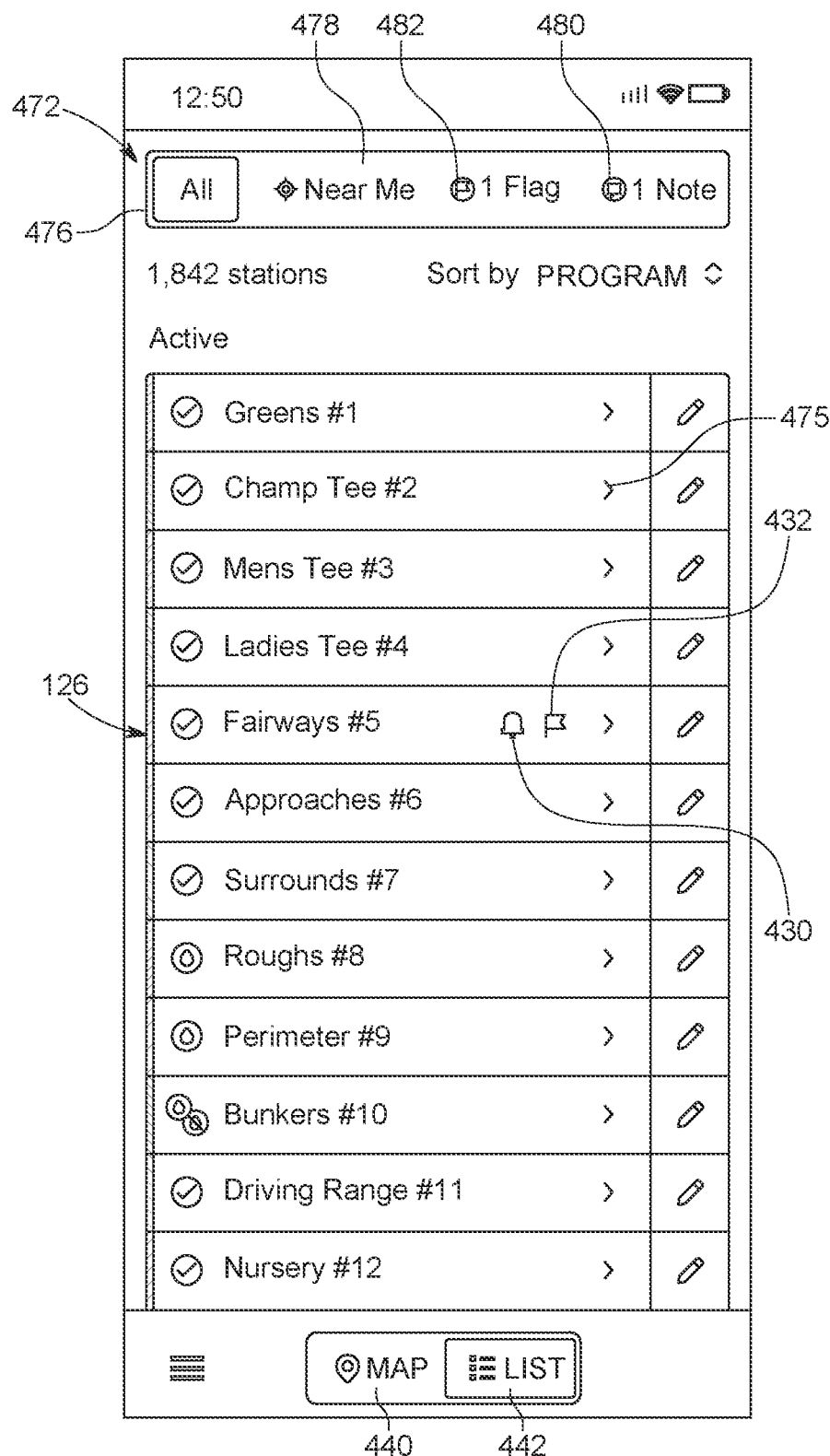
FIG. 23 illustrates a mobile list view interface, in accordance with at least one example of the present application.
Figure 24:
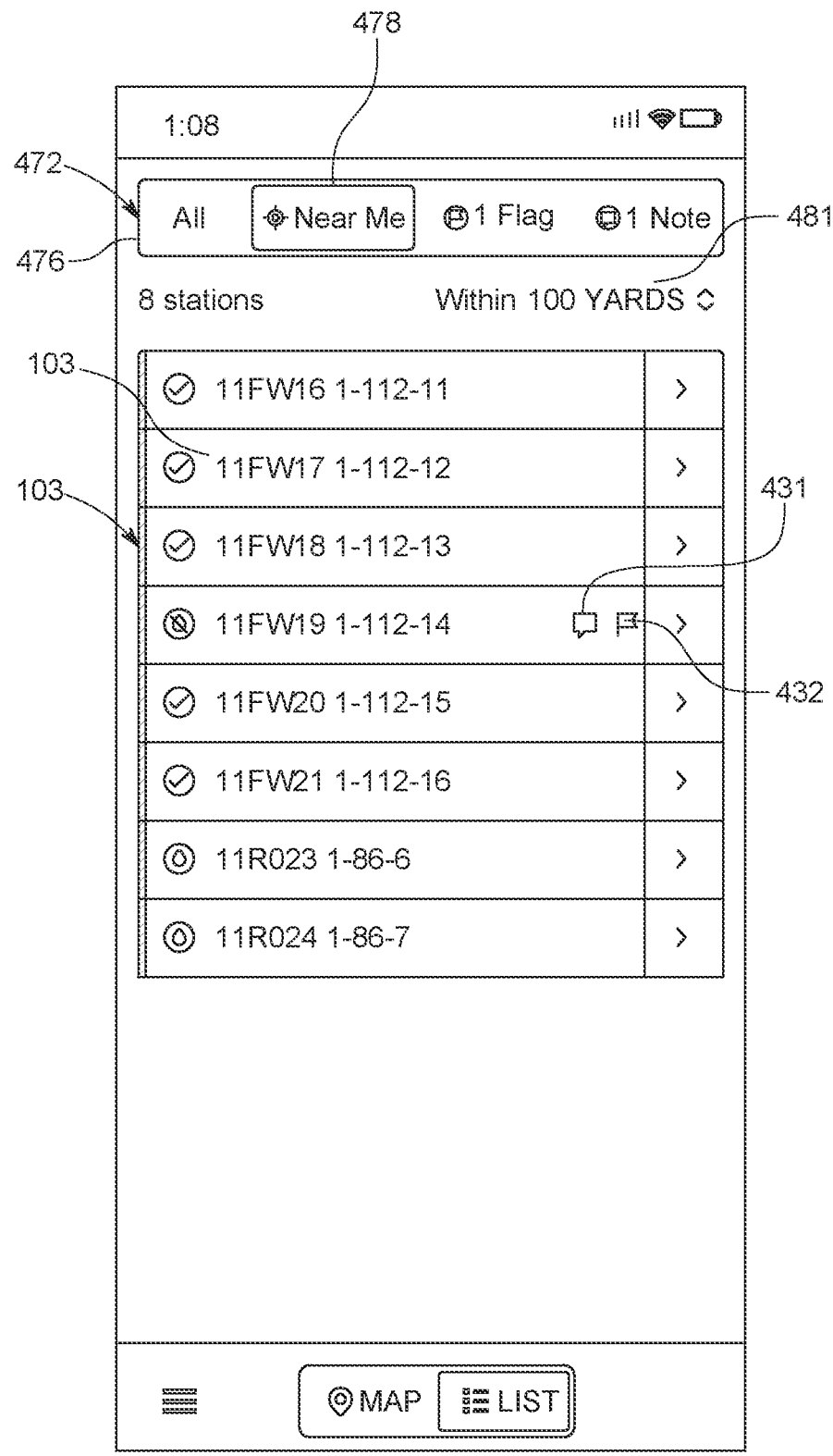
FIG. 24 illustrates a mobile list view interface with a mobile proximity tab selected, in accordance with at least one example of the present application.
Figure 25:
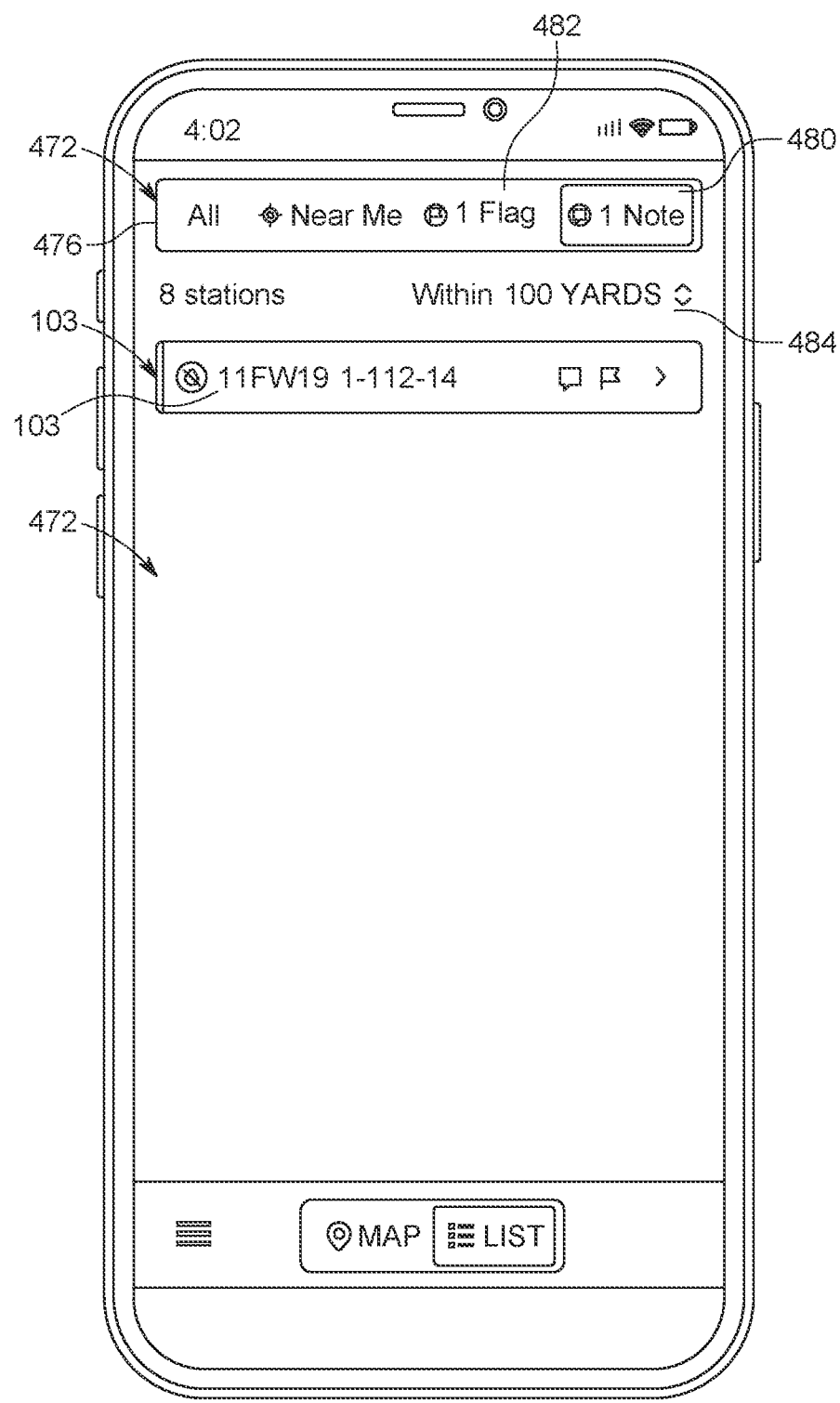
FIG. 25 illustrates a mobile list view interface with a mobile note tab selected, in accordance with at least one example of the present application.

In various examples across any of the mobile user interfaces of the present disclosure, the mobile software may cause the mobile device 401 to display a lower selector area 438 including a mobile map object 440 and a mobile list object 442. The mobile map object 440 may cause the mobile software to, in response to a user input thereon, display the mobile map view interface 422. The mobile list object 442 may cause the mobile software to, in response to a user input thereon, display the mobile list view interface 472 (FIGS. 23-25). In view of the above, the lower selector area 438 may enable a user to efficiently switch between navigation of a geospatial or coordinate display of various components of an irrigation system to a list display of various components of an irrigation system, or vice versa.

Figure 19:
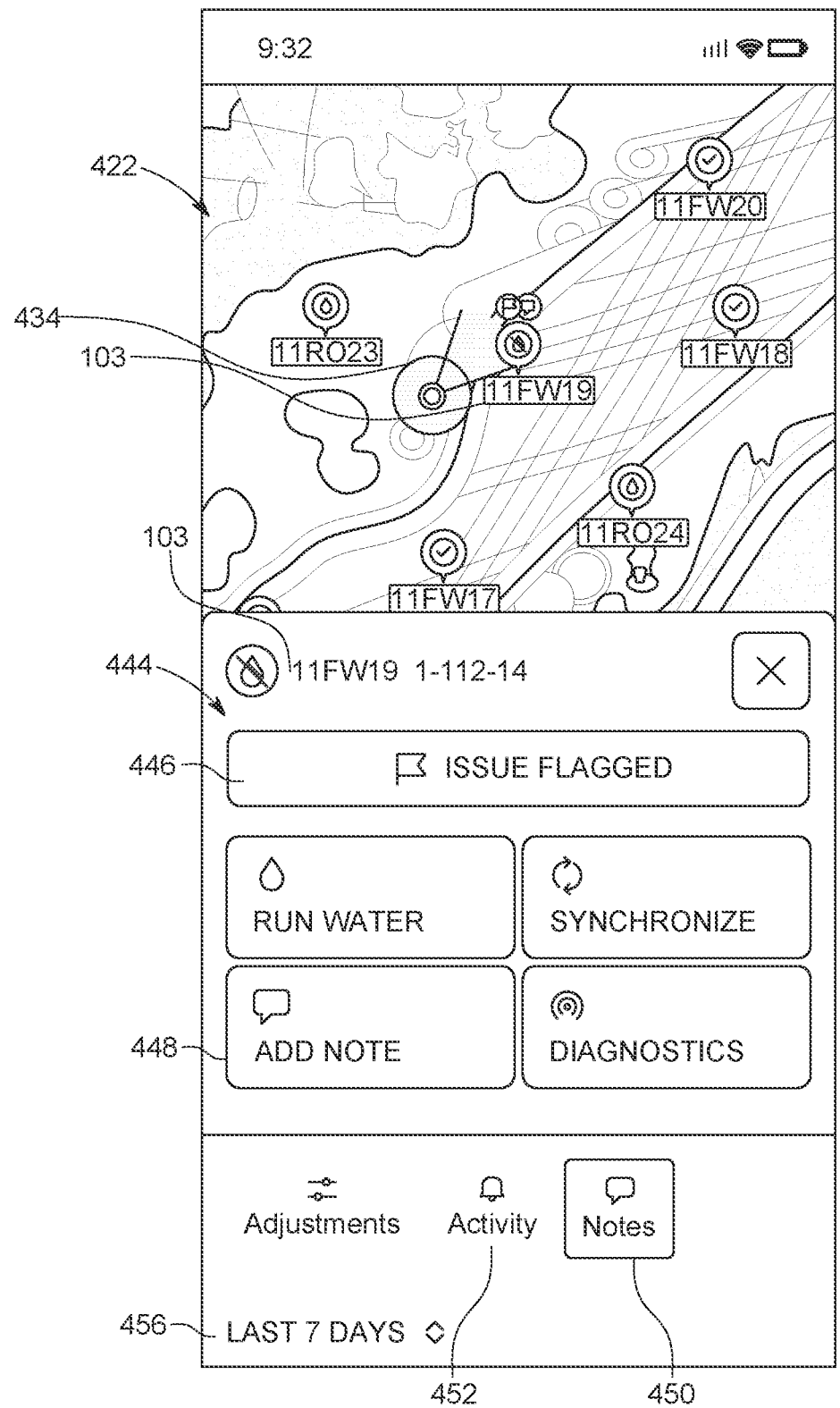
FIG. 19 illustrates a mobile map view interface with a mobile sprinkler interface opened, in accordance with at least one example of the present disclosure.
Figure 20:
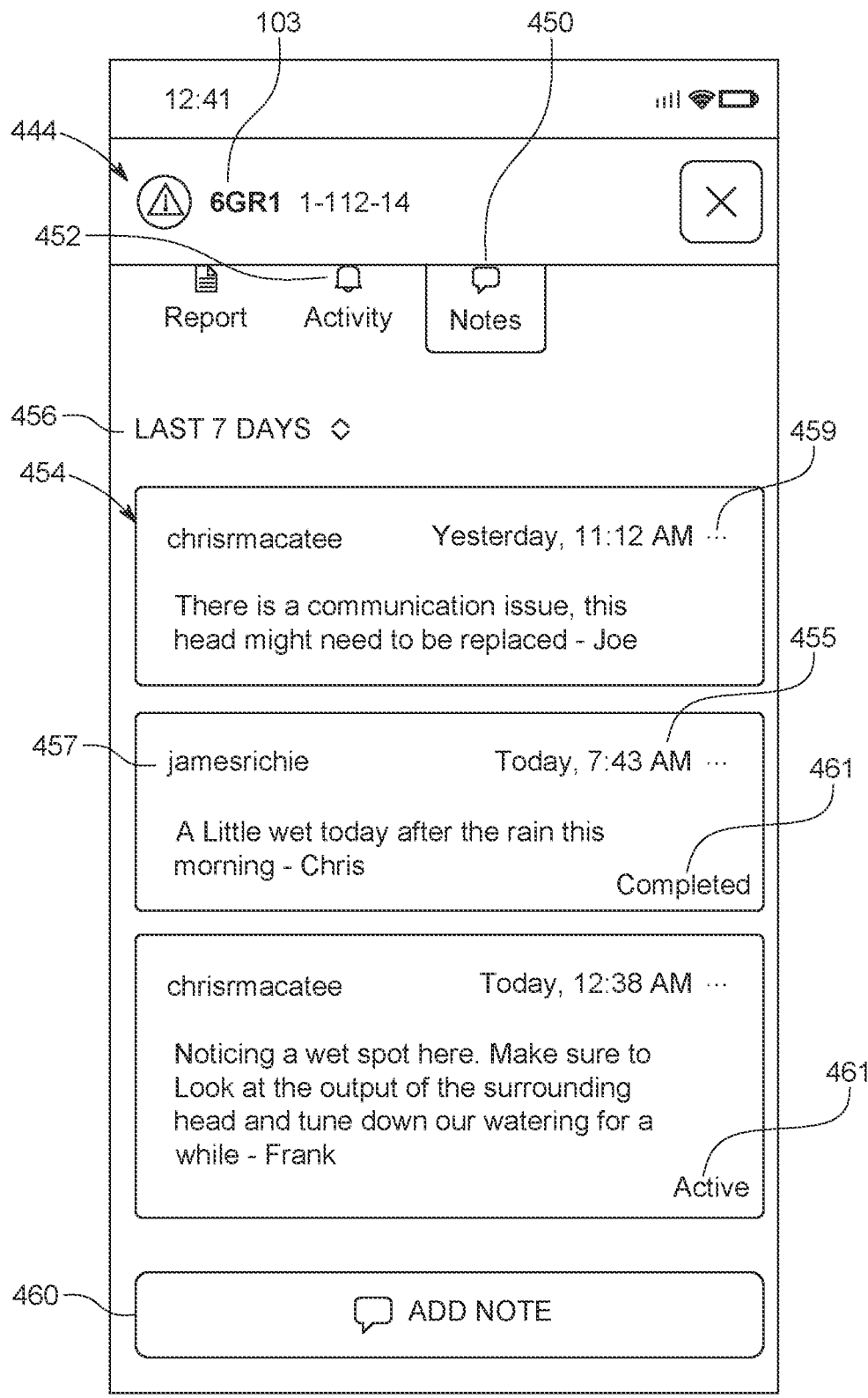
FIG. 20 illustrates an example mobile sprinkler interface with a mobile note history tab selected, in accordance with at least one example of the present application.

FIG. 19 illustrates a mobile map view interface 422 with a mobile sprinkler interface 444 opened, in accordance with at least one example of the present disclosure. FIG. 20 illustrates an example mobile sprinkler interface with a mobile note history tab 450 selected, in accordance with at least one example of the present application. As shown in FIG. 19, the mobile software may cause the mobile map view interface 422 to, in response to a user input to any individual sprinkler of the plurality of sprinkler icons 428, display the mobile sprinkler interface 444. The mobile sprinkler interface 444 may operate similarly to, and may include any of the features of, the irrigation list interface 146 (FIGS. 8-9) discussed with respect to the central controller 22. For example, the mobile sprinkler interface 444 may include a flag object 446 (FIG. 19), a first note addition object 448 (FIG. 19), a mobile note history tab 450 displaying a second note addition object 460 (FIG. 20), and a mobile activity log tab 452.

In some examples, the mobile software may cause the mobile sprinkler interface 444 to, in response to a user input to the flag object 446, create or otherwise link an active flag notification to the sprinkler identified by the one or more identifiers 103 displayed on the mobile sprinkler interface 444. In some examples, the mobile software may cause the mobile sprinkler interface 444 to, in response to a user input on the mobile note history tab 450, display one or more electronic irrigation notes 454 (FIG. 20) each linked to or associated with the selected sprinkler. The one or more electronic irrigation notes 454 may generally be the same electronic irrigation notes (e.g., the previously discussed plurality of irrigation note elements 154), when an identical identifier of the one or more identifiers 103 is used for each of the irrigation list interface 146 and the mobile sprinkler interface 444, that are accessed and retrieved by software for display on the irrigation list interface 146 of the central controller 22. Further, the mobile software may cause the one or more electronic irrigation notes 454, when displayed on the mobile sprinkler interface 444, to include any aspects of the plurality of irrigation note elements 154 described with reference to the irrigation list interface 146 of the central controller 22 (e.g., a timestamp 455, a user identification stamp 457, an editing object 459, and text and/or photographs).

In additional examples, the mobile software may cause any the one or more electronic irrigation notes 454, or any other maintenance notes in accordance with the present disclosure, to display a status element 461 (FIG. 20). The status element 461 may comprise, for example, but not limited to, text that states "active" or "completed", to indicate that an electronic maintenance note has, or has not been, viewed, addressed, or completed (similar to others previously described). In such examples, the mobile software may, in response to a user input to the status element 461, cause the status element 461 to switch or toggle between "active" or "completed" states.

The mobile software may cause the mobile sprinkler interface 444 to display the first note addition object 448; and, when the mobile note history tab 450 is selected, also display the second note addition object 460, each of which may, in response to a user input thereto, cause the mobile software to open the mobile electronic irrigation note interface 400 (FIG. 15). As such, a user may respond to, edit, confirm completion of, or delete the one or more electronic irrigation notes 454 linked to an individual sprinkler, or multiple sprinklers, using any technique or method previously described with reference to the irrigation list interface 146 of the central controller 22. In some examples, the mobile sprinkler interface 444 may also include a time filtering object 456, which may, in response to a user input thereto, cause the mobile software to increase or decrease a period of time within which electronic irrigation notes of the one or more electronic irrigation notes 454 created there inside will be displayed on the mobile sprinkler interface 444, and electronic irrigation notes of the one or more electronic irrigation notes 454 created there outside will no longer be displayed.

In further examples, the software may, in response to a user input to the time filtering object 456, open a menu or a calendar configured to allow a user to select a periodic time frame, such as a specific month of the calendar year. This may enable user to, for example, efficiently view notes created during one identified month over several years, such as to analyze or review electronic irrigation notes that may concern seasonal conditions. In various examples, the mobile software may automatically delete electronic irrigation notes after a predetermined period of time has passed, such as, but not limited to, between about 1 year and about 5 years, or may retain (e.g., store) electronic irrigation notes indefinitely.

In some examples, when the user position icon 434 is displayed on the mobile map view interface 422, the mobile software may, in response to a user input to the user position icon 434, open the mobile sprinkler interface 444. As previously discussed above with respect to FIG. 3, the mobile software may automatically populate or otherwise fill in latitude and longitude, or other locational coordinates, on the mobile sprinkler interface 444, such as to comprise one of the one or more identifiers 103 in the first area 402 or identifier text in the second area 404. In such an example, a user may then proceed to utilize the mobile electronic irrigation note interface 400, such as using any of the aspects or techniques discussed with respect to FIG. 3 and FIG. 15 above, to create an electronic irrigation note that is linked to a set of GPS or other coordinates at the time the mobile sprinkler interface 444 is opened. This may enable a user to link an electronic irrigation note to a specific geospatial position (e.g., geotag) not associated with irrigation related components or equipment.

Figure 21:
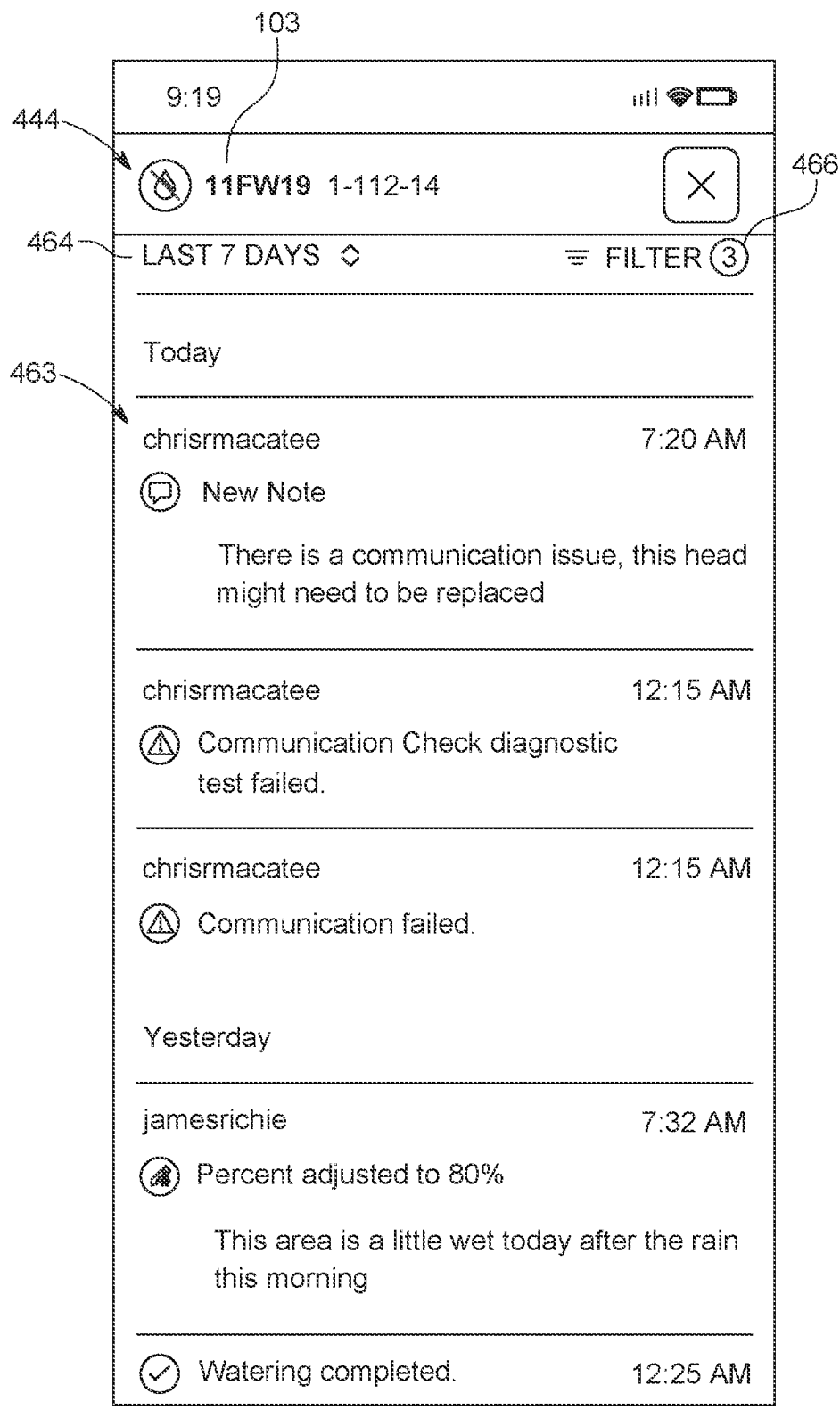
FIG. 21 illustrates an example mobile sprinkler interface with a mobile activity log tab selected, in accordance with at least one example of the present application.
Figure 22:
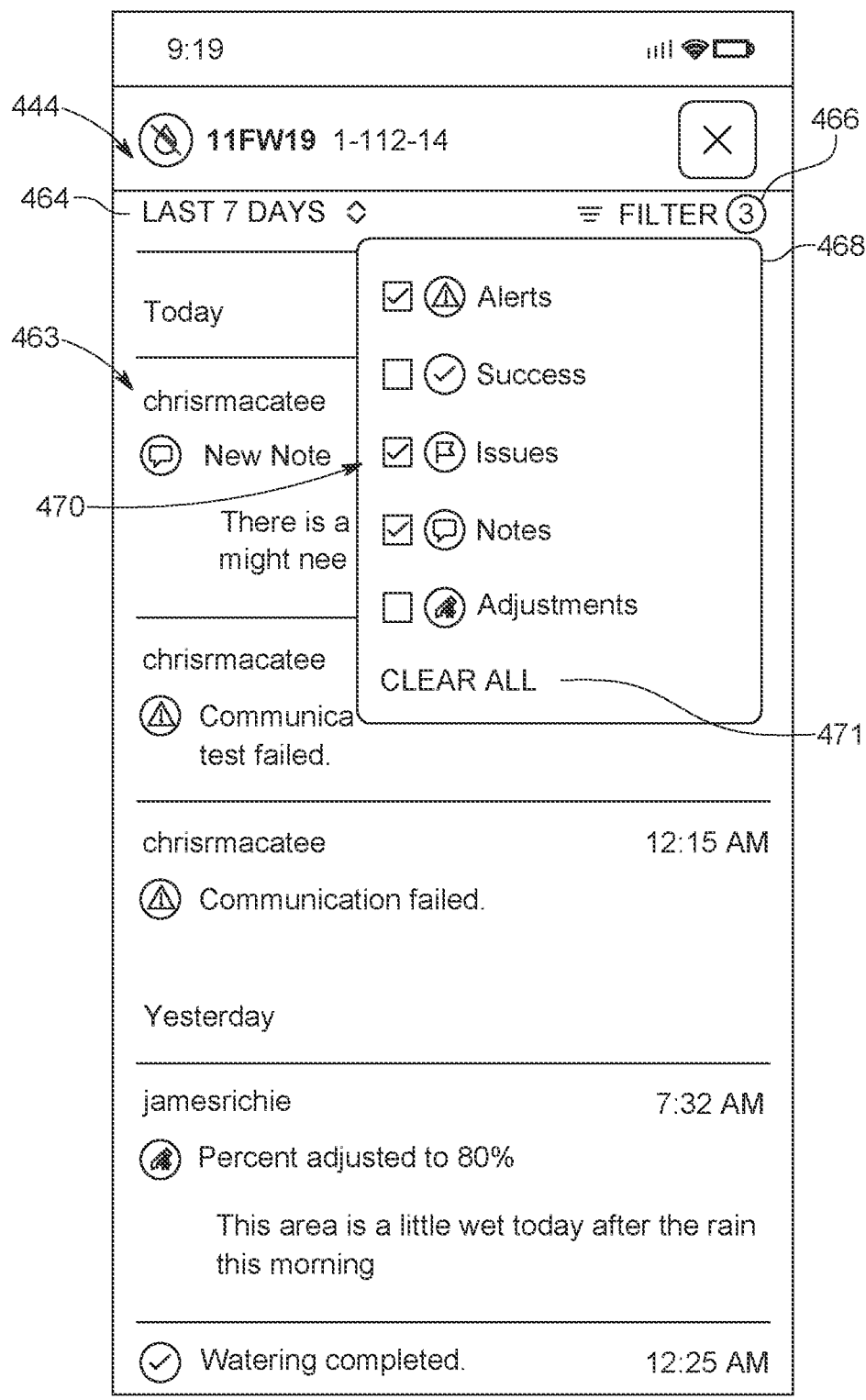
FIG. 22 illustrates an example mobile sprinkler interface with a mobile activity log tab selected, in accordance with at least one example of the present application.

FIGS. 21-22 illustrate the mobile sprinkler interface 444 with the mobile activity log tab 452 selected, in accordance with at least one example of the present application. FIGS. 21-22 are discussed below concurrently. As shown in FIG. 21, the mobile software may cause the mobile sprinkler interface 444 to, in response to a user input to the mobile activity log tab 452 (FIGS. 19-20), display a list of operational events 463 in the form of a plurality of vertically stacked notifications or entries.

The list of operational events 463 may be the same maintenance events or entries, such as stored on the remote storage device 26 (FIG. 2), that are accessed and retrieved for display on the irrigation list interface 146 of the central controller 22 when the activity log element 152 is selected. As such, the list of operational events 463 may generally form a comprehensive activity history or log for the sprinkler identified by the one or more identifiers 103 on the mobile sprinkler interface 444. In some examples, the mobile sprinkler interface 444 may also include a time filtering object 464, which may, in response to a user input thereto, cause the mobile software to increase or decrease a period of time within which maintenance entries or events of the list of operational events 463 detected or created there within will be displayed on the mobile sprinkler interface 444, and maintenance entries or events of the list of operational events 463 created there outside will no longer be displayed, or may be automatically deleted by the mobile software.

In some examples, the mobile software may cause the mobile sprinkler interface 444 to display a notification filtering object 466 which may, in response to a user input thereto, cause the mobile software to open a checkbox menu 468 (FIG. 22) that may be identical to the checkbox menu 172 (FIG. 10). The mobile software may cause the checkbox menu 468 to display a plurality of checkboxes 470, each of which may correspond to, and selectively filter in response to a user selection or deselection thereof (e.g., a click or a touch input), one type or category of maintenance notification or entry of the list of operational events 463. In some examples, the mobile software may also cause the checkbox menu 468 to display a clearing object 471, which may, in response to a user input thereto, delete any of the categories or types of operational events selected (e.g., display a checkmark) in the plurality of checkboxes 470 at the time the user selects the clearing object 471.

In view of the above, a user may select the mobile activity log tab 452 to, for example, efficiently review a wide variety of different past or recent notifications or entries pertaining to, among others, irrigation equipment dispersed or distributed across an entire golf course or grounds of a business, or entries associated with one or more geospatial locations, such as those identified by one or more identifiers 103 of an electronic maintenance note.

FIG. 23 illustrates an example mobile list view interface 474, in accordance with at least one example of the present application. As shown in FIG. 23, the mobile software may, in response to a user input to the mobile list view object 416 (FIG. 16) or the mobile list object 442 (FIGS. 17-18), cause the mobile software to display the mobile list view interface 474. The mobile list view interface 474 may be adapted to enable a user to access and utilize any of the functions, or any of the information or settings displayed on, the watering plan interface 112 (FIGS. 4-10) of the central controller 22.

The mobile list view interface 474 may include a filtering control 476 that allows a user to view different irrigation system components and the settings thereof. In some examples, the filtering control 476 may include an all-station tab 478, a mobile proximity tab 479, a mobile note tab 480, and a mobile flag tab 482. When the all-station tab 478 is selected by a user, the mobile software may cause the mobile list view interface 474 to display a list of the plurality of identifier groups 126 in the form of a plurality of vertically stacked rows, as previously discussed with respect to the watering plan interface 112. The mobile list view interface 474 may also include a plurality of expansion elements 475, each of which may cause the mobile software to, in response to a user input thereon, access the settings of the plurality of information or control columns 128 (FIG. 4).

In some examples, the mobile software may cause the note icon 430 (FIG. 23) to be displayed when an electronic irrigation note has been linked or added to one or more sprinklers (e.g., a sprinkler or a grouping of sprinklers defined by at last one of the one or more identifiers 103) within a geospatial area, or a sprinkler subgroup network, represented by each of the plurality of identifier groups 126. In some examples, the mobile software may cause the message icon 431 (FIG. 24) to be displayed when an electronic irrigation note has been linked or associated to one or more identifiers 103.

Further, while not shown, it is to be appreciated that a user may navigate through various interfaces or screens of the mobile list view interface 474 in a manner described with respect to the watering plan interface 112. For example, a user may select one of the plurality of identifier groups 126 to cause the mobile software to display a list of a plurality of identifier subgroups 136 (FIG. 5) of a selected sprinkler group, and subsequently, select one of the plurality of identifier subgroups 136 listed on the mobile list view interface 472 to cause the mobile software to display a list of the identifier 103 (FIG. 24) on the mobile list view interface 472.

FIG. 24 illustrates the mobile list view interface 472 with the mobile proximity tab 479 selected, in accordance with at least one example of the present application. In some examples, the mobile software may cause the mobile list view interface 472 to, in response to a user input to the mobile proximity tab 479 from the filtering control 476, cause the mobile software to display only the identifier 103 that are located near, or otherwise within a predefined distance of, the user at the time the mobile proximity tab 479 is selected.

In some examples, the mobile list view interface 472 may include a distance filtering object 481 which may, in response to a user input thereto, cause the mobile software to increase, or decrease, a linear distance or a radius within which sprinklers of the identifier 103 will be displayed on the mobile list view interface 472, and sprinklers of the identifier 103 located outside of the linear distance or radius will not be displayed. This may enable a user to utilize the mobile list view interface 472 to efficiently locate any nearby sprinklers, such as similar to the utility provided by the user position object 436 (FIG. 17) of the mobile map view interface 422. Thus, utilizing the mobile proximity tab 479 represents another example of how a user may access the electronic irrigation notes of the present disclosure or add/update new notes to an electronic irrigation note.

FIG. 25 illustrates the mobile list view interface 472 with the mobile note tab 480 selected, in accordance with at least one example of the present application. As shown in FIG. 25, the mobile note tab 480 may be selected from the filtering control 476, via a user input thereon, to cause the software to, depending on whether the user is viewing a list of the plurality of identifier groups 126 (FIG. 24), the sprinkler subgroups 136 (FIG. 5), or the identifier 103 (FIG. 6) at the time the user selects the mobile note tab 480, display only the plurality of identifier groups 126 or the plurality of identifier subgroups 136 which have an electronic irrigation note linked to at least one sprinkler located within the geospatial area or sprinkler network represented thereby, or the identifier 103 which have an electronic irrigation note linked directly thereto. Thus, utilizing the mobile note tab 480 represents another example of how a user may access the electronic irrigation notes of the present disclosure.

This may enable a user to efficiently locate and identify any sprinkler groups, sprinkler subgroups, individual sprinklers, or areas of physical terrain located nearby the identified (e.g., noted) sprinklers which may need of attention. Similarly, while not shown, the mobile flag tab 482 may also be selected, via a user input thereon, from the filtering control 476 to cause the mobile software to display only the sprinklers of the identifier 103 which have an active flag alert or indication linked thereto.

In some such examples, the mobile list view interface 472 may include a distance filtering object 484 which may, in response to a user input thereto, cause the mobile software to increase, or decrease, a linear distance or a radius within which any electronic irrigation notes linked to sprinklers or geospatial locations via the one or more identifiers 103 (FIGS. 3 and 15) within the linear distance or radius will be displayed on the mobile sprinkler interface 444, and any electronic irrigation notes linked to sprinklers or geospatial locations (e.g., geotags) outside of the linear distance or radius will not be displayed. This may enable a user to efficiently locate and identify any individual sprinklers or areas of physical terrain located near identified (e.g., noted) sprinklers which may need attention.

Figure 26:
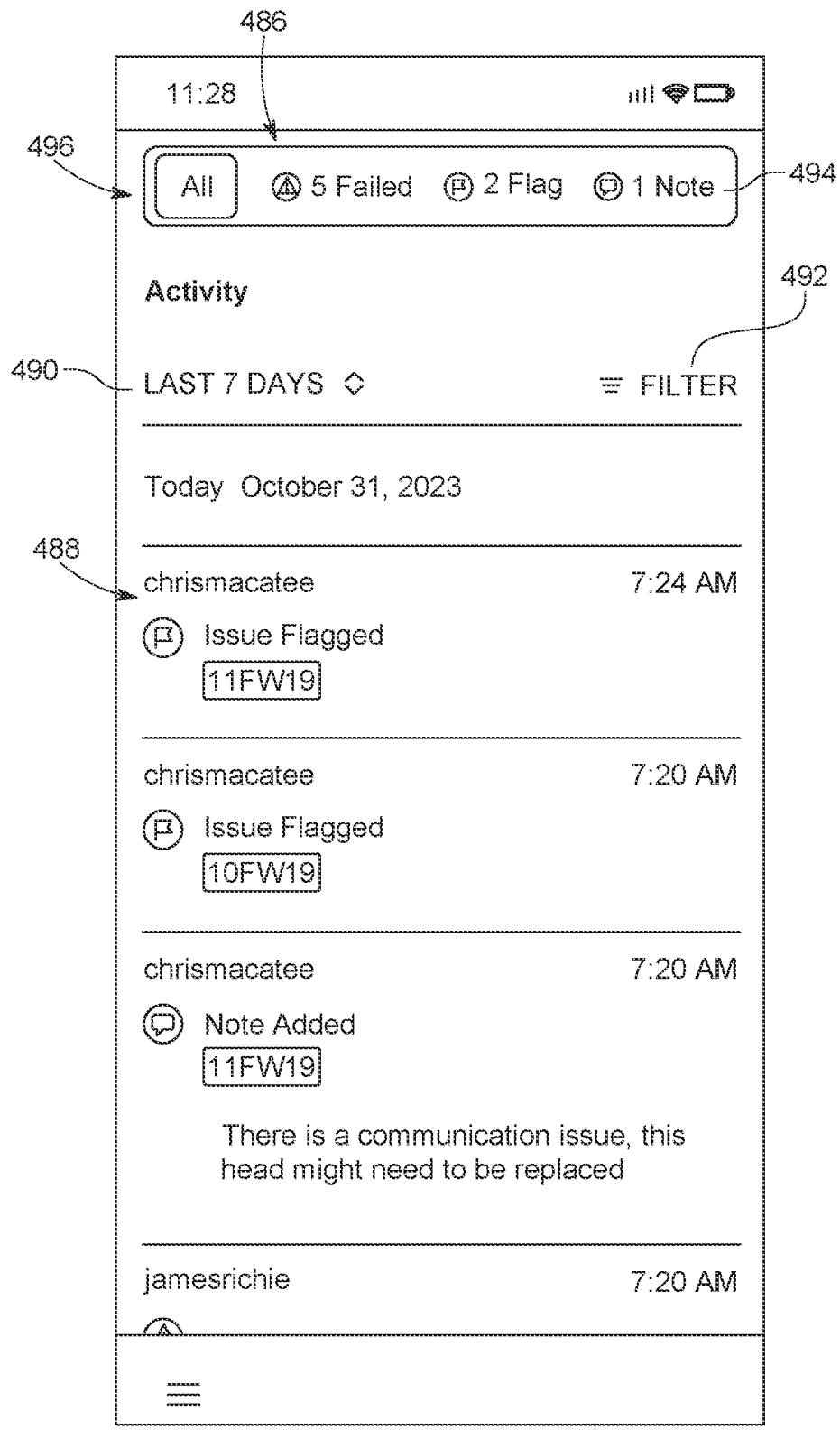
FIG. 26 illustrates a mobile list view interface with a mobile note tab selected, in accordance with at least one example of the present application.
Figure 27:
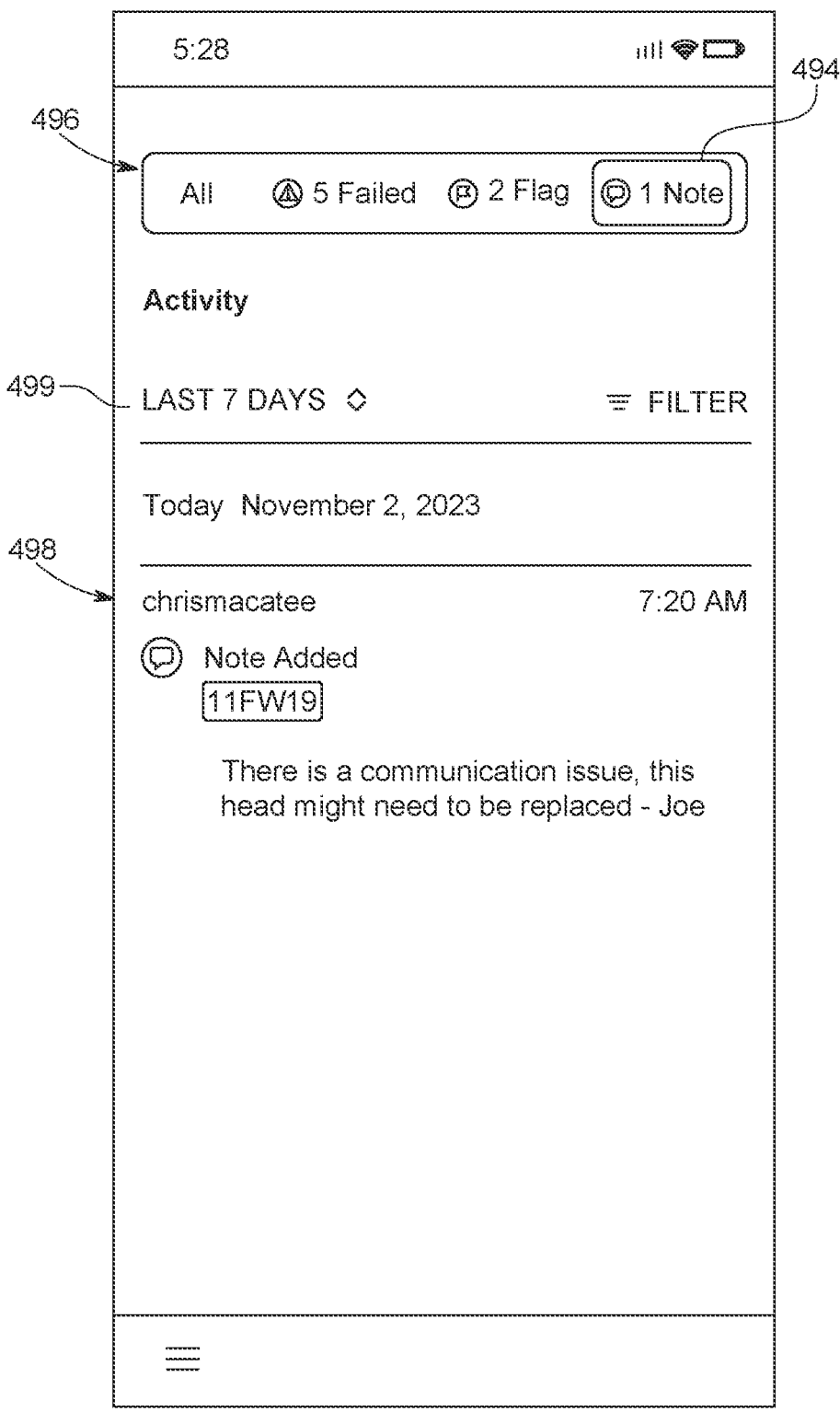
FIG. 27 illustrates a mobile activity log interface, in accordance with at least one example of the present application.

FIG. 26 illustrates a mobile activity log interface 486, in accordance with at least one example of the present application. FIG. 27 illustrates a mobile activity log interface 486, in accordance with at least one example of the present application. FIGS. 26-27 are discussed below concurrently. As shown in FIG. 26, the mobile software may, in response to a user input to the mobile activity log object 418 (FIG. 16) of the mobile action menu 412 (FIG. 16), display the mobile activity log interface 486.

In contrast to the information (e.g., maintenance entries or notifications) displayed on the mobile sprinkler interface 444 when the mobile activity log tab 452 (FIGS. 19-20) is selected, which displays only maintenance activities or events related to the sprinkler identified by the one or more identifiers 103, the mobile activity log interface 486 may display a list of operational events 488 (FIG. 26) that includes maintenance entries or notifications associated with a wide variety of different equipment or components of the irrigation system 22 (FIG. 2) or the irrigation system 10 (FIG. 1). In some examples, the list of operational events may be identical to the list of operational events 163 displayed on the activity log interface 252 (FIGS. 11-12).

In some examples, such as shown in FIG. 26, the mobile software may cause the mobile activity log interface 486 to display a time filtering object 490 which may, in response to a user input thereto, cause the mobile software to increase, or decrease, a period of time within which maintenance events or activities detected or created within will be displayed on the mobile activity log interface 486, and events or activities detected or created outside of the period of time will no longer be displayed, or may be automatically deleted by the mobile software. In some examples, the period of time may comprise any of one or more days, weeks, months, or years. In various examples, the mobile software may delete activity log entries after a predetermined period of time has passed, such as, but not limited to, between about 1 year and about 5 years, or may retain (e.g., store) activity log entries indefinitely. In further examples, the software may, in response to a user input to the time filtering object 270, open a menu or a calendar configured to allow a user to select a periodic time frame, such as a specific month of the calendar year. This may enable user to, for example, view entries or activities created during one identified month over several years.

In some examples, the mobile software may cause the mobile activity log interface 486 to display a filtering object 492 which may, in response to a user input thereto, cause the mobile software to open a checkbox menu identical to the checkbox menu 172 (FIG. 10) to enable a user to selectively filter the types or categories of maintenance entries of the list of operational events 488. In some examples, the mobile software may also cause the checkbox menu to display a clearing object (e.g., the clearing object 176), which may, in response to a user input thereto, delete any of the categories or types of events or notifications indicated by the plurality of checkboxes at the time the user selects the clearing object of the checkbox menu.

In some examples, such as shown in FIG. 27, the mobile software may cause the mobile activity log interface 486 to display a mobile note tab 494 within a filtering control 496. In such example, the mobile software may, in response to a user input to the mobile note tab 494, cause the mobile activity log interface 486 to display only one or more electronic irrigation notes 498 which are linked to one or more sprinklers (e.g., a sprinkler or a grouping of sprinklers defined by at least one of the one or more identifiers 103) of the identifier 103. Thus, utilizing the mobile note tab 494 represents another example of how a user may access the electronic irrigation notes of the present disclosure.

Further, in such examples, the mobile software may cause the mobile activity log interface 486 to display a time filtering object 499 (FIG. 27) which may, in response to a user input thereto, cause the software to increase, or decrease, a period of time within which electronic irrigation notes created or edited there inside will be displayed on the mobile activity log interface 486, and electronic irrigation notes created there outside will no longer be displayed. Such a period of time may be, for example, but not limited to, any of one or more days, weeks, months, or years. In various examples, the mobile software may automatically delete electronic irrigation notes after a predetermined period of time has passed, such as, but not limited to, between about 1 year and about 5 years, or may retain (e.g., store) electronic irrigation notes indefinitely.

In some examples, the mobile software may cause the mobile activity log interface 486 to display a filtering object 492 which may, in response to a user input thereto, cause the software to open a checkbox menu identical to the checkbox menu 172 (FIG. 10) to enable a user to selectively filter the types or categories of maintenance entries of the list of operational events 163. In some examples, the software may also cause such a checkbox menu to display a clearing object (e.g., the clearing object 176), which may, in response to a user input thereto, delete any of the categories or types of operational events indicated by the plurality of checkboxes at the time the user selects the clearing object. In view of all the above, a user may utilize the mobile activity log interface 486 to efficiently review a wide variety of different recent entries (e.g., activities or events) pertaining to, among others, sprinklers, valves, moisture sensors, or satellite controllers dispersed or distributed across an entire golf course or grounds of a business.

Figure 28:
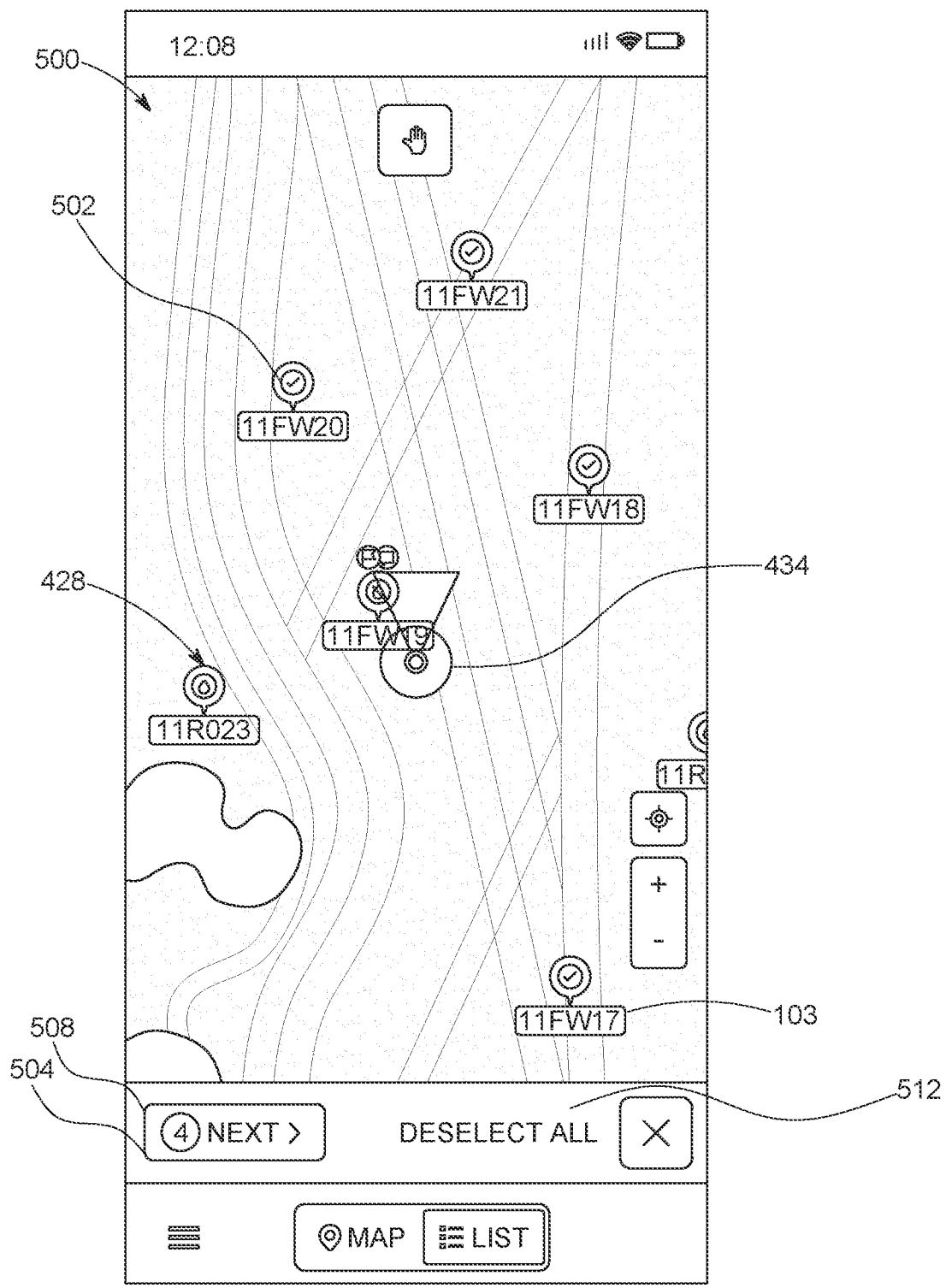
FIG. 28 illustrates a mobile selector interface, in accordance with at least one example of the present application.
Figure 29:
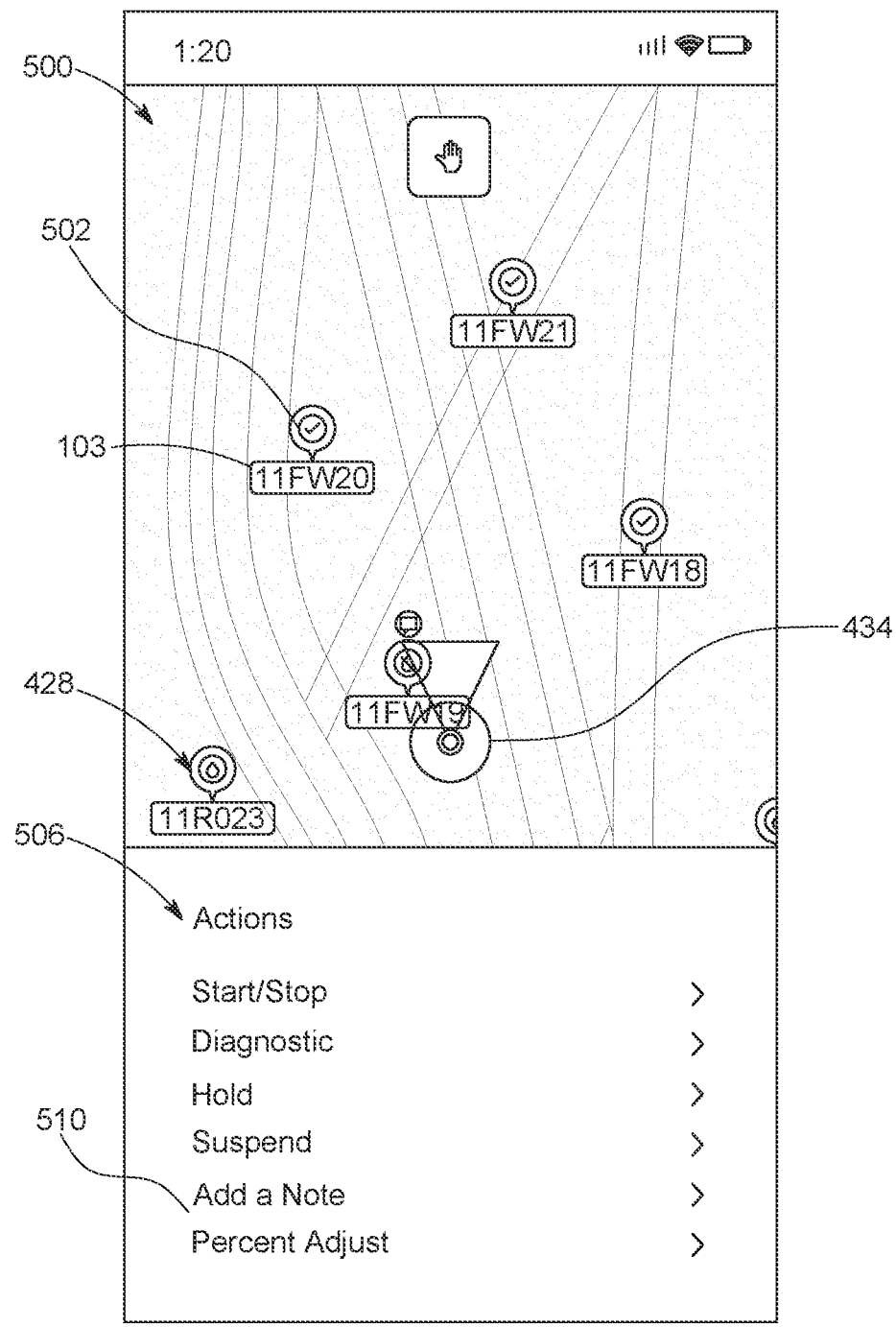
FIG. 29 illustrates a mobile selector interface with a selector menu opened, in accordance with at least one example of the present application.

FIG. 28 illustrates a mobile selector interface 500, in accordance with at least one example of the present application. FIG. 29 illustrates the mobile selector interface 500 with a selector menu 506 opened, in accordance with at least one example of the present application. FIGS. 28-29 are discussed below concurrently. As shown in FIG. 28, the mobile software may, in response to a user input to the mobile selector object 420 (FIG. 16), cause the mobile device 401 (FIG. 15) to open or otherwise display the mobile selector interface 500.

When the mobile selector interface 500 is displayed, the mobile software may cause the user position icon 434, and any of the plurality of sprinkler icons 428 (FIG. 18) located at geospatial (e.g., coordinate) positions near the user, to be displayed in a manner similar to as described, for example, with respect to the map view interface 280 (FIGS. 13 and 31-33) and the mobile map view interface 422 (FIGS. 17-19). However, when the mobile selector interface 500 is displayed, the mobile software may not open the mobile sprinkler interface 444 in response to a user input to one of the plurality of sprinkler icons 428, but may instead enable a user to individually select or deselect any number of sprinklers represented by the plurality of sprinkler icons 428 (e.g., the identifier 103).

For example, in response to a user input to one of the plurality of sprinkler icons 428, the mobile software may cause the sprinkler icon of the selected sprinkler to display a checkmark 502 to illustrate to the user that the sprinkler has been selected. Subsequently, in response to a second user input to the selected sprinkler icon, the mobile software may cause the selected sprinkler icon to remove the checkmark 502 to illustrate to the user that the sprinkler is no longer selected. The mobile software may also cause the mobile selector interface 500 to display a menu object 504 which may, in response to a use input thereto, cause the mobile software to open a selector menu 506 (FIG. 29).

In some examples, the mobile software may also cause the menu object 504 to display or otherwise illustrate a selection indicator 508, which indicates the number of individual sprinklers of the plurality of sprinkler icons 428 that are presently designated as being selected (e.g., display the checkmark 502 near the one or more identifiers 103). In some examples, the mobile selector interface 500 may further include a deselect-all object 512 (FIG. 28), which may, in response to a user input thereto, cause the mobile software to deselect all of the plurality of sprinkler icons 428 which include the checkmark 502 (e.g., are presently selected).

In some examples, the mobile software may cause the selector menu 506 to display a plurality of action objects including, among others, a third note addition object 510 which may, in response to a user input thereto, cause the mobile software to open the mobile electronic irrigation note interface 400. However, when a user accesses the mobile electronic irrigation note interface 400 through the third note addition object 510, and in contrast to user access of the mobile electronic irrigation note interface 400 through the first note addition object 448 (FIG. 19) or the second note addition object 460 (FIG. 20), the mobile software may cause the first area 402 of the mobile electronic irrigation note interface 400 to display a plurality of the one or more identifiers 103, such as shown in FIG. 3, to identify each of the plurality of sprinklers designated by an electronic irrigation note to be created (e.g., identified on the mobile selector interface 500 at the time the menu object 504 is selected).

In view of the above, the mobile selector interface 500 may enable a user to efficiently create an electronic irrigation note linked to two or more sprinklers of the identifier 103. This may also enable a user to, for example, create an electronic irrigation note linked to several sprinklers, or to a geospatial location defined between the several selected sprinklers, that may need maintenance attention. Thus, utilizing the mobile selector interface 500 represents another example of accessing or creating maintenance notes in accordance with the present disclosure.

Figure 30:
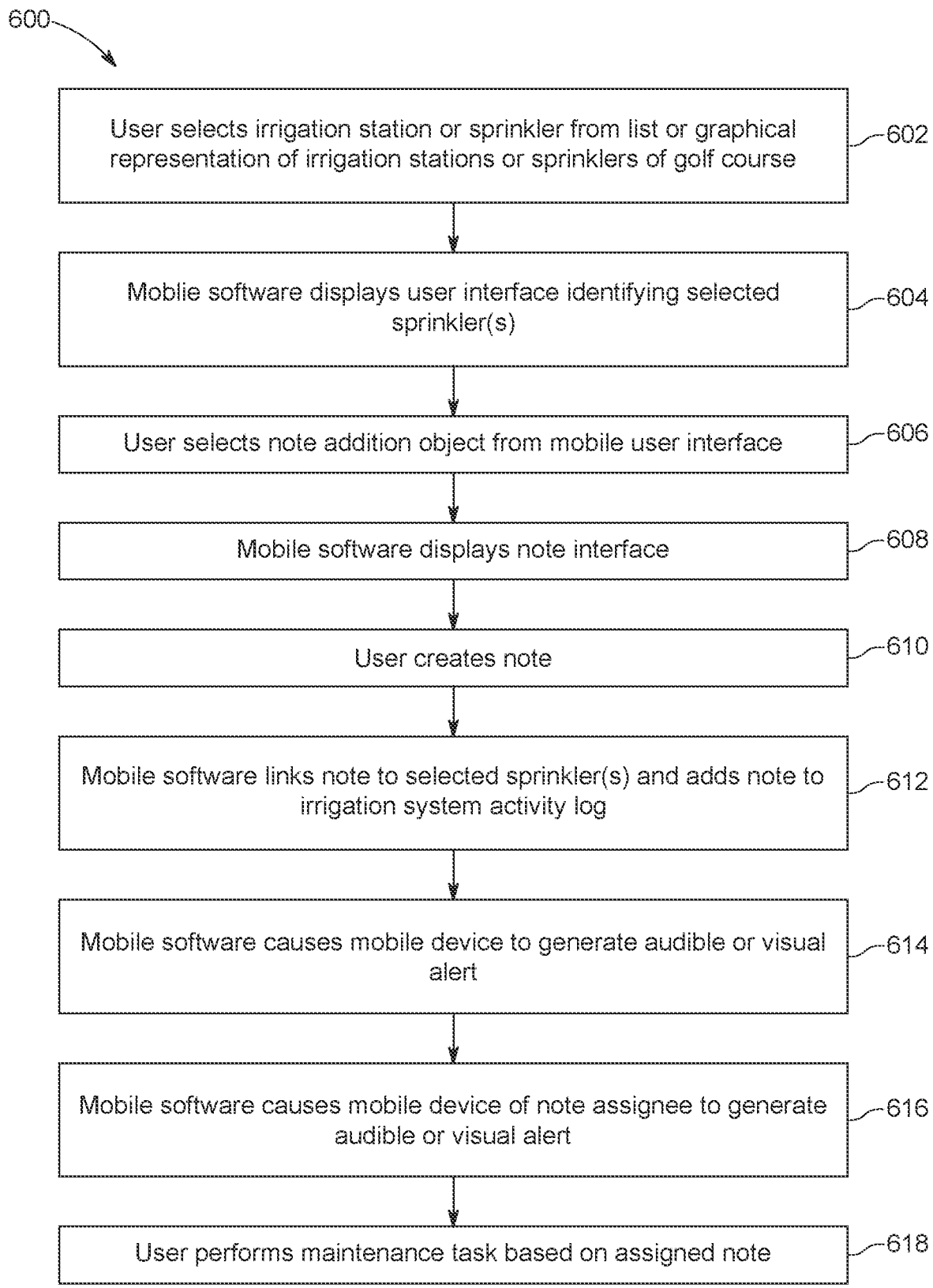
FIG. 30 illustrates an example flow chart of illustrates a method of creating an electronic irrigation note using a mobile device communicatively interconnected with central controller, in accordance with one example of the present disclosure.

FIG. 30 illustrates an example flow chart of illustrates a method 600 of creating an electronic irrigation note using a mobile device communicatively interconnected with a central controller, in accordance with one example of the present disclosure. The steps or operations of the method 600 are illustrated in a particular order for convenience and clarity; many of the discussed operations can be performed by multiple different actors, devices, or systems. It is understood that subsets of the operations discussed in the method 600 can be attributable to a single actor, device, or system and can be considered a separate standalone process or method.

The steps or operations of the method 600 described below are discussed with concurrent reference to any of FIGS. 1-13 and 15-29 above. In some examples, the method 600 may optionally begin before step 602. For example, a user may first communicatively interconnect the mobile device 24 with the central irrigation controller 22. In one such example, a user may download mobile software (e.g., a proprietary mobile application) onto the mobile device 24 from a source, such as a webpage or the remote storage device 26 via the network 28. The user may then open the mobile application to cause the mobile software to display the mobile action menu 412 on the mobile device 401.

At step 602, a user may select one or more sprinklers (e.g., a sprinkler or a grouping of sprinklers defined by at least one of the one or more identifiers 103) from a list, or a graphical representation, of a plurality of sprinklers of a golf course. For example, a user may first select from the mobile action menu 412, the mobile map view object 414, the mobile list view object 416, or the mobile selector object 420 to cause the mobile software to display the mobile map view interface 422, the mobile list view interface 472, or the mobile selector interface 500, respectively. In one example, such as if the user selects the mobile map view object 414, the user may then select a sprinkler group from the identifier group icons 424, and subsequently, select a sprinkler from the plurality of sprinkler icons 428. In an alternative example, the user may select the user position object 436, and subsequently, select a sprinkler from the plurality of sprinkler icons 428 which display the notification icon 130 or the message icon 131.

In another example, such as if the user selects the mobile list view object 416, the user may select a sprinkler group from a list of the plurality of identifier groups 126, then select a sprinkler subgroup from a list of the plurality of identifier subgroups 136, and subsequently, select a sprinkler of a list of the identifier 103. In an alternative example, the user may select the mobile note tab 480, and subsequently, select any sprinkler from the identifier 103 which displays the notification icon 130 or the message icon 131. In an additional example, such as if the user selects the mobile selector object 420, the user may select two or more sprinklers from the plurality of sprinkler icons 428 that are located near the user position icon 434.

At step 604, the software may display a user interface identifying the user-selected sprinkler. For example, if the user utilizes the mobile map view interface 422 or the mobile list view interface 472, the mobile software may open the mobile sprinkler interface 444 which identifies the selected sprinkler via the one or more identifiers 103; and, if the user utilizes the mobile selector interface 500, the mobile software may cause the selection indicator 508 indicate the number of selected icons (e.g., display the checkmark 502) of the plurality of sprinkler icons 428 while each of the plurality of sprinkler icons 428 identify the selected sprinklers via the one or more identifiers 103.

At step 606, the user may select a note addition object from the user interface. For example, the user may select the first note addition object 448 of the mobile sprinkler interface 444, the second note addition object 460 of the mobile sprinkler interface 444, or the third note addition object 510 of the mobile selector interface 500. At step 608, the mobile software may open or display a note interface. For example, the mobile software may, in response to a user input to the first note addition object 448, the second note addition object 460, or the third note addition object 510, open the mobile electronic irrigation note interface 400 on a display of the mobile device 401.

At step 610, the user may create an electronic irrigation note. For example, the user may input text and/or capture photographs via one or more user inputs to the second area 404 and/or the third area 406. In some examples, the user may choose to utilize the second area 404 to input text, such via a touchscreen display of the mobile device 401 that is descriptive of an issue associated with the selected sprinkler (s) identified by one or more identifiers 103, or an area of physical terrain that is located near the selected sprinkler of the plurality of sprinklers. A user may also choose to utilize the third area 406, such as by capturing one or more photographs, using a touchscreen display and a camera of the mobile device 401, to help illustrate the problem or issue indicated by the text in the second area 404, such as images of overly wet or dry turf or landscaping, turf or other vegetation afflicted by a disease, a geospatial area that is in need of seeding, gardening, or other landscaping work, or an observable defect in, or damage to, various electrical or mechanical components of the irrigation system 20.

In some examples, at step 610, may also choose to utilize the second area 404 to cause the software to assign the electronic irrigation note to the one or more users. For example, a user may input identifier text into the first area 402 of the mobile electronic irrigation note interface 400 that links one or more authorized users of the mobile software to an electronic maintenance note being created. In some examples, the mobile software may further cause a message to be sent to another mobile device (e.g., the mobile device 24) of the user (e.g., the assignee of the electronic irrigation note), which may cause the mobile device to, in turn, generate an audible or a visual alert to bring the user's attention of the electronic irrigation note.

At step 612, the mobile software may link the note to the selected sprinkler and add the note into an activity log of the irrigation system. For example, the user may select, via a user input to, the saving object 410 of the electronic irrigation note interface 400 to cause the mobile software to, among others, update the plurality of irrigation note elements 154 linked to the selected sprinkler, and the list of operational events 463 and 488 to reflect (e.g., display) the newly created electronic irrigation note. Optionally, the mobile device may be caused to generate an audible or visual alert once the data is saved and updated on the user's mobile device.

Steps 616 and 618 represent further optional steps that may occur if the electronic irrigation note is assigned to personnel, such as if the identifier 103 is a personnel identifier. In such cases, once an electronic irrigation note has been saved, the software may cause the mobile software on a user's mobile device 24 to generate an audible or visual alert, as indicated in step 616, which indicates that they have an electronic irrigation note assigned to them. Finally, the user may perform the desired work or review whatever information is in the electronic irrigation note, as seen in step 618, and then edit the electronic irrigation note to a "completed" status as discussed earlier in this specification or to simply delete the electronic irrigation note.

The terminology used in this disclosure should be interpreted in a permissive manner and is not intended to be limiting. In the drawings, like numbers refer to like elements. Unless otherwise noted, all of the accompanying drawings are not to scale. Unless otherwise noted, the term "about" is defined to mean plus-or-minus 5% of a stated value.

While different examples may be described in this specification above, it is specifically contemplated that any of the features from the different examples can be used and brought together in any combination. In other words, the features of different examples can be mixed and matched with each other. Hence, while every permutation of features from different examples may not be explicitly shown or described, it is the intention of this disclosure to cover any such combinations, especially as may be appreciated by one of skill in the art.

The term irrigation site or similar variations may be used in this specification. This term is intended to mean a geographical location which includes one or more sprinklers or similar irrigation equipment that are arranged to irrigate plants.

The term "object" may be used to describe a graphical display capable of inputting or causing an action or data with the software. The term "object" may also be considered an "element," an "input feature" or similar terminology.

Although the invention has been described in terms of particular examples and applications, one of ordinary skill in the art, in light of this teaching, can generate additional examples and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

Claim Bank

Clause 1. An irrigation control system for an irrigation site comprising: a central irrigation controller including a memory, a processor configured to execute software stored in the memory, and a display configured to display a graphical user interface determined by the executed software of the central irrigation controller; wherein the executed software of the central irrigation controller is further configured to cause the central irrigation controller to: execute an irrigation schedule that causes irrigation, via one or more sprinklers of a plurality of sprinklers, of an area of physical terrain located near the one or more sprinklers of the plurality of sprinklers; display, in response to a user input to the graphical user interface, one or more electronic irrigation notes on the graphical user interface of the central irrigation controller, wherein each of the one or more electronic irrigation notes is associated with at least one sprinkler of the plurality of sprinklers; and store the one or more electronic irrigation notes on a remote database.

Clause 2. The system of clause 1, wherein the executed software of the central irrigation controller is further configured to cause the central irrigation control to assign each of the one or more electronic irrigation notes to a geospatial location within one or more holes of the irrigation site or a geospatial location of the at least one sprinkler of the plurality of sprinklers.

Clause 3. The system of clause 1, wherein the executed software of the central irrigation controller is further configured to cause the central irrigation controller to delete each of the one or more electronic irrigation notes after a predetermined period of time.

Clause 4. The system of clause 1, wherein the executed software of the central irrigation controller is further configured to cause the central irrigation controller to add, to each electronic irrigation note of the one or more electronic irrigation notes: text descriptive of an issue associated with the at least one sprinkler of the plurality of sprinklers or an area of physical terrain located near the at least one sprinkler of the plurality of sprinklers; and one or more photographs of physical terrain of the irrigation site, wherein the text is based on the one or more photographs.

Clause 5. The system of clause 1, further comprising a mobile device including a memory, a processor configured to execute software stored in the memory, and a display configured to display a graphical user interface determined by the executed software of the mobile device, wherein the executed software of the mobile device is further configured to cause the mobile device to: retrieve the one or more electronic irrigation notes from the remote database; and display the one or more electronic irrigation notes on the graphical user interface of the mobile device.

Clause 6. The system of clause 5, wherein the executed software of the mobile device is configured to cause, upon retrieval of the one or more electronic irrigation notes, the mobile device to generate an audible, visual, or haptic alert associated with at least one electronic irrigation note.

Clause 7. An irrigation control system for an irrigation site comprising: a central irrigation controller including a memory, a processor configured to execute software stored in the memory, and a display configured to display a graphical user interface determined by the executed software of the central irrigation controller; wherein the executed software of the central irrigation controller is configured to cause the central irrigation controller to: execute an irrigation schedule that causes irrigation, via one or more sprinklers of a plurality of sprinklers, of an area of physical terrain located near the one or more sprinklers of the plurality of sprinklers; create one or more electronic irrigation notes on the graphical user interface of the central irrigation controller, wherein each of the one or more electronic irrigation notes is associated with at least one sprinkler of the plurality of sprinklers, wherein each of the one or more electronic irrigation notes includes information identifying an individual user of the central irrigation software; and store the one or more electronic irrigation notes on a remote database accessible by the central irrigation controller.

Clause 8. The system of clause 7, further comprising a mobile device including a memory, a processor configured to execute software stored in the memory, and a display configured to display a graphical user interface determined by the executed software of the mobile device; wherein the executed software of the mobile device is further configured to cause the mobile device to: retrieve the one or more electronic irrigation notes from the remote database; display the one or more electronic irrigation notes on the graphical user interface of the mobile device; edit the one or more electronic irrigation notes, or create one or more additional electronic irrigation notes; and store the edited one or more electronic irrigation notes, or the one or more additional electronic irrigation notes, on the remote database for access by the central irrigation controller.

Clause 9. The system of clause 8, wherein the executed software of the central irrigation controller is further configured to cause the central irrigation control to assign each of the one or more electronic irrigation notes to one or more additional users of the central irrigation software, wherein each of the one or more electronic irrigation notes includes a maintenance task to be performed by the one or more additional users.

Clause 10. The system of clause 9, wherein the executed software of the mobile device is further configured to cause the mobile device to display only the one or more electronic irrigation notes associated with a geospatial position located within a user selectable distance of a geospatial position of the mobile device.

Clause 11. The system of clause 10, wherein the one or more electronic irrigation notes are based on at least one of soil moisture data, water usage data, or weather data stored on the central irrigation controller, remote database, or a remote server.

Clause 12. The system of clause 8, wherein the executed software of the mobile device is further configured to cause the mobile device to assign each of the one or more electronic irrigation notes to a geospatial location within one or more holes of the irrigation site or a geospatial location of the at least one sprinkler of the plurality of sprinklers.

Clause 13. The system of clause 12, wherein the executed software of the mobile device is further configured to cause the mobile device to automatically add to each electronic irrigation note of the one or more electronic irrigation notes: text descriptive of an issue associated with the at least one sprinkler of the plurality of sprinklers or an area of physical terrain located near the at least one sprinkler of the plurality of sprinklers based on one or more photos of physical terrain of the irrigation site.

Clause 14. A method of managing irrigation site maintenance activities, the method comprising: outputting a graphical user interface to a display of a central irrigation controller or a mobile device from which irrigation control software is configured to be accessed, wherein the central controller and the mobile device each including a processor and a non-transitory computer readable storage medium; displaying an electronic irrigation note list on the graphical user interface to a first user accessing the irrigation control software at the central irrigation controller or the mobile device, wherein the electronic irrigation note list is stored on a remote database accessible by the mobile device and the central irrigation controller, the central irrigation controller communicatively interconnected with a plurality of sprinklers of an irrigation site; creating at least one electronic irrigation note linked to a geospatial location of one or more sprinklers of the plurality of sprinklers; and adding the at least one electronic irrigation note to the electronic irrigation note list stored on the central irrigation controller or cloud.

Clause 15. The method of clause 14, wherein the method further comprises: outputting the graphical user interface to a display of a second mobile device from which the irrigation control software is configured to be accessed, wherein the second mobile device includes a processor and a non-transitory computer readable storage medium; and displaying the electronic irrigation note list on the graphical user interface of the irrigation control software to a second user accessing the mobile irrigation control software at the second mobile device.

Clause 16. The method of clause 15, wherein displaying the electronic irrigation note list to the second user includes automatically generating an audible, visual, or haptic alert based on an assignment of the at least one electronic irrigation note to the second user by the first user.

Clause 17. The method of clause 15, wherein displaying the electronic irrigation note list includes sorting a plurality of electronic irrigation notes of the plurality of electronic irrigation notes based on a geospatial location of the second user with respect to the plurality of sprinklers.

Clause 18. The method of clause 15, wherein creating the at least one electronic irrigation note includes automatically adding text descriptive of an issue associated with the at least one sprinkler of the plurality of sprinklers or an area of physical terrain located near the at least one sprinkler of the plurality of sprinklers based on one or more photos of physical terrain of the irrigation site.

Clause 19. The method of clause 18, wherein creating the at least one electronic irrigation note includes capturing one or more photos with the first mobile device of the area of physical terrain located near the at least one sprinkler of the plurality of sprinklers.

Clause 20. The method of clause 19, wherein creating the at least one electronic irrigation note includes automatically identifying, based the one or more photos, a disease or assessing health of turf of vegetation of the physical terrain located near at least one sprinkler of the plurality of sprinklers.

Clause 21. The method of clause 14, wherein creating the one or more electronic irrigation notes includes viewing, on the graphical user interface, soil moisture data, water usage data, or weather data stored on the central irrigation controller, remote database, or a remote server.

Clause 22. A method of managing irrigation site maintenance activities, the method comprising: communicatively interconnecting a first mobile device with a central irrigation controller and remote database, the central irrigation controller in communication with a plurality of sprinklers of an irrigation site, wherein the first mobile device includes a processor and a non-transitory computer readable storage medium; outputting, in response to a first user input, a first user interface screen of mobile irrigation control software to a display of a first mobile device from which the mobile irrigation control software is configured to be accessed; displaying, in response to a second user input, a second user interface screen of mobile irrigation control software on the display of the first mobile device; and adding, in response to one or more additional user inputs to a third user interface screen, at least one maintenance entry to a maintenance activity log based on the one or more additional user inputs, wherein the one or more additional user inputs causes the mobile irrigation control software to receive at least one parameter or issue associated with one or more sprinklers of the plurality of sprinklers, or an area of physical terrain located near the one or more sprinklers of the plurality of sprinklers, wherein the maintenance activity log is stored on the central irrigation controller or remote database of the irrigation site.

Clause 23. The method of clause 22, wherein the first user interface screen comprises an action menu including a plurality of user selectable objects that are vertically listed with respect to one another, the plurality of user selectable objects including at least a map view object and a list view object.

Clause 24. The method of clause 23, wherein the second user interface screen comprises a graphical representation of one or more holes of the irrigation site, the graphical representation including a plurality of sprinkler icons each corresponding to a geospatial location of one of the plurality of sprinklers on the irrigation site, and wherein the first user input is a touch input to the map view object of the action menu and the second user input is a touch input to one or the plurality of sprinkler icons.

Clause 25. The method of clause 24, wherein the second user interface screen comprises the maintenance activity log, and wherein the first user input is a touch input to an activity log object of the action menu and the second user input is a touch input to one of a plurality of maintenance activity entries of the maintenance activity log.

Clause 26. The method of clause 25, wherein the third user interface screen includes: a first area for selecting or displaying one or more identifiers indicating which of the plurality of sprinklers the at least one maintenance entry is linked to; a second area for receiving and displaying text descriptive of the parameter or issue associated with the one or more sprinklers of the plurality of sprinklers or the area or an area of physical terrain located near the one or more sprinklers of the plurality of sprinklers; and a third area for attaching and displaying one or more photos of the area of physical terrain located near the one or more sprinklers of the plurality of sprinklers.

Clause 27. The method of clause 26, wherein the method further comprises: communicatively interconnecting a second mobile device with the central irrigation controller and the remote database, wherein the second mobile device includes a processor and a non-transitory computer readable storage medium; outputting, in response to a first user input by the second user, the first user interface screen from which the mobile irrigation control software is configured to be accessed; displaying, in response to a second user input, a second user interface screen of mobile irrigation control software on the display of the first mobile device; and editing, in response to one or more user inputs by the second user, at least one maintenance entry of the maintenance activity log stored on the central irrigation controller or remote database.

Clause 28. The method of clause 27, wherein editing the at least one maintenance entry of the maintenance activity log is performed in response to receiving an audible, visual, or haptic alert based on an assignment of the at least one maintenance entry to the second user by the first user.

Clause 29. The method of clause 28, wherein editing the least one maintenance entry of the maintenance activity log stored on the central irrigation controller or remote database includes adding, based on one or more user inputs by the second user, one or more photos captured by the second mobile device and automatically generating descriptive text based on the one or more photos.

Clause 30. The method of clause 22, wherein the method includes automatically adding one or more maintenance items to the maintenance activity log stored on the central irrigation controller or remote database by the irrigation control software of the central irrigation controller, each indicative of a communication or synchronization failure between one or more sprinklers of the plurality of sprinklers, the one or more maintenance items linked to a geospatial location of the one or more sprinklers.

Clause 31. An irrigation control system for an irrigation site comprising: a central irrigation controller including a memory, a processor configured to execute software stored in the memory, and display a graphical user interface on a display that is determined by the executed software of the central irrigation controller; wherein the executed software of the central irrigation controller is further configured to cause the central irrigation controller to: execute an irrigation schedule that causes irrigation, via one or more sprinklers of the plurality of sprinklers, of an area of physical terrain located near the one or more sprinklers of the plurality of sprinklers; display, in response to a user input to the graphical user interface, one or more electronic irrigation notes on the graphical user interface of the central irrigation controller, wherein each of the one or more electronic irrigation notes is associated with at least one sprinkler of the plurality of sprinklers; and store the one or more electronic irrigation notes on a remote database; the electronic irrigation notes comprising: a group of data logically associated with each other that is stored in one or more of a database or a log file; the group of data comprising one or more identifiers; and one or more of the following: a text-based message inputted by a user, an electronic photograph, geographic location data, personnel identification, note creation times.

Clause 32. The irrigation control system of clause 31, wherein the one or more identifiers comprise an electronic character string associated with an irrigation equipment, geolocation data, or personnel data.

Clause 33. A method of managing irrigation site activities, the method comprising: executing irrigation control software on a central controller, the central controller comprising a non-transitory computer readable storage medium storing the irrigation control software and a processor configured to execute the irrigation control software; displaying an irrigation note input interface; entering an identifier into a first input area of the irrigation note input interface; causing the irrigation control software to look up the identifier in a database and reading a status of the identifier; and, displaying a status indicator in the irrigation note interface communicating a status of the irrigation equipment or personnel associated with the identifier.

Clause 34. A method of managing irrigation site activities, the method comprising: executing irrigation control software on a central controller, the central controller comprising a non-transitory computer readable storage medium storing the irrigation control software and a processor configured to execute the irrigation control software; displaying an irrigation note input interface; entering an identifier into a first input area of the irrigation note input interface that is associated with personnel of an irrigation site; causing the irrigation control software to look up a work availability of the identifier in a database; and, displaying the work availability of the personnel in the irrigation note interface.

Clause 35. A method of managing irrigation site activities, the method comprising: executing irrigation control software on a central controller, the central controller comprising a non-transitory computer readable storage medium storing the irrigation control software and a processor configured to execute the irrigation control software; displaying an irrigation note input interface; entering an identifier into a first input area of the irrigation note input interface; causing the irrigation control software to look up the identifier in a database and populating a second input area with words or sentence templates associated with the identifier; and, adding the words or sentence templates to the second input area.

Clause 36. A method of managing irrigation site activities, the method comprising: executing irrigation control software on a central controller, the central controller comprising a non-transitory computer readable storage medium storing the irrigation control software and a processor configured to execute the irrigation control software; displaying an irrigation note input interface; receiving a first geographic location data; causing the irrigation control software to access a database containing a plurality of geographic location data that are each associated with an identifier; add with the irrigation software one or more identifiers to a first input area that are within a predetermined distance of the first geographic location data.

What is claimed is:

1. An irrigation control system for an irrigation site comprising:
   a central irrigation controller including a memory, a processor configured to
   execute software stored in the memory, and a display configured to display a graphical user interface determined by the executed software of the central irrigation controller; wherein the executed software of the central irrigation controller is further configured to cause the central irrigation controller to:
   execute an irrigation schedule that causes irrigation, via one or more sprinklers of a plurality of sprinklers, of an area of physical terrain located near the one or more sprinklers of the plurality of sprinklers;
   display, in response to a user input to the graphical user interface, one or more electronic irrigation notes on the graphical user interface of the central irrigation controller, wherein each of the one or more electronic irrigation notes is associated with at least one sprinkler of the plurality of sprinklers; and
   store the one or more electronic irrigation notes on a remote database.

2. The system of claim 1, wherein the executed software of the central irrigation controller is further configured to cause the central irrigation control to assign each of the one or more electronic irrigation notes to a geospatial location within one or more holes of the irrigation site or a geospatial location of the at least one sprinkler of the plurality of sprinklers.

3. The system of claim 1, wherein the executed software of the central irrigation controller is further configured to cause the central irrigation controller to delete each of the one or more electronic irrigation notes after a predetermined period of time.

4. The system of claim 1, wherein the executed software of the central irrigation controller is further configured to cause the central irrigation controller to add, to each electronic irrigation note of the one or more electronic irrigation notes:
   text descriptive of an issue associated with the at least one sprinkler of the plurality of sprinklers or an area of physical terrain located near the at least one sprinkler of the plurality of sprinklers; and
   one or more photographs of physical terrain of the irrigation site, wherein the text is based on the one or more photographs.

5. The system of claim 1, further comprising a mobile device including a memory, a processor configured to execute software stored in the memory, and a display configured to display a graphical user interface determined by the executed software of the mobile device, wherein the executed software of the mobile device is further configured to cause the mobile device to:
   retrieve the one or more electronic irrigation notes from the remote database; and
   display the one or more electronic irrigation notes on the graphical user interface of the mobile device.

6. The system of claim 5, wherein the executed software of the mobile device is configured to cause, upon retrieval of the one or more electronic irrigation notes, the mobile device to generate an audible, visual, or haptic alert associated with at least one electronic irrigation note.

7. An irrigation control system for an irrigation site comprising:
   a central irrigation controller including a memory, a processor configured to
   execute software stored in the memory, and a display configured to display a graphical user interface determined by the executed software of the central irrigation controller; wherein the executed software of the central irrigation controller is configured to cause the central irrigation controller to:
   execute an irrigation schedule that causes irrigation, via one or more sprinklers of a plurality of sprinklers, of an area of physical terrain located near the one or more sprinklers of the plurality of sprinklers;
   create one or more electronic irrigation notes on the graphical user interface of the central irrigation controller, wherein each of the one or more electronic irrigation notes is associated with at least one sprinkler of the plurality of sprinklers, wherein each of the one or more electronic irrigation notes includes information identifying an individual user of the central irrigation software; and
   store the one or more electronic irrigation notes on a remote database accessible by the central irrigation controller.

8. The system of claim 7, further comprising a mobile device including a memory, a processor configured to execute software stored in the memory, and a display configured to display a graphical user interface determined by the executed software of the mobile device; wherein the executed software of the mobile device is further configured to cause the mobile device to:

retrieve the one or more electronic irrigation notes from the remote database;

display the one or more electronic irrigation notes on the graphical user interface of the mobile device;

edit the one or more electronic irrigation notes, or create one or more additional electronic irrigation notes; and store the edited one or more electronic irrigation notes, or the one or more additional electronic irrigation notes, on the remote database for access by the central irrigation controller.

9. The system of claim 8, wherein the executed software of the central irrigation controller is further configured to cause the central irrigation control to assign each of the one or more electronic irrigation notes to one or more additional users of the central irrigation software, wherein each of the one or more electronic irrigation notes includes a maintenance task to be performed by the one or more additional users.

10. The system of claim 9, wherein the executed software of the mobile device is further configured to cause the mobile device to display only the one or more electronic irrigation notes associated with a geospatial position located within a user selectable distance of a geospatial position of the mobile device.

11. The system of claim 10, wherein the one or more electronic irrigation notes are based on at least one of soil moisture data, water usage data, or weather data stored on the central irrigation controller, remote database, or a remote server.

12. The system of claim 8, wherein the executed software of the mobile device is further configured to cause the mobile device to assign each of the one or more electronic irrigation notes to a geospatial location within one or more holes of the irrigation site or a geospatial location of the at least one sprinkler of the plurality of sprinklers.

13. The system of claim 12, wherein the executed software of the mobile device is further configured to cause the mobile device to automatically add to each electronic irrigation note of the one or more electronic irrigation notes:

text descriptive of an issue associated with the at least one sprinkler of the plurality of sprinklers or an area of physical terrain located near the at least one sprinkler of the plurality of sprinklers based on one or more photos of physical terrain of the irrigation site.

14. A method of managing irrigation site maintenance activities, the method comprising:

outputting a graphical user interface to a display of a central irrigation controller or a mobile device from which irrigation control software is configured to be accessed, wherein the central controller and the mobile device each including a processor and a non-transitory computer readable storage medium;

displaying an electronic irrigation note list on the graphical user interface to a first user accessing the irrigation control software at the central irrigation controller or the mobile device, wherein the electronic irrigation note list is stored on a remote database accessible by the mobile device and the central irrigation controller, the central irrigation controller communicatively interconnected with a plurality of sprinklers of an irrigation site;

creating at least one electronic irrigation note linked to a geospatial location of one or more sprinklers of the plurality of sprinklers; and adding the at least one electronic irrigation note to the electronic irrigation note list stored on the central irrigation controller or cloud.

15. The method of claim 14, wherein the method further comprises:

outputting the graphical user interface to a display of a second mobile device from which the irrigation control software is configured to be accessed, wherein the second mobile device includes a processor and a non-transitory computer readable storage medium; and displaying the electronic irrigation note list on the graphical user interface of the irrigation control software to a second user accessing the mobile irrigation control software at the second mobile device.

16. The method of claim 15, wherein displaying the electronic irrigation note list to the second user includes automatically generating an audible, visual, or haptic alert based on an assignment of the at least one electronic irrigation note to the second user by the first user.

17. The method of claim 15, wherein displaying the electronic irrigation note list includes sorting a plurality of electronic irrigation notes of the plurality of electronic irrigation notes based on a geospatial location of the second user with respect to the plurality of sprinklers.

18. The method of claim 15, wherein creating the at least one electronic irrigation note includes automatically adding text descriptive of an issue associated with the at least one sprinkler of the plurality of sprinklers or an area of physical terrain located near the at least one sprinkler of the plurality of sprinklers based on one or more photos of physical terrain of the irrigation site.

19. The method of claim 18, wherein creating the at least one electronic irrigation note includes capturing one or more photos with the first mobile device of the area of physical terrain located near the at least one sprinkler of the plurality of sprinklers.

20. The method of claim 19, wherein creating the at least one electronic irrigation note includes automatically identifying, based the one or more photos, a disease or assessing health of turf of vegetation of the physical terrain located near at least one sprinkler of the plurality of sprinklers.

* * * * *